US012664869B2

(12) United States Patent
Rokhsaz et al.

(10) Patent No.: US 12,664,869 B2
(45) Date of Patent: Jun. 23, 2026

(54) ANTI TAMPER PROCESSING

(71) Applicant: Axzon Inc., Austin, TX (US)

(72) Inventors: Shahriar Rokhsaz, Austin, TX (US);
Ahmed Younis, San Antonio, TX (US);
John J. Paulos, Austin, TX (US);
Guanghui Hu, Austin, TX (US);
Martin Gutierrez, Austin, TX (US)

(73) Assignee: Axzon Inc., Austin, TX (US)

( * ) Notice: Subject to any disclaimer, the term of this
patent is extended or adjusted under 35
U.S.C. 154(b) by 271 days.

(21) Appl. No.: 17/931,336

(22) Filed: Sep. 12, 2022

(65) Prior Publication Data

US 2023/0117486 A1      Apr. 20, 2023

Related U.S. Application Data

(60) Provisional application No. 63/252,446, filed on Oct.
5, 2021.

(51) Int. Cl.
G08B 21/18      (2006.01)
G06F 11/30      (2006.01)
(Continued)

(52) U.S. Cl.
CPC ........ G08B 21/182 (2013.01); G06F 11/3058
(2013.01); G06F 11/325 (2013.01);
(Continued)

(58) Field of Classification Search
CPC .......... G08B 21/182; G08B 5/22; G08B 5/00;
G06F 11/3058; G06F 11/325;
(Continued)

(56) References Cited

U.S. PATENT DOCUMENTS 9,582,981 B2      2/2017  Rokhsaz
11,158,179 B2 *  10/2021  Tunnell .................. A61B 5/747
(Continued)

FOREIGN PATENT DOCUMENTS

EP            3179222 B1      1/2018
WO      2014059048 A1      4/2014

OTHER PUBLICATIONS

European Standard (1999). Temperature recorders for the transport,
storage and distribution of chilled, frozen, deep-frozen/quick-frozen
food and ice cream (DIN Standard No. EN 12830).
(Continued)

*Primary Examiner* — Yonas A Bayou
(74) *Attorney, Agent, or Firm* — Garlick & Markison;
Timothy W. Markison

(57)      ABSTRACT

A method includes determining, by a processing module of
a data logging device, whether an event has occurred that
potentially compromises reliability of the data logging
device. The method further includes, when the event has
occurred, determining, by the processing module, whether
the reliability of the data logging device has been compro-
mised. The method further includes, when the reliability of
the data logging device has been compromised, generating,
by the processing module, a compromised indication signal.
The method further includes, when the reliability of the data
logging device has not been compromised, generating, by
the processing module, a data integrity indication signal.

28 Claims, 56 Drawing Sheets

(51) Int. Cl.

| | |
|---|---|
| *G06F 11/32* | (2006.01) |
| *G06F 17/40* | (2006.01) |
| *G06F 21/86* | (2013.01) |
| *G06K 7/10* | (2006.01) |
| *G06K 19/07* | (2006.01) |
| *G06K 19/077* | (2006.01) |
| *G08B 5/00* | (2006.01) |
| *G08B 5/22* | (2006.01) |

(52) U.S. Cl.
CPC ............ *G06F 11/327* (2013.01); *G06F 17/40* (2013.01); *G06F 21/86* (2013.01); *G06K 7/10118* (2013.01); *G06K 7/10297* (2013.01); *G06K 7/10405* (2013.01); *G06K 7/10425* (2013.01); *G06K 19/0717* (2013.01); *G06K 19/0776* (2013.01); *G08B 5/22* (2013.01); *G06F 2201/81* (2013.01); *G08B 5/00* (2013.01)

(58) Field of Classification Search
CPC ........ G06F 11/327; G06F 17/40; G06F 21/86; G06F 2201/81; G06K 7/10118; G06K 7/10297; G06K 7/10405; G06K 7/10425; G06K 19/0717; G06K 19/0776
See application file for complete search history.

(56) References Cited

U.S. PATENT DOCUMENTS

| | | | |
|---|---|---|---|
| 2001/0050580 A1 | 12/2001 | O'Toole | |
| 2009/0247122 A1* | 10/2009 | Fitzgerald | G06F 21/88 455/410 |
| 2009/0249460 A1* | 10/2009 | Fitzgerald | H04L 63/12 709/206 |
| 2010/0031349 A1* | 2/2010 | Bingham | G06F 21/31 726/20 |
| 2014/0232519 A1* | 8/2014 | Allen | G06Q 30/0283 340/5.9 |
| 2018/0047275 A1* | 2/2018 | Poursohi | B25J 9/161 |
| 2019/0051144 A1* | 2/2019 | David | G08B 21/0415 |
| 2019/0088101 A1* | 3/2019 | Tunnell | G08B 21/02 |
| 2019/0149341 A1* | 5/2019 | Robison | H04L 9/0897 713/156 |
| 2021/0089687 A1* | 3/2021 | Achillopoulos | H04L 63/0428 |

OTHER PUBLICATIONS

International Organization for Standardization (2015). Information technology—Radio frequency identification for item management—Part 63: Parameters for air interface communications at 860 MHz to 960 MHZ Type C (ISO/IEC Standard No. 18000-63).

\* cited by examiner

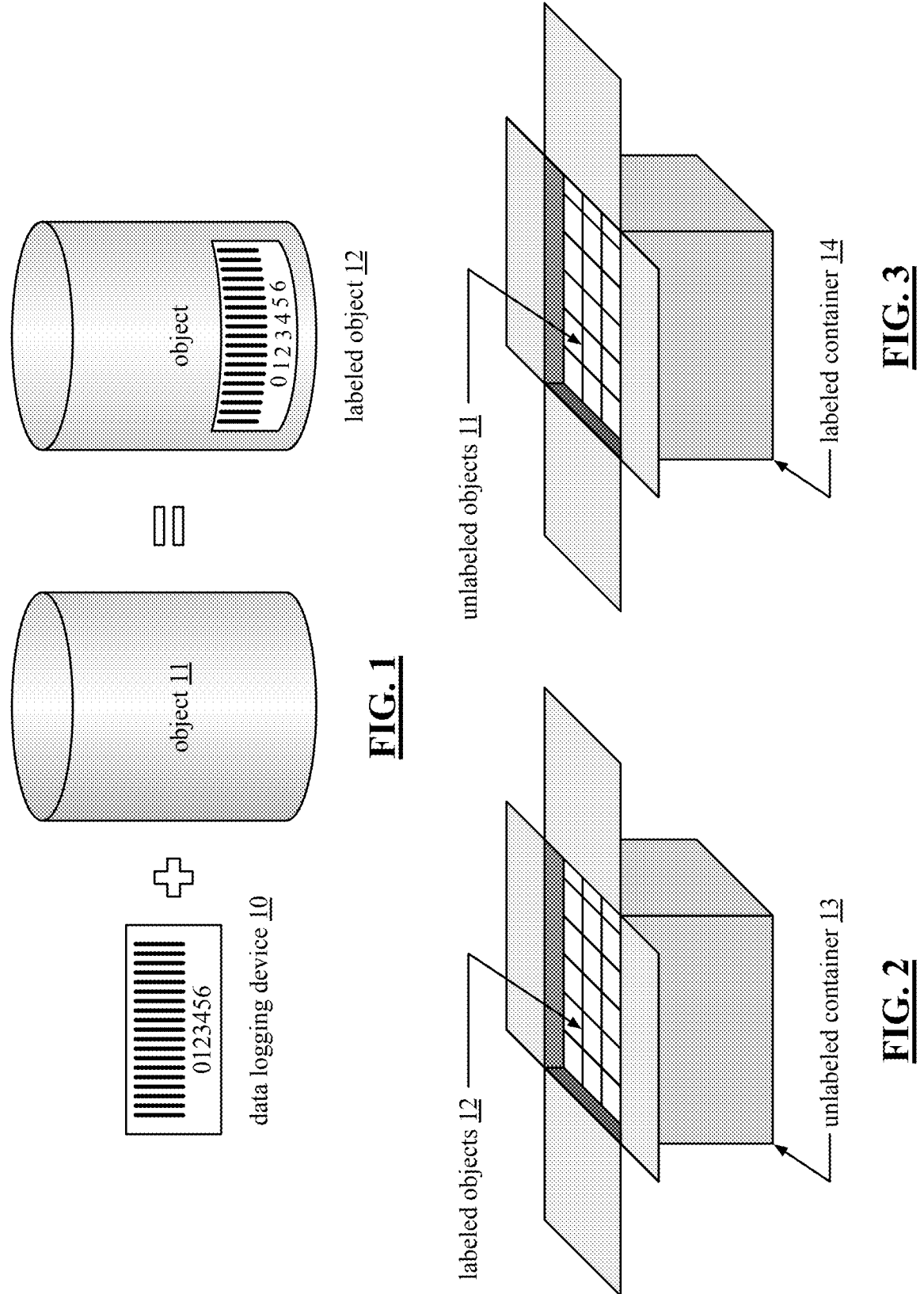

data tracking system computing entity 60 computing entity 60 computing entity 60 computing entity 60 computing entity 60 computing device 61 computing device 61 computing device 61 computing device 61 data logging device 10 non-RF activation
module 45 activation signal 124

126-n

128

127 activation signal 124

126-p peel off short 125

128

127 non-RF activation module 45 activation signal 124

126-n latch

128 open

127 data logging device 10 data logging device 10 data logging device data logging device 10 data logging device 10 data logging device 10 data logging device 10

| read states | write states |
|---|---|
| non-readable | non-writable |
| readable | writable with NL |
| readable with PRL | writable with PPL |
| readable with CMR | writable with SL |

FIG. 48

| bank | name | write | read | comments |
|------|------|-------|------|----------|
| reserved | access passwords | yes | w/ access PW, no if perma-locked | |
| reserved | kill passwords | yes | w/ access PW, no if perma-locked | |
| TID | analog configuration | sticky lockable | w/ device proprietary PW | custom memory protection & feature configuration |
| TID | backscatter sensor words w/EPC | sticky lockable | w/ device proprietary PW | |
| TID | lock read & EPC backscatter | sticky lockable | w/ device proprietary PW | |
| TID | AES keys sticky | sticky lockable | w/ device proprietary PW | |
| TID | disable broadcast enable | sticky lockable | w/ device proprietary PW | |
| reserved | AES Key 1 | sticky lockable | not readable | |
| reserved | AES Key 2 | sticky lockable | not readable | |
| user | reader access password | yes | not readable | tie to a reader for debug, etc. |
| user | device proprietary password | not writeable | not readable | written by manufacturer |
| TID | manufacturer ID | not writeable | readable | written by manufacturer |

FIG. 49

| bank | name | write | read | comments |
|------|------|-------|------|----------|
| TID | Tag Model number | not writeable | readable | written by manufacturer |
| TID | Extended TID header | not writeable | readable | written by manufacturer |
| TID | Tag ID | not writeable | readable | written by manufacturer |
| TID | configuration space | writeable | readable | |
| user | sensor calibration | writeable with access password | w/ access PW, no if perma-locked | |
| user | MMS count | not writeable | w/ encrytion | |
| user | VFC code | not writeable | w/ encrytion | |
| user | temperature sense data | not writeable | w/ encrytion | |
| user | battery sense data | not writeable | w/ encrytion | |
| user | VCO control | not writeable | w/ encrytion | |
| user | RTC state | not writeable | w/ encrytion | |
| user | RTC clock | not writeable | w/ encrytion | | second layer 442 first layer 441 conductive plate 440 conductive plate 440

V_out plates of layers

444

V_in voltage
source 443 have a low resistance
when in contact conductive plate 440 second layer 442 first layer 441

V_out plates of layers

444

V_in voltage
source 443 forms a capacitor power harvesting module 154

1st or 2nd power supply

ANTI TAMPER PROCESSING

CROSS-REFERENCE TO RELATED APPLICATIONS

The present U.S. Utility Patent Application claims priority pursuant to 35 U.S.C. § 119(e) to U.S. Provisional Application No. 63/252,446, entitled "WIRELESS DATA RECORDING DEVICE AND APPLICATIONS THEREOF", filed Oct. 5, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to wireless communications and more particularly to data recording.

Description of Related Art

Radio frequency identification (RFID) is known to include a tag and a reader. The tag is typically associated with an item and stores data to identify the item (e.g., an item name, a serial number, a manufacturer identifier, a price, an electronic product code (EPC), etc.). The tag is typically a passive device (i.e., no battery) and generates the power it needs by harvesting energy from a radio frequency (RF) signal transmitted by the reader.

In the presence of an RF signal of a reader, a tag powers up and determines whether the reader is sending it a command. If so, the tag responds to the command. For example, the tag writes data into its memory in response to a write command. As another example, the tag reads data from its memory and sends back-scatters the data on to the RF signal in response to a read request.

Applications of RFID tags is expanding beyond just mere product identification. For example, a battery powered RFID tag is used for shelf-life monitoring. As another example, a battery powered RFID tag is used to infer shelf-file dating for perishables.

BRIEF DESCRIPTION OF THE SEVERAL VIEWS OF THE DRAWING(S)

FIG. 1 is a schematic block diagram of an example of a data logging device being coupled to an object to create a labeled object;

FIG. 2 is a schematic block diagram of an example of an unlabeled container that contains labeled objects;

FIG. 3 is a schematic block diagram of an example of a labeled container that contains unlabeled objects;

FIG. 48 is a schematic block diagram of an example of memory allocation within a data logging device;

FIG. 49 is a schematic block diagram of another example of memory allocation within a data logging device;

DETAILED DESCRIPTION OF THE INVENTION

Figure 4:
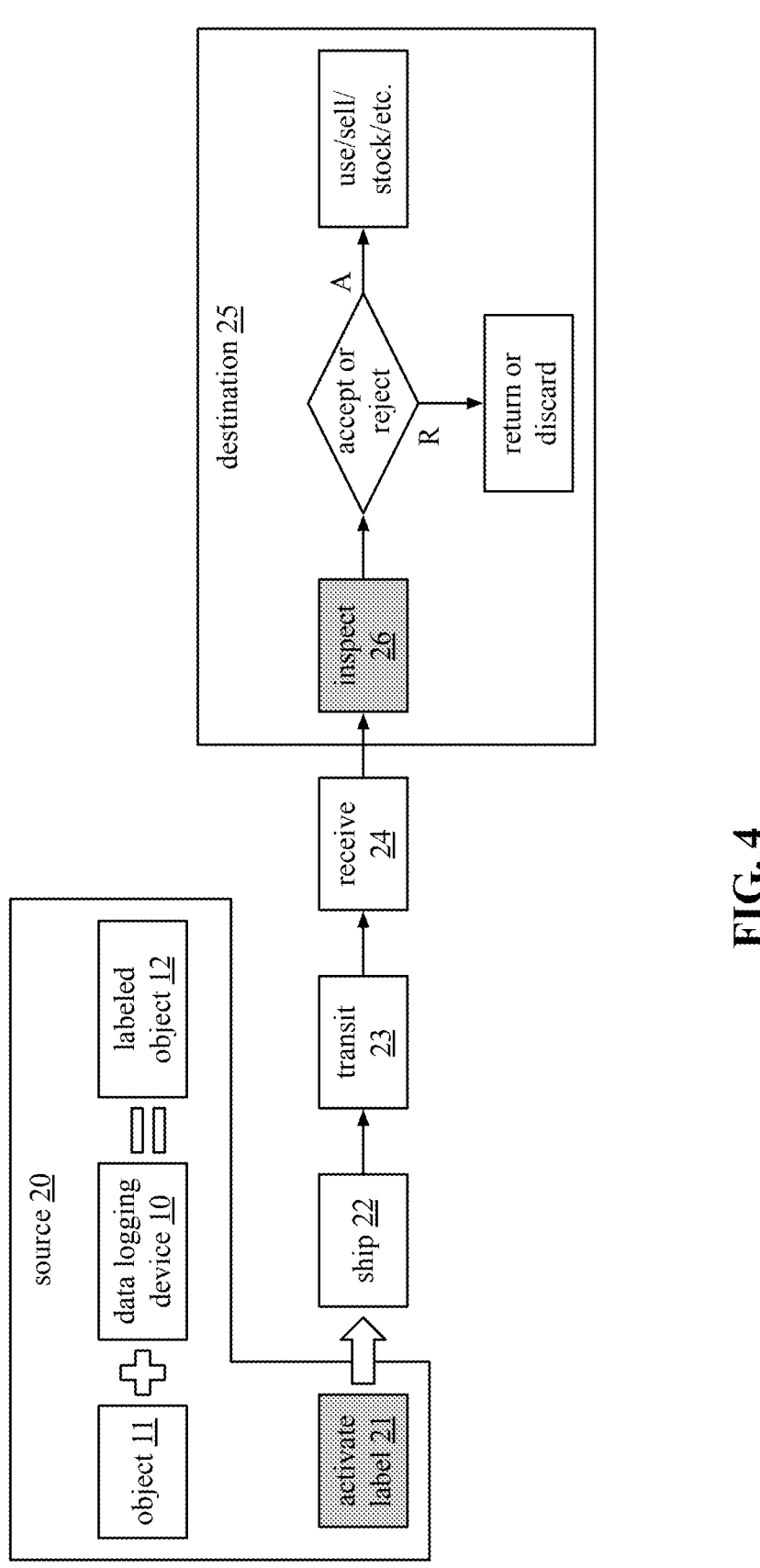
FIG. 4 is a schematic block diagram of an example of a labeled object being shipped from a source to a destination.

FIG. 1 is a schematic block diagram of an example of a data logging device 10 being coupled to an object 11 to create a labeled object 12. After the data logging device 10 has been coupled to an object 11 and activated, it logs data regarding the object. The data may be regarding one or more of a variety of conditions. For example, the data logging device records temperature data. As another example, the data logging device records light data. As yet another example, the data logging device records atmospheric pressure. As a further example, the data logging records moisture levels. As a still further example, the data logging device records physical pressure (e.g., pounds per square inch).

The data logging device 10 is further capable of determining whether it has been tampered with. When the data logging device has been tampered with in an unauthorized manner, the reliability of the data is drawn into question. In this instance, the data logging device 10 indicates that the data is suspect due to unauthorized tampering.

The data logging device 10 may be implemented in a variety of ways. For example, a plurality of data logging devices 10 are implemented on a sheet of flexible material (e.g., plastic, a film, paper, etc.) that includes an adhesive backing. The data logging devices 10 are individually removed from the sheet manually or in an automated process and attached to the object 11. As another example, a plurality of data logging devices 10 are implemented on a roll of flexible material (e.g., plastic, a film, paper, etc.) that includes an adhesive backing. The data logging devices 10 are individually removed from the roll manually or in an automated process and attached to the object 11.

As another example, the data logging device 10 is implemented on a rigid to somewhat rigid material (e.g., plastic, paper, cardboard, etc.). The rigid to somewhat rigid data logging device 10 may or may not include an adhesive backing. When it does, the data logging device 10 is adhered to the object 11. When the data logging device does not include the adhesive backing, it can be affixed to the object by a hanging apparatus (e.g., a hole in a section of the material and a flexible cord (e.g., string, hanging wire, etc.) strung through the hole).

The object 11 is a thing that is to be tracked. In an example, the object is a perishable item (e.g., food, medicine, chemical compound, an organ, blood, etc.) that should be kept in a controlled environment (e.g., one or more of controlled temperature, controlled moisture, controlled pressure, controlled ambient light, etc.) for a period of time (e.g., minutes to months). As another example, the object is an electronic component that has environment limits for operation (e.g., upper and/or lower limits for one or more of temperature, moisture, pressure, ambient light, etc.).

FIG. 2 is a schematic block diagram of an example of an unlabeled container 13 that contains labeled objects 12. In this example, a plurality of labeled objects 12 are being shipped in a container (e.g., a box) that does not include a data logging device. From source to destination, the data logging devices 10 of the labeled objects 12 record one or more conditions at desired time intervals. In addition, the data logging devices 10 interpret the data to determine if a conditional violation occurs (e.g., temperatures rises above a threshold).

If a condition violation occurs for a labeled object, the corresponding data logging device sets a violation indication (e.g., enables a red light) for easy detection of the violation. If, from source to destination, no violations occurred for a labeled object, the corresponding data logging device sets an okay indication (e.g., enables a green light) for easy detection that no violations occurred.

FIG. 3 is a schematic block diagram of an example of a labeled container 14 that contains unlabeled objects 11. In this example, the container (e.g., a box) includes a data logging device 10 and the objects 11 within the container do not include data logging devices. From source to destination, the data logging device 10 of the container 14 record one or more conditions at desired time intervals. In addition, the data logging device 10 interprets the data to determine if a conditional violation occurs.

In another example, the container and the objects include data logging devices 10. The sampling interval of the data logging device of the container maybe the same or different than the sampling interval of the data logging devices of the objects. For instance, the container will likely be more susceptible to condition changes than the objects within the container; as such, the sampling rate for the data logging device of the container is at a higher rate than the sampling rate of the data logging devices of the objects.

FIG. 4 is a schematic block diagram of an example of a labeled object 12 being shipped from a source 20 to a destination 25. At the source 20 (e.g., the manufacturer of the object 11), a data logging device 10 is associated with the object 11 to produce a labeled object 12. The data logging device 10 is associated with the object in a variety of ways. For example, the data logging device has an adhesive backed and is adhered to the object via an adhesive. As another example, the data logging device is taped to the object. As yet another example, the data logging device is mechanically secured to the object with hardware (e.g., a screw, a rivet, a pin, etc.).

When the data logging device is first associated with the object, the data logging device is inactive (e.g., fully turned off). The labeled object 12 may awaiting shipping from the source 20 to the destination 25 for a duration of seconds to months, or longer. When the labeled object 12 is prepared for shipping, the data logging device 10 is activated via a sequence of states as will be subsequently discussed with reference to at least FIGS. 31 and 32.

After the data logging device is activated, the labeled object is shipped 22 (e.g., leaves the source). The labeled object 12 is then in transit 23 until it is received 24 by the destination. While in transit, the labeled object 12 may be handed off one or more times and/or from one form of transportation to another. From the time of the data logging device 10 is activated 21 at the source 20 until the labeled object is received 24 at the destination, the data logging device 10 records data regarding one or more conditions at a sampling rate.

At the destination 25, the labeled object is inspected 26 via the data logging device 10. In one embodiment, the inspection is visual. For example, if a red light is active, then there was a condition violation and, if a green light is active, there was not a condition violation. The visual inspection may be done in an automated manner. As another example, a computing device reads stored data from the data logging device via a radio frequency (RF) communication (e.g., RFID communication protocol) to determine whether a condition violation has occurred or not.

As a result of the inspection 26, the destination 25 determines 26 whether to accept or reject the labeled object.

If the labeled object passed inspection, then the destination 25 will accept it and use it, sell it, add it to inventory or some other disposition of the labeled object. If the labeled object did not pass inspection, then the destination 25 will reject the labeled object and return it or discard it.

Figure 5:
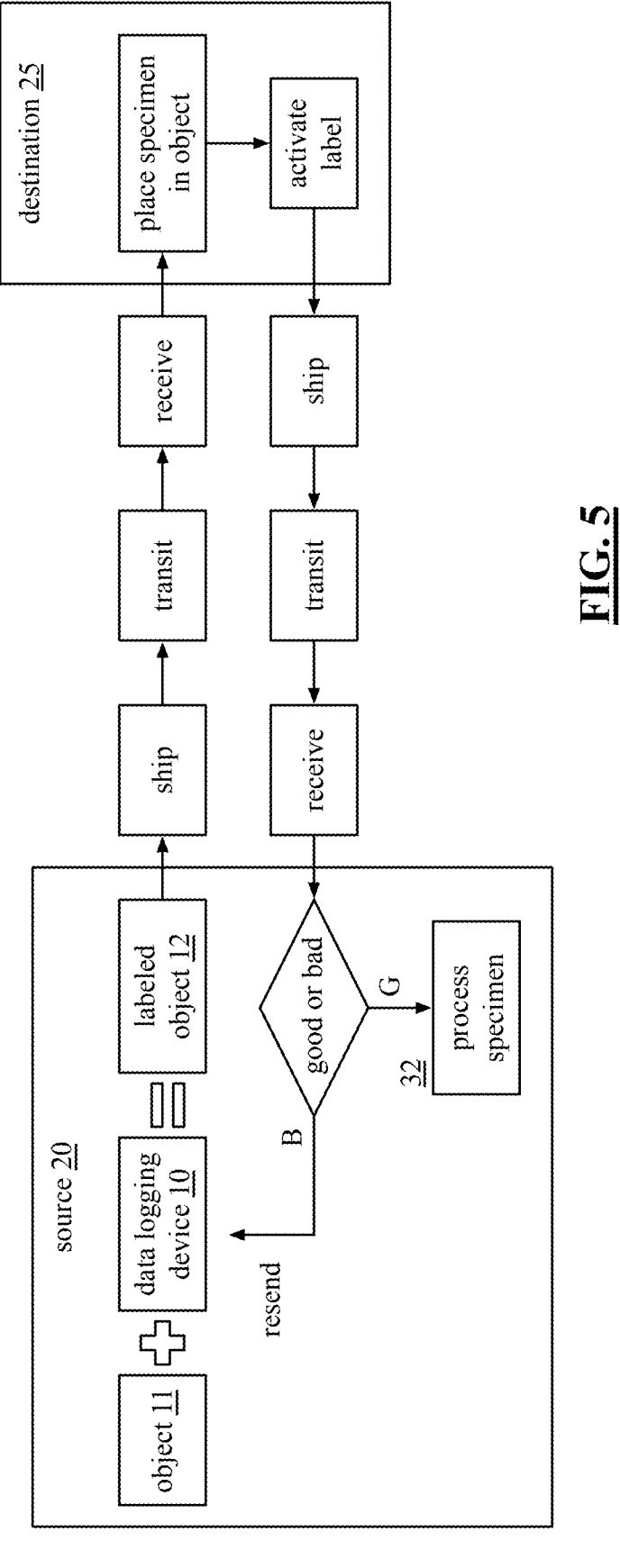
FIG. 5 is a schematic block diagram of an example of a labeled object being shipped between a source and a destination.

FIG. 5 is a schematic block diagram of an example of a labeled object 12 being shipped between a source 20 and a destination 25. In this example, the source is a testing lab, and the destination is an entity that provides a sample for testing. As a specific example, the source is a blood testing facility, and the destination is a doctor's office that takes blood samples from patients.

The data logging device 10 is coupled to an object 11, which may be a sample collection container (e.g., a test tube, a petri dish, etc.), to produce a labeled object 12. Without activation, the labeled object 12 is shipped to the destination 25. At the destination 25, a sample specimen is collected and placed in the sample collection container. Prior to shipping the labeled object to the source, the destination activates the data logging device. The data logging device is activated though a non-RF activation circuit and/or an RF activation circuit.

The source 20 inspects the received labeled object using a visual inspection (e.g., red light or green light activated) and/or an RF inspection (e.g., a data communication device, such as an RFID reader reads the data from the data logging device). If the inspection revealed that no condition violations occurred, the specimen is processed.

If the inspection reveals that a condition violation has occurred, the specimen is deemed to be "bad" (i.e., not testable). For a non-testable specimen, the source 20 has several options. One option is to send another labeled object is sent to the destination.

Figures 6, 7, 8, 9:
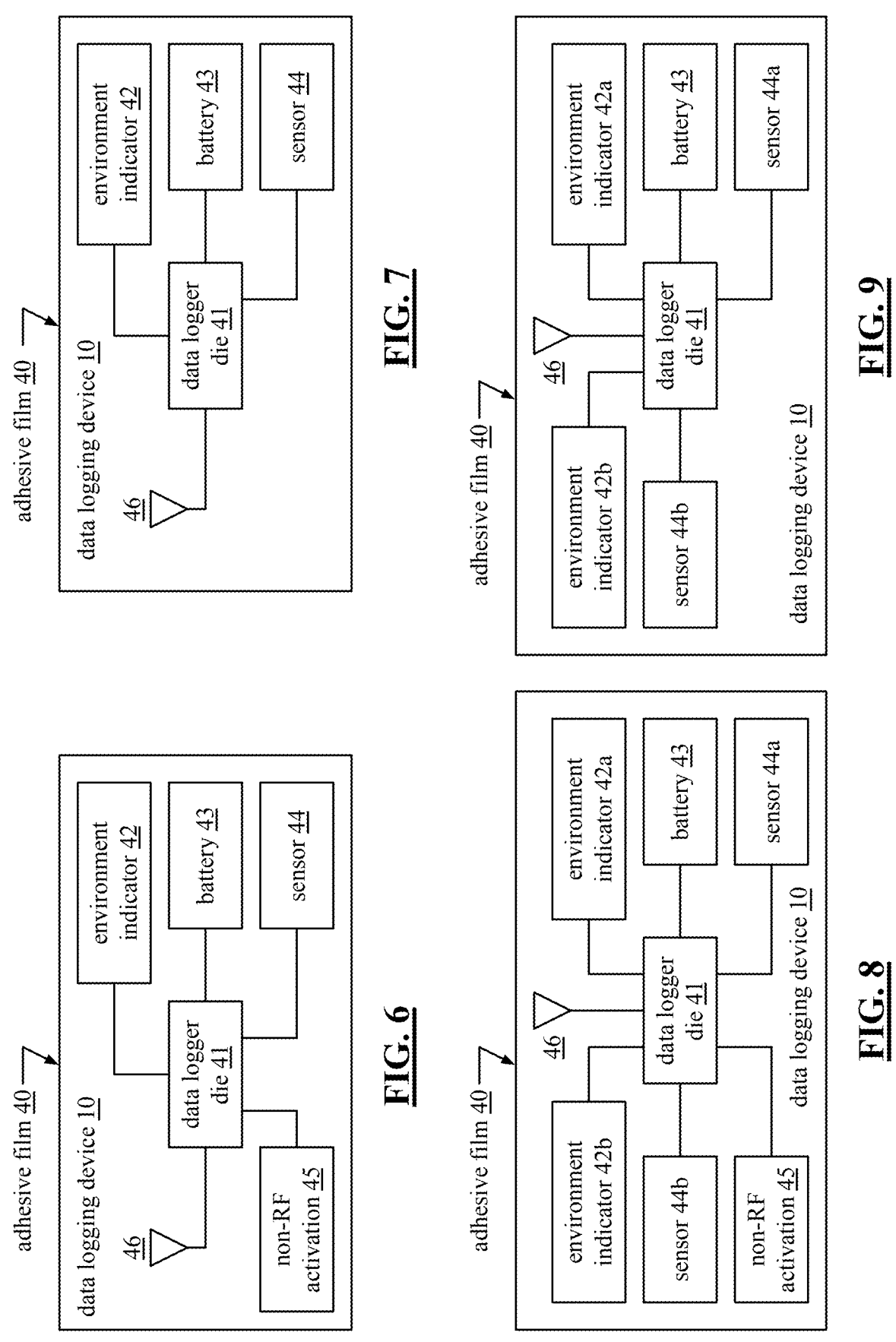
FIG. 6 is a schematic block diagram of an embodiment of a data logging device.
FIG. 7 is a schematic block diagram of another embodiment of a data logging device.
FIG. 8 is a schematic block diagram of another embodiment of a data logging device.
FIG. 9 is a schematic block diagram of another embodiment of a data logging device.

FIG. 6 is a schematic block diagram of an embodiment of a data logging device 10 that is implemented on an adhesive film 40. The adhesive film 40 includes a film and an adhesive backing applied to the film. The film is comprised of one or more of, but not limited to, polyethylene, vinyl, polyvinyl, polyester, plastic, etc. The film may be transparent, translucent, or opaque. It may be clear or colored (e.g., white, black, green, etc.). It may be glossy, matted, or mirrored. The adhesive may be a conventional adhesive that dries clear or opaque. The adhesive film 40 is adherable to an object via the adhesive backing.

The data logging device 10 includes a data logger die, or integrated circuit (IC) 41, an environmental indicator 42, a battery 43 (e.g., one or more batteries or one or more battery types), a sensor 44, a non-RF activation circuit 45, and an antenna 46. The non-RF activation circuit 45 activates the data logger die 41 to receive sensed values (e.g., a temperature value, a moisture value, a pressure value, a light value, etc.) from the sensor 44. The non-RF activation circuit 45 will be described in greater detail with reference to one or more of FIGS. 21 and 22.

The data logger die 41 interprets the sensed values for a condition violation (e.g., too warm, too cold, too much pressure, too little pressure, too much moisture, too little moisture, too much light, too little light, etc.). When the data logger die detects a condition violation, it generates a violation signal. The data logger die provides the violation signal to the environmental indicator 42, which provides a visual and/or audible indication of the condition violation.

When sensing by the sensor has successfully concluded and the data logger die did not identify a condition violation, the data logger die generates a non-violation signal. The data logger die provides the non-violation signal to the environmental indicator 42, which provides a visual and/or audible indication of no condition violations.

When the data logger die 41 includes memory for storing the sensed values it receives from the sensor, it stores the sensed values. The data logger die is capable of communicating the stored sensed values, the violation signal, and/or the non-violation signal with an RF reader via the antenna 46. Note that the data logger die 41 will be described in greater detail with reference to one or more of FIGS. 18, and 23-25 and the environmental indicator 42 will be described in greater detail with reference to one or more of FIGS. 18-20.

FIG. 7 is a schematic block diagram of another embodiment of a data logging device 10 that includes data logger die, or IC 41, an environmental indicator 42, a battery 43, a sensor 44, and an antenna 46. In comparison with the embodiment of FIG. 6, this embodiment does not include the non-RF activation circuit 45. In this embodiment, the data logger die 41 is activated via an RF signal received via the antenna 46.

FIG. 8 is a schematic block diagram of another embodiment of a data logging device 10 that includes a data logger die, or IC 41, a first environmental indicator 42a, a battery 43, a first sensor 44a, a non-RF activation circuit 45, an antenna 46, a second sensor 44b, and a second environmental indicator 42b. The data logger die processes sensed values of the second sensor to identify a condition violation. If one is detected, the data logger die generates a violation signal, which it provides at some point in time to the second environmental indicator.

The second environmental indicator, when active, provides a visual and/or audible indicator of a condition violation or no condition violations as sensed by the second sensor. In an alternate embodiment, the data logging device 10 includes just one environmental indicator and uses a different combination of visual and/or audible signaling to indicate a first sensed violation or not and a second sensed violation or not. As an example, the first sensor senses temperature and the second sensor senses moisture. If both temperature and moisture are good (i.e., no violations), the single indicator provides a green light. If there is a temperature violation, the single indicator provides a first flashing red light pattern, if there is a moisture violation, the single indicator provides a second flashing red light pattern, and if there is both a temperature and moisture violation, the single indicator provides a continuous red light.

FIG. 9 is a schematic block diagram of another embodiment of a data logging device 10 that includes a data logger die, or IC 41, a first environmental indicator 42a, a battery 43, a first sensor 44a, an antenna 46, a second sensor 44b, and a second environmental indicator 42b. In comparison with the embodiment of FIG. 8, the present embodiment does not include the non-RF activation circuit 45. As such, the data logger die 41 is activated via an RF signal received via the antenna 46.

Figure 10:
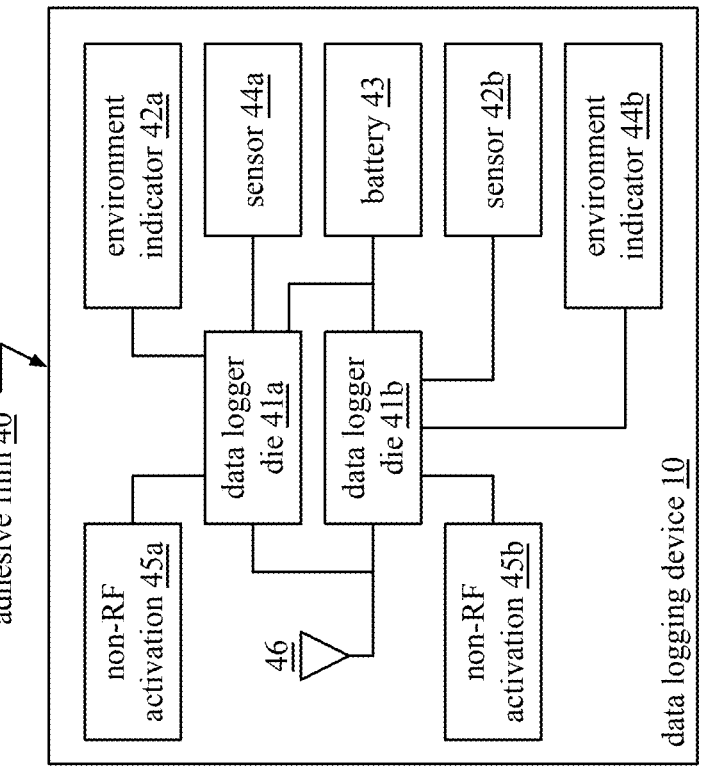
FIG. 10 is a schematic block diagram of another embodiment of a data logging device.

FIG. 10 is a schematic block diagram of another embodiment of a data logging device 10 that includes a first data logger die, or IC 41a, a second data logger die 41b, a first environmental indicator 42a, a battery 43, a first sensor 44a, a first non-RF activation circuit 45a, a second environmental indicator 42b, a second sensor 44b, a second non-RF activation circuit 45b, and an antenna 46. The first and second data logger die 41a and 41b share antenna 46 or they may each have their own antenna. Similarly, the first and second data logger die 41a and 41b share the battery 43 or they may each have their own battery.

The first data logger die 41a is associated with the first sensor 44a, the first non-RF activation circuit 45a, and the first environmental indicator 42a. The second data logger die 41b is associated with the second sensor 44b, the second non-RF activation circuit 45b, and the second environmental indicator 42b. In one specific embodiment, the two sections operate independently to sense and process their respective conditions. In another specific embodiment, the first data logger die 41a provides clock signals, sampling signals, and/or commands to the second data logger die 41b such that the second data logger die 41b is subordinate to the first.

In another embodiment, the data logging device 10 of FIG. 10 includes a single non-RF activation circuit that is coupled to one of the data logger dies. The one data logger die, when activated via the non-RF activation circuit, activates the other data logger die. In another embodiment or an extension of the preceding embodiment, the data logging device 10 of FIG. 10 includes a single environmental indicator.

Figure 11:
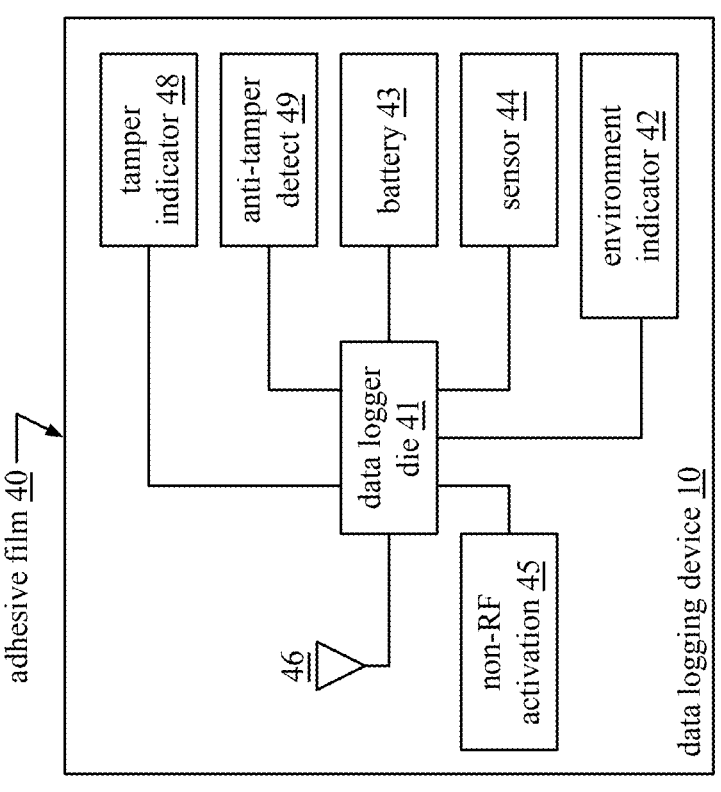
FIG. 11 is a schematic block diagram of another embodiment of a data logging device.

FIG. 11 is a schematic block diagram of another embodiment of a data logging device 10 that includes a data logger die, or IC 41, an environmental indicator 42, a battery 43, a sensor 44, a non-RF activation circuit 45, an antenna 46, an anti-tamper detection circuit 49, and a tamper indicator 48. The anti-tamper detection circuit 49 detects whether the data logging device 10 is being accessed in an unauthorized manner and, as a result of the unauthorized access, the reliability of the data stored by data logging device is suspect (i.e., cannot guarantee that it is has not been tampered with in an unauthorized manner).

When the anti-tamer detection circuit 49 detects an invalid access that raises questions about the integrity of the data, it generates a tamper violation signal. The data logger die processes the tamper violation signal and provides it to the tamper indicator 48. The tamper indicator 48 provides a visual and/or audible indication of the unauthorized tampering. Unauthorized tampering will be discussed in greater detail with reference to one or more of FIGS. 43-53C.

Figure 12:
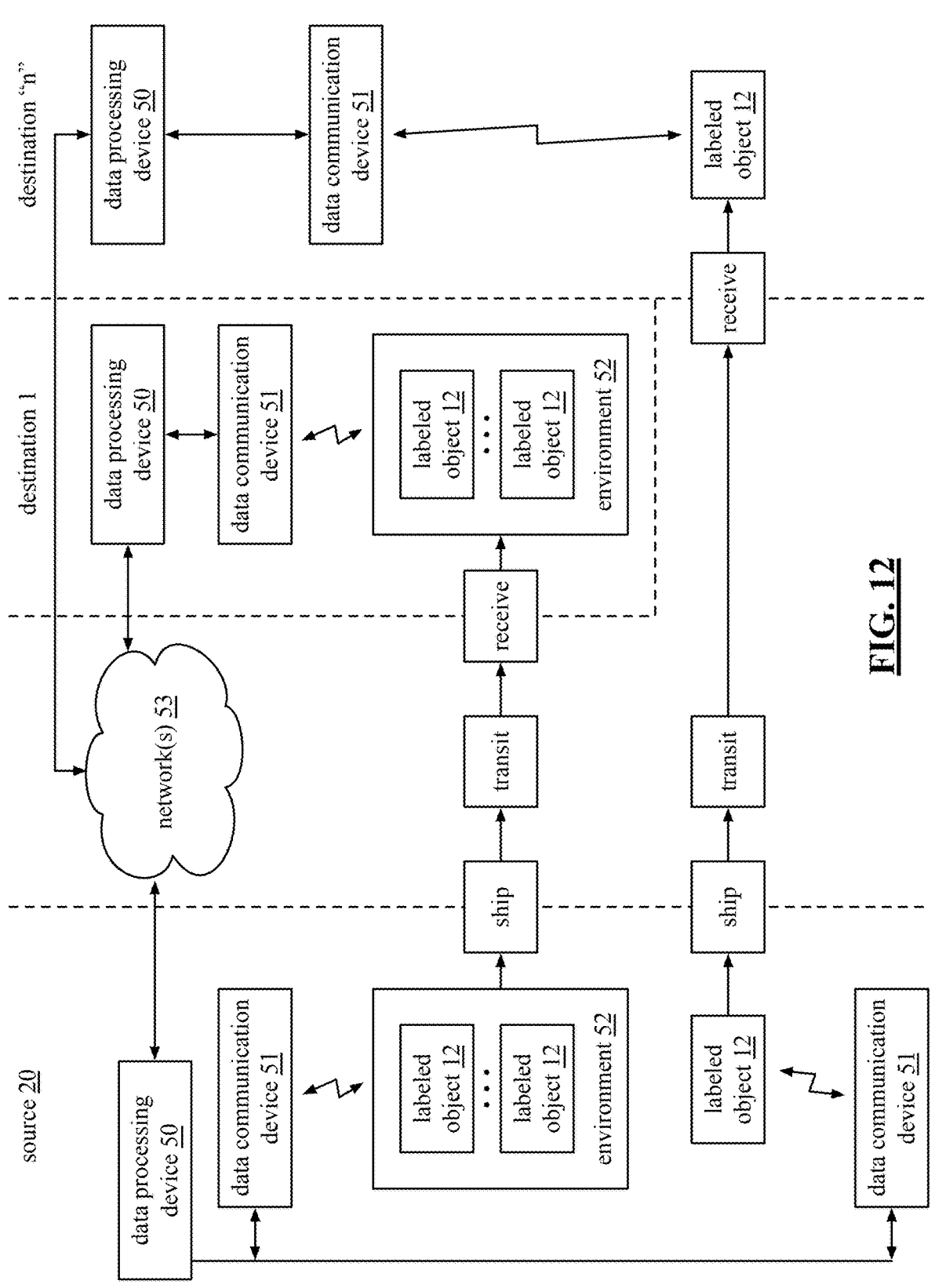
FIG. 12 is a schematic block diagram of an example of a communication system in which labeled objects are shipped from a source to destinations.

FIG. 12 is a schematic block diagram of an example of a communication system in which labeled objects 12 are shipped from a source 20 to destinations 1 through "n", where "n" in an integer equal to or greater than 2. The source 20, which may be a manufacturer, distribution center, medical laboratory, a hospital, a farm, a food source, or any facility or business that ships objects for which one or more conditions are to be monitored during shipping to a final destination. The source 20 includes a plurality of data communication devices 51, at least one data processing device 50, and a plurality of labeled objects 12 (e.g., an object with a data logging device associated with it).

Each destination 1-"n" includes a data processing device 50 and one or more data communication devices. A destination may be a distribution center, a doctor's office, a hospital, a store, a storage facility or any facility or business that receives as the final destination or an intermediary destination objects for which one or more conditions are to be monitored during shipping to a final destination. As a specific example, the source is a dairy farm; a first intermediary destination is a milk processing plant, a second intermediary destination is a distribution center, and a final destination is a grocery store. As described herein, an intermediary destination is both a source and a destination for shipping purposes and for monitoring data of a labeled object through a data communication device and a data processing device but, it does not affect the activating or deactivating of the labeled object; which is at the original source and the final destination respectively.

The data processing device 50 and each of the data communication devices 51 include one or more computing entities as will be discussed in greater detail with reference to one or more of FIGS. 16A-16E and 17A-17D. In an example, the data communication device 51 functions as an RF reader that communicates with the data logging device associated with an object. For instance, the data communication device 51 sends a command via an RF signal in accordance with an RFID (and/or an ISO) standard or protocol to the data logging device. The standard(s) includes a plurality of commands to which the data logging device is capable of processing, generating an appropriate response, and send it to the data communication device 51 via an RF signal.

The data communication device 51 further communicates non-RFID standard commands to the data logging device as described herein. One such non-RFID standard command is to instruct the data logging device to change its state. The various states of a data logging device will be described in greater detail with reference to one or more of FIGS. 31-33.

As a data communication device 51 communicates with a labeled object 12, the data communication device 51 communicates with the data processing device 50. For instance, the data processing device 50 instructs various data communication devices 51 as to when they are to communicate with labeled objects, what commands to issue, and what data to collect and send to the data processing device 50. The various data processing devices 50 are connected through a network 53, which includes one or more of a wide area network, a local area network, the internet, a cellular telephone network, etc.

Labeled objects 12 may be shipped in a shared environment 52 or not. A shared environment 52 may be a box, a carton, a shipping container, a truck bed, and/or some other enclosed space for which a condition (e.g., light, temperature, etc.) can be monitored.

As a labeled object is prepared for shipping, it is tracked by the source via a data communication device 51 and the data processing device 50. For example, once the data logging device is associated with an object, the location of the object within the source 20 can be tracked using RF communications. When the labeled object is ready for shipping, its data logging function is activated either via an RF command or via a non-RF activation circuit.

While the labeled object is in transit, the data logging device periodically records sampled condition data. When the labeled object receives a destination, the data logging device provides an indication of whether a condition violation occurred during shipping, transit, and/or receiving. Notification of the violation may be done via an RF signal to a data communication device 51 and/or a visual and/or audible indication (e.g., a red light). Non-violation notification is done in a similar way but using a different visual and/or audible indication (e.g., a green light). Each of the destinations are able to report the violation status of received objects back to the source via the network.

Figure 13:
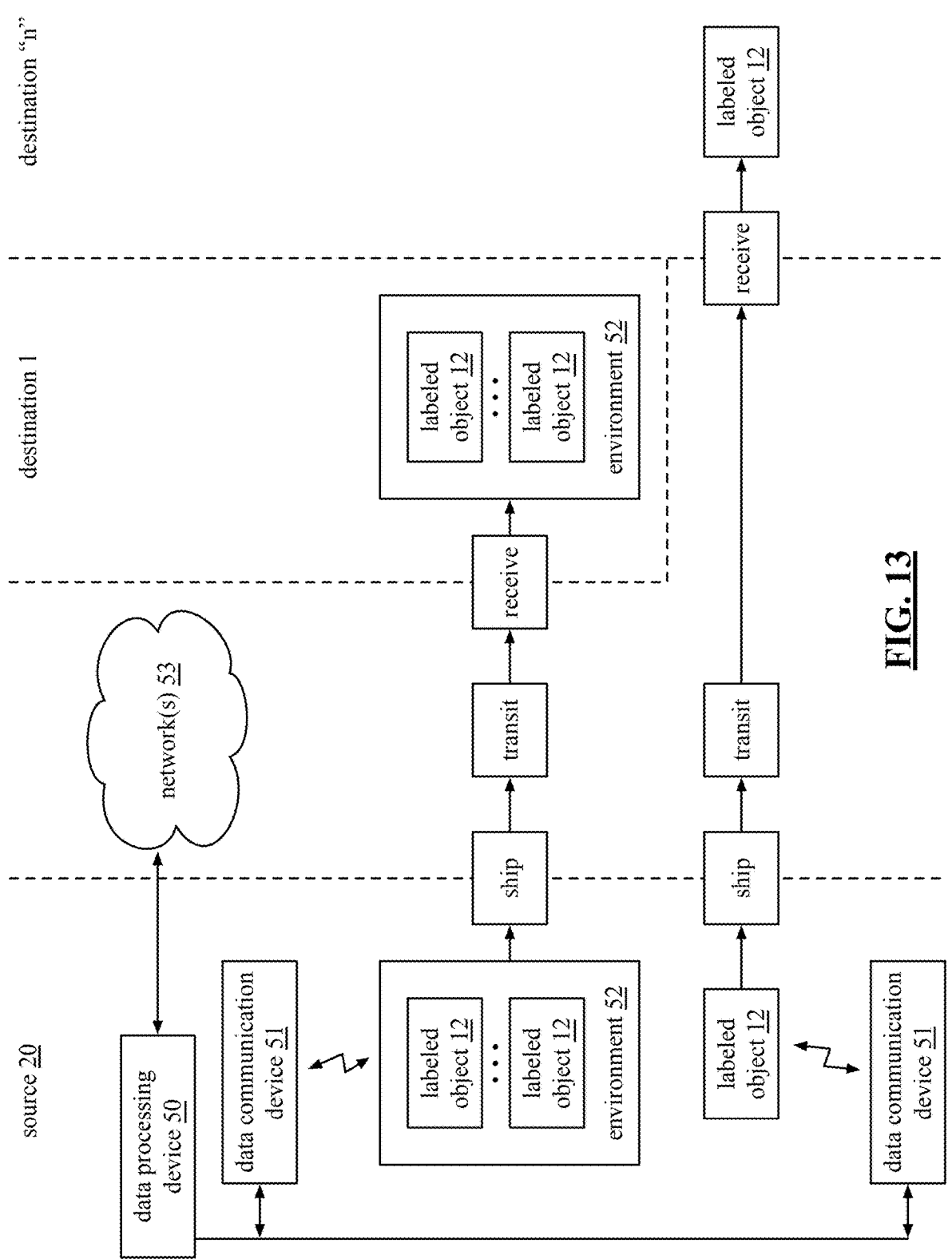
FIG. 13 is a schematic block diagram of another example of a communication system in which labeled objects are shipped from a source to destinations.

FIG. 13 is a schematic block diagram of another example of a communication system in which labeled objects 12 are shipped from a source 20 to destinations 1 through "n". This example is similar to that of FIG. 12 with a difference being the destinations do not include data communication devices 51 or data processing devices 50. As such, the indication of a condition violation or not is done via visual and/or audible means.

Figure 14:
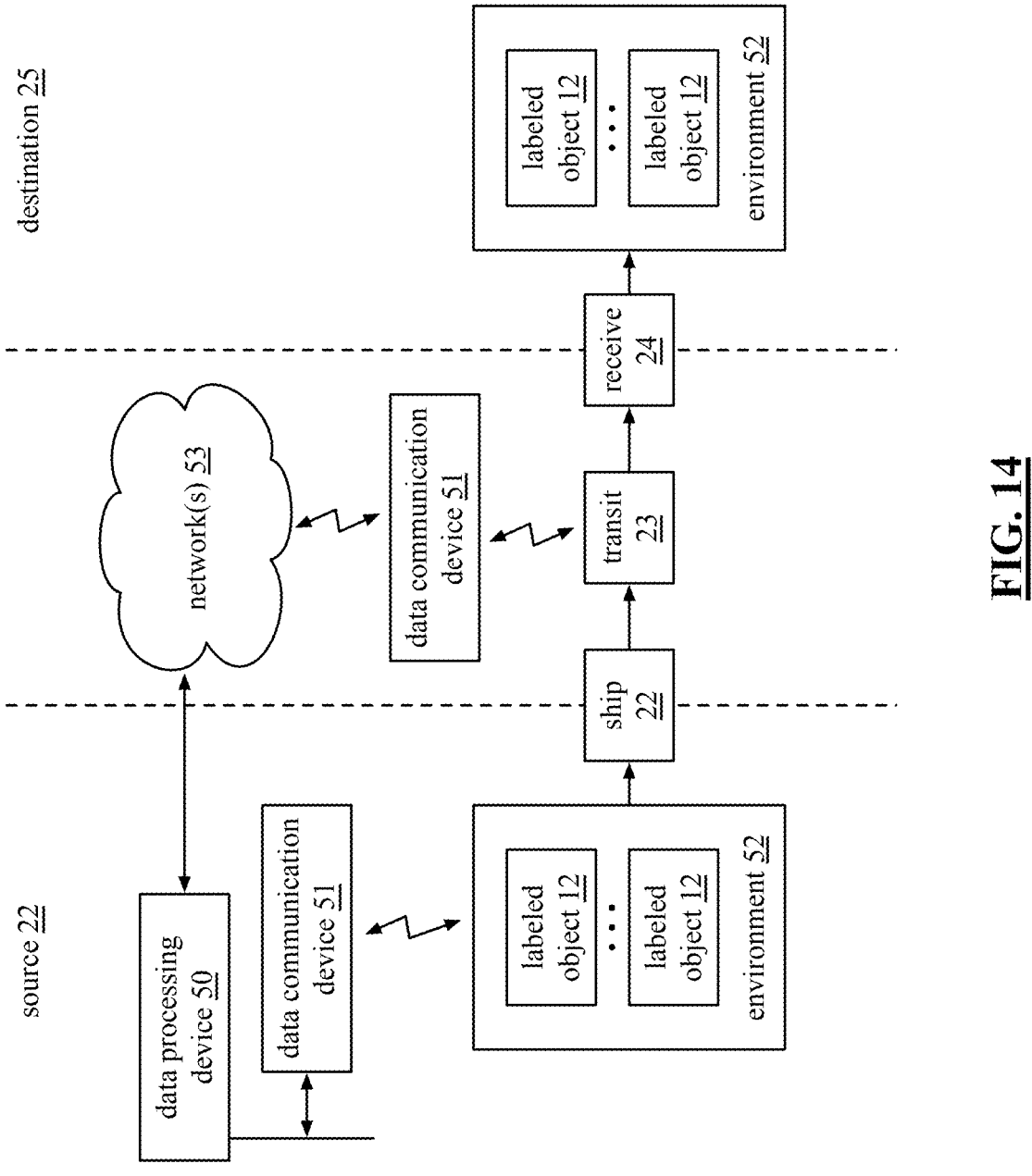
FIG. 14 is a schematic block diagram of another example of a communication system in which labeled objects are shipped from a source to destinations.

FIG. 14 is a schematic block diagram of another example of a communication system in which labeled objects 12 are shipped from a source 22 to a destination 25. The destination may or may not include data communication devices 51 or data processing devices 50 but the mode of transportation includes a data communication device 51. In this manner, the data communication device 51 can read data from the data logging devices and report the data back to the data processing device 50 of the source. This data may be used to adjust the condition of the transport vehicle (e.g., lower temperature, reduce light, increase moisture, etc.) to optimize the environment for the labeled objects.

Figure 15:
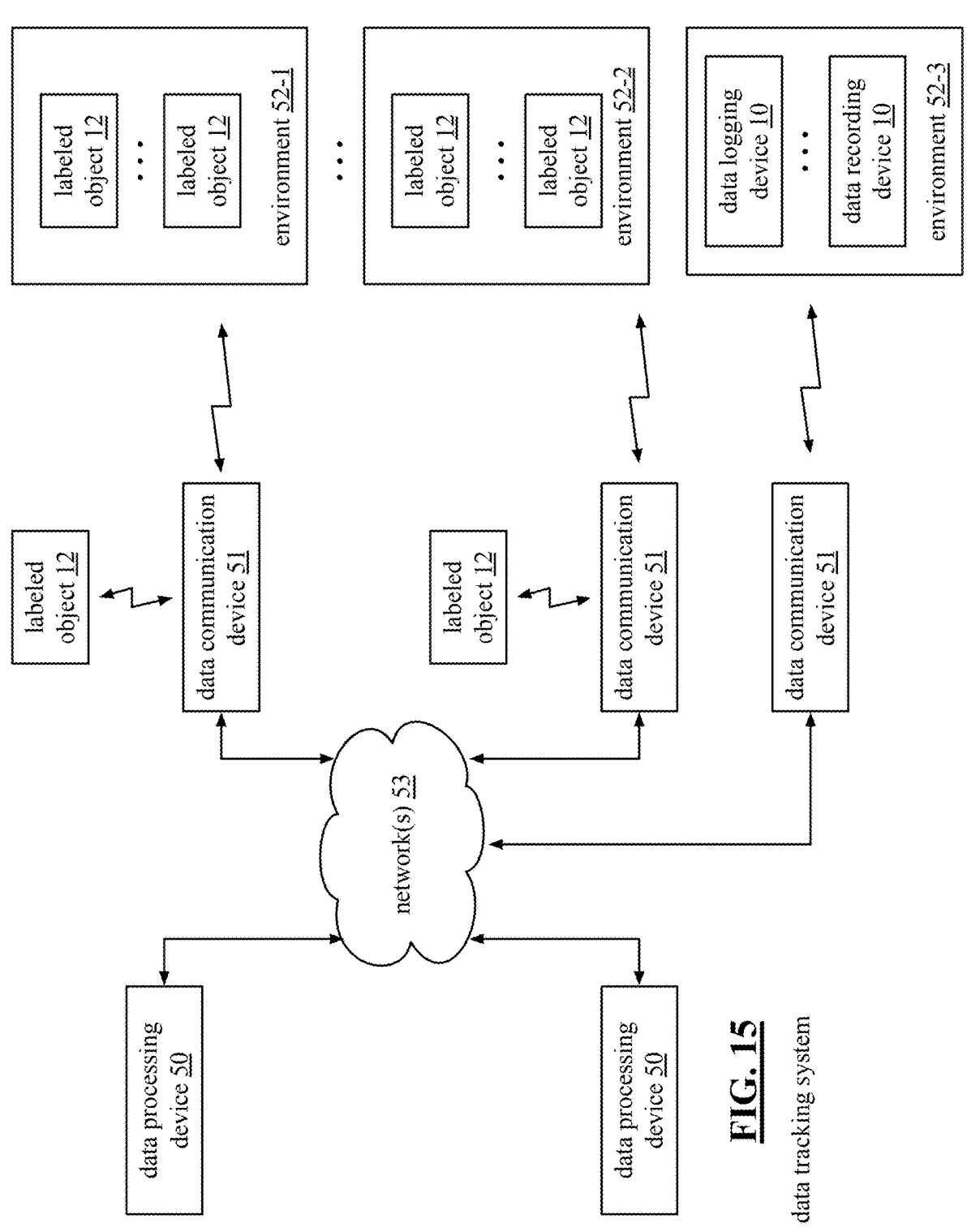
FIG. 15 is a schematic block diagram of another example of a communication system in which labeled objects are shipped from a source to destinations.

FIG. 15 is a schematic block diagram of another example of a data tracking system in which labeled objects 12 are tracked via data communication devices 51. The data communication devices 51 gather data from the labeled objects and communicate the data with one or more data processing devices 50 via the network 53. The processing device 50 processes the data of the labeled objects.

For example, a company includes a corporate headquarters where the data processing device(s) 50 is located and includes a plurality of distribution centers, which is where the data communication devices 51 and labeled objects are located. The conditions monitored by a data logging device of a labeled object include, but are not limited to, temperature, light, moisture, humidity, pressure, acceleration, oxygen levels, other gas levels, gyroscope measurements, etc. Such data is gathered by the data communication devices 51, sent to the data processing device 50, which determines if any of the label objects are experiencing, and/or have experienced, a condition violation (e.g., temperature violation).

Figures 16A, 16B, 16C, 16D, 16E:
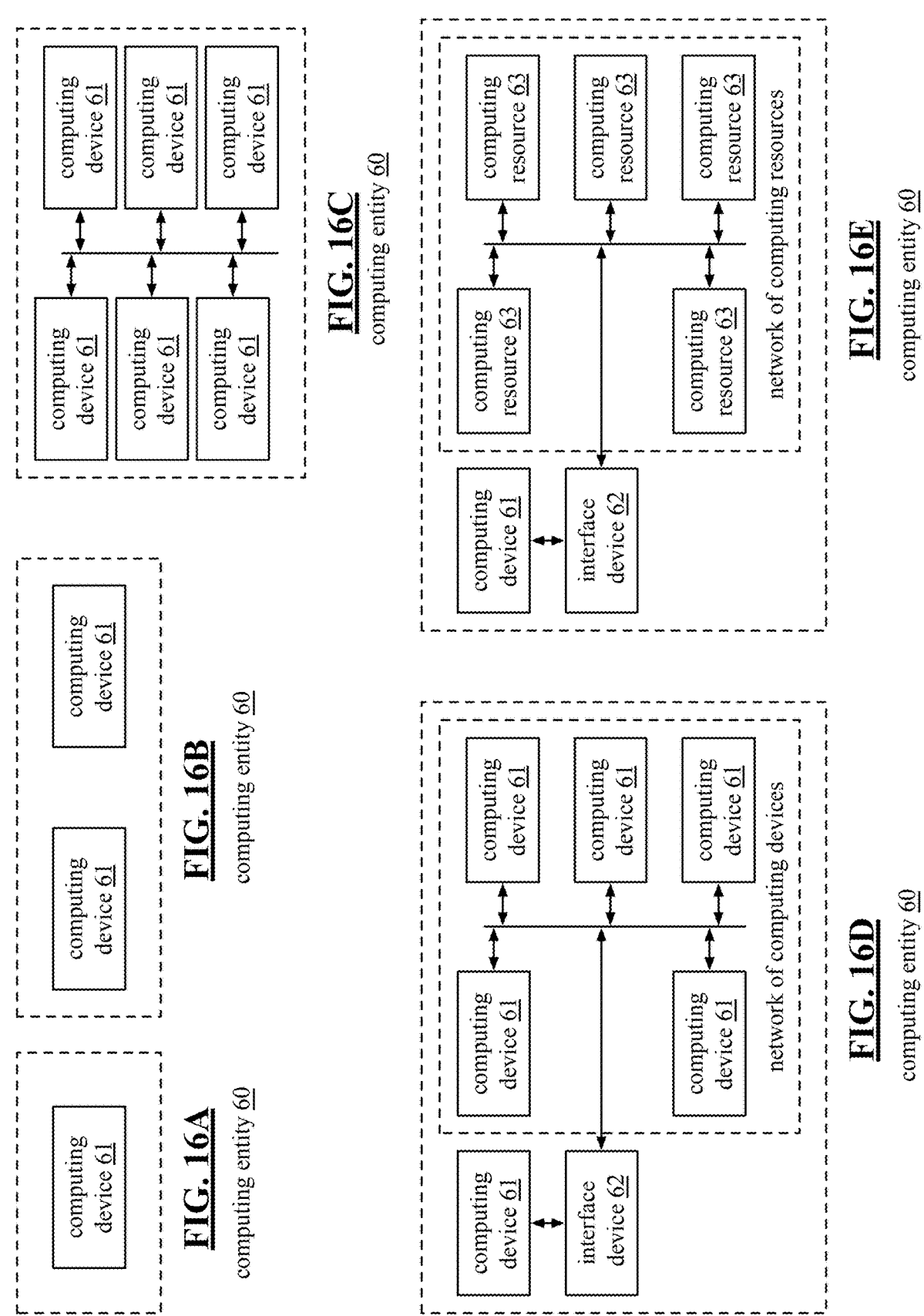
FIGS. 16A-16E are schematic block diagrams of examples of a computing entity operable in a communication system.

FIG. 16A is schematic block diagram of an embodiment of a computing entity 60 that includes a computing device 61 (e.g., an embodiment as shown in one or more of FIGS. 17A-17D). A computing device may function as a user computing device, a server, a system computing device, a data storage device, a data security device, a networking device, a user access device, a cell phone, a tablet, a laptop, a printer, a game console, a satellite control box, a cable box, etc.

FIG. 16B is schematic block diagram of an embodiment of a computing entity 60 that includes two or more computing devices 61 (e.g., two or more from any combination of the embodiments of FIGS. 17A-17D). The computing devices 61 perform the functions of a computing entity in a peer processing manner (e.g., coordinate together to perform the functions), in a master-slave manner (e.g., one computing device coordinates and the other support it), and/or in another manner.

FIG. 16C is schematic block diagram of an embodiment of a computing entity 60 that includes a network of computing devices 61 (e.g., two or more from any combination of the embodiments of FIGS. 17A-17D). The computing devices are coupled together via one or more network connections (e.g., WAN, LAN, cellular data, WLAN, etc.) and preform the functions of the computing entity.

FIG. 16D is schematic block diagram of an embodiment of a computing entity 60 that includes a primary computing device 61 (e.g., any one of the computing devices of FIGS. 2A-2D), an interface device 62 (e.g., a network connection), and a network of computing devices 61 (e.g., one or more from any combination of the embodiments of FIGS. 17A-17D). The primary computing device utilizes the other computing devices as co-processors to execute one or more the functions of the computing entity, as storage for data, for other data processing functions, and/or storage purposes.

FIG. 16E is schematic block diagram of an embodiment of a computing entity 60 that includes a primary computing device 61 (e.g., any one of the computing devices of FIGS.

17A-17D), an interface device (e.g., a network connection) 62, and a network of computing resources 63 (e.g., two or more computing resources from any combination of the embodiments of FIGS. 17A-17D). The primary computing device utilizes the computing resources as co-processors to execute one or more of the functions of the computing entity, as storage for data, for other data processing functions, and/or storage purposes.

Figure 17A:
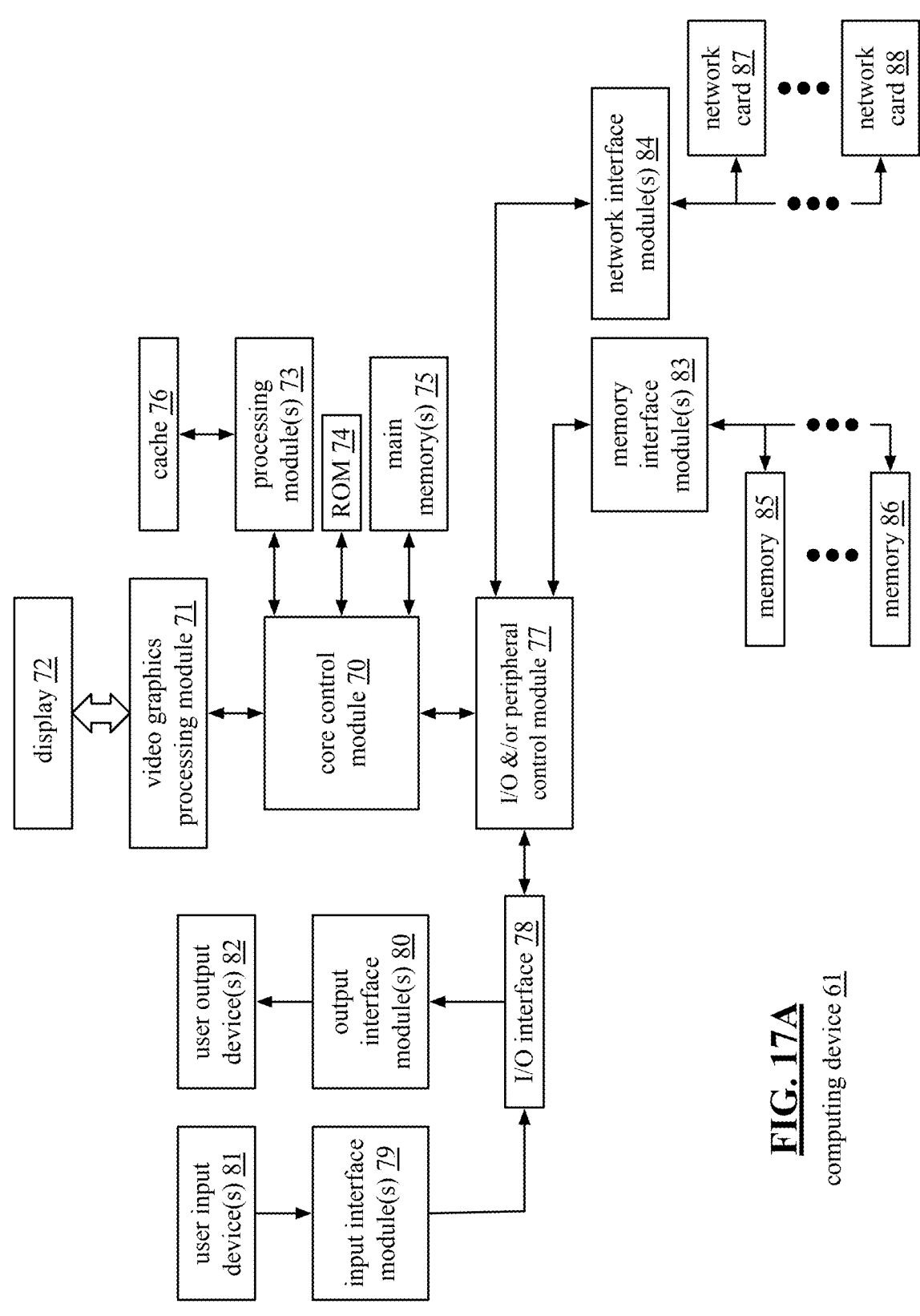
FIGS. 17A-17D are schematic block diagrams of examples of a computing device of a computing entity.

FIG. 17A is a schematic block diagram of an embodiment of a computing device 61 that includes a plurality of computing resources. The computing resource include a core control module 70, one or more processing modules 73, one or more main memories 75, a read only memory (ROM) 74 for a boot up sequence, cache memory 76, a video graphics processing module 71, a display 72 (optional), an Input-Output (I/O) peripheral control module 77, an I/O interface module 78, one or more input interface modules 79, one or more output interface modules 80, one or more network interface modules 83, and/or one or more memory interface modules 84. A processing module 73 is as described in greater detail at the end of the detailed description section and, in an alternative embodiment, has a direction connection to the main memory 75. In an alternate embodiment, the core control module 70 and the I/O and/or peripheral control module 77 are one module, such as a chipset, a quick path interconnect (QPI), and/or an ultra-path interconnect (UPI).

Each of the main memories 75 includes one or more Random Access Memory (RAM) integrated circuits, or chips. For example, a main memory 75 includes four DDR4 ($4^{th}$ generation of double data rate) RAM chips, each running at a rate of 2,400 MHz. In general, the main memory 75 stores data and operational instructions most relevant for the processing module 73. For example, the core control module 70 coordinates the transfer of data and/or operational instructions between the main memory 75 and the memory 85-86. The data and/or operational instructions retrieve from memory 85-86 are the data and/or operational instructions requested by the processing module or will most likely be needed by the processing module. When the processing module is done with the data and/or operational instructions in main memory, the core control module 70 coordinates sending updated data to the memory 85-86 for storage.

Each of the memory 85-86 includes one or more hard drives, one or more solid state memory chips, and/or one or more other large capacity storage devices that, in comparison to cache memory and main memory devices, is/are relatively inexpensive with respect to cost per amount of data stored. The memory 85-86 is coupled to the core control module 70 via the I/O and/or peripheral control module 77 and via one or more memory interface modules 83. In an embodiment, the I/O and/or peripheral control module 77 includes one or more Peripheral Component Interface (PCI) buses to which peripheral components connect to the core control module 70. A memory interface module 83 includes a software driver and a hardware connector for coupling a memory device to the I/O and/or peripheral control module 77. For example, a memory interface 83 is in accordance with a Serial Advanced Technology Attachment (SATA) port.

The core control module 70 coordinates data communications between the processing module(s) 73 and the network(s) via the I/O and/or peripheral control module 77, the network interface module(s) 84, and a network card 87 or 88. A network card 87 or 88 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 84 includes a software driver and a hardware connector for coupling the network card to the I/O and/or peripheral control module 77. For example, the network interface module 84 is in accordance with one or more versions of IEEE 802.11, cellular telephone protocols, 10/100/1000 Gigabit LAN protocols, etc.

The core control module 70 coordinates data communications between the processing module(s) 73 and input device(s) 81 via the input interface module(s) 79, the I/O interface 78, and the I/O and/or peripheral control module 77. An input device 81 includes a keypad, a keyboard, control switches, a touchpad, a touch screen, a microphone, a camera, etc. An input interface module 79 includes a software driver and a hardware connector for coupling an input device to the I/O and/or peripheral control module 77. In an embodiment, an input interface module 79 is in accordance with one or more Universal Serial Bus (USB) protocols.

The core control module 70 coordinates data communications between the processing module(s) 73 and output device(s) 82 via the output interface module(s) 80 and the I/O and/or peripheral control module 77. An output device 82 includes a speaker, auxiliary memory, headphones, a touch screen, etc. An output interface module 80 includes a software driver and a hardware connector for coupling an output device to the I/O and/or peripheral control module 77. In an embodiment, an output interface module 80 is in accordance with one or more audio codec protocols.

The processing module 73 communicates directly with a video graphics processing module 71 to display data on the display 72. The display 72 includes an LED (light emitting diode) display, an LCD (liquid crystal display), and/or other type of display technology. The display has a resolution, an aspect ratio, and other features that affect the quality of the display. The video graphics processing module 71 receives data from the processing module 73, processes the data to produce rendered data in accordance with the characteristics of the display, and provides the rendered data to the display 72.

Figure 17B:
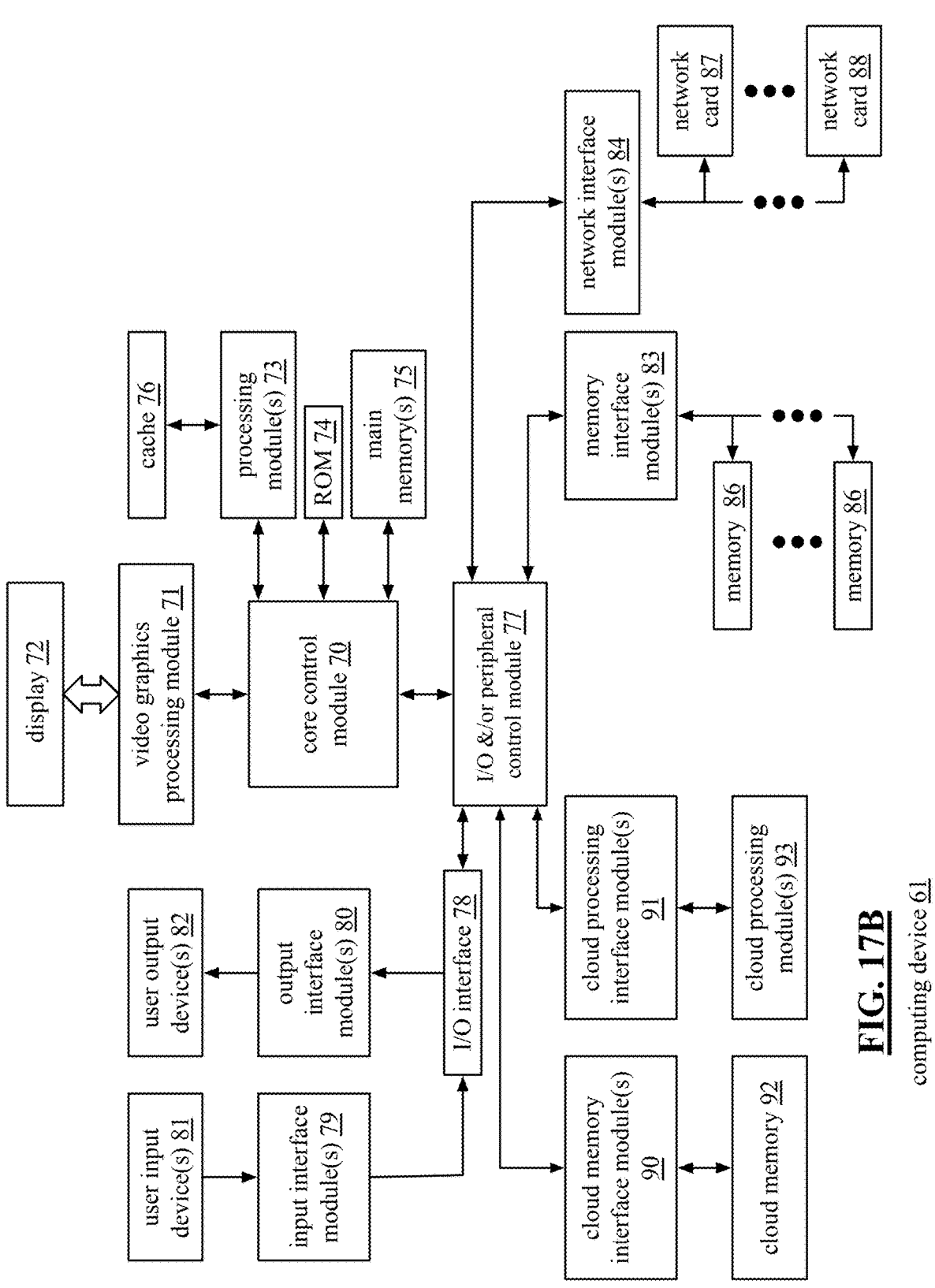

FIG. 17B is a schematic block diagram of an embodiment of a computing device 61 that includes a plurality of computing resources similar to the computing resources of FIG. 17A with the addition of one or more cloud memory interface modules 90, one or more cloud processing interface modules 91, cloud memory 92, and one or more cloud processing modules 93. The cloud memory 92 includes one or more tiers of memory (e.g., ROM, volatile (RAM, main, etc.), non-volatile (hard drive, solid-state, etc.) and/or backup (hard drive, tape, etc.)) that is remoted from the core control module and is accessed via a network (WAN and/or LAN). The cloud processing module 93 is similar to processing module 73 but is remoted from the core control module and is accessed via a network.

Figure 17C:
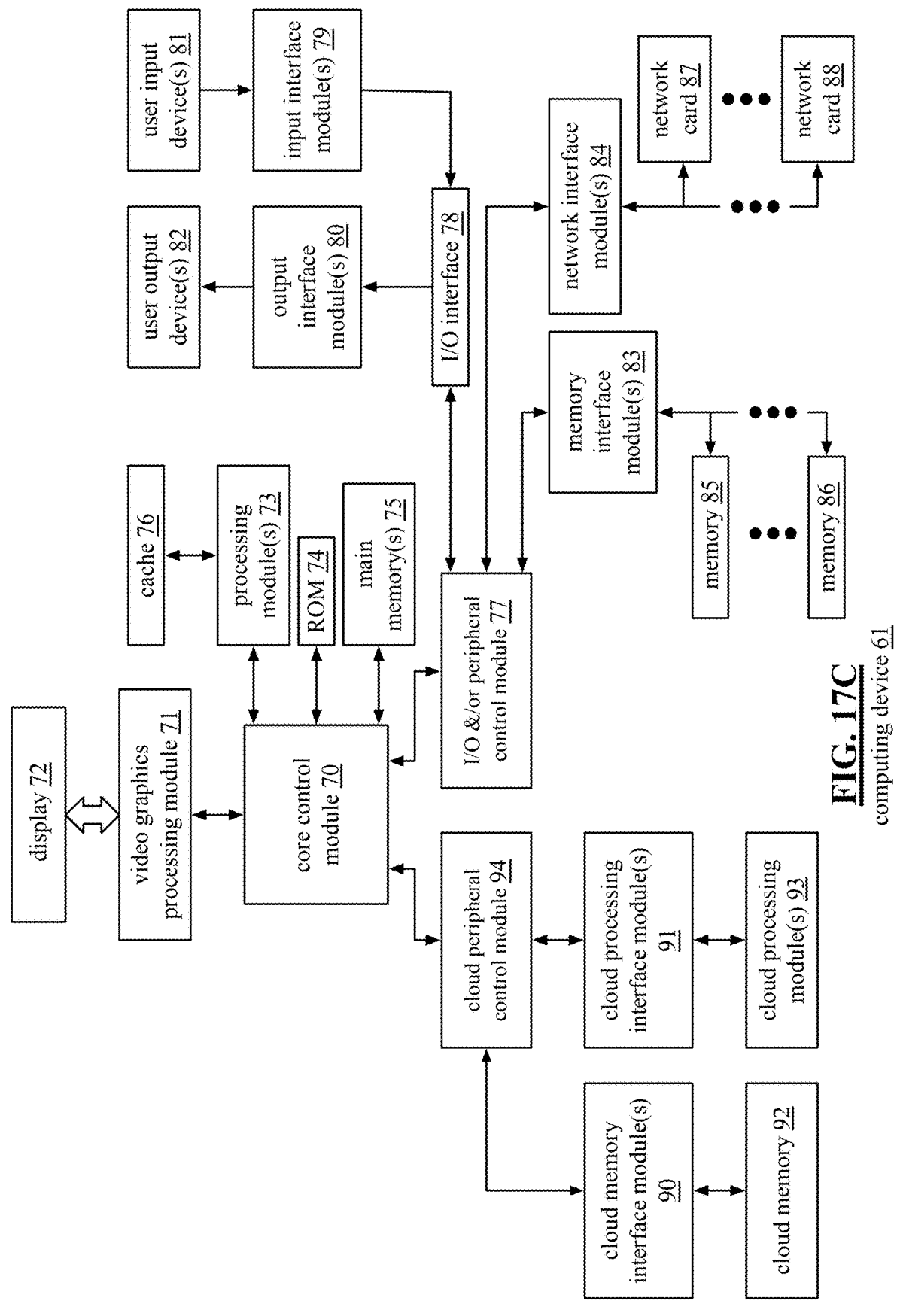

FIG. 17C is a schematic block diagram of an embodiment of a computing device 61 that includes a plurality of computing resources similar to the computing resources of FIG. 17B with a change in how the cloud memory interface module(s) 90 and the cloud processing interface module(s) 91 are coupled to the core control module 70. In this embodiment, the interface modules 90 and 91 are coupled to a cloud peripheral control module 94 that directly couples to the core control module 70.

Figure 17D:
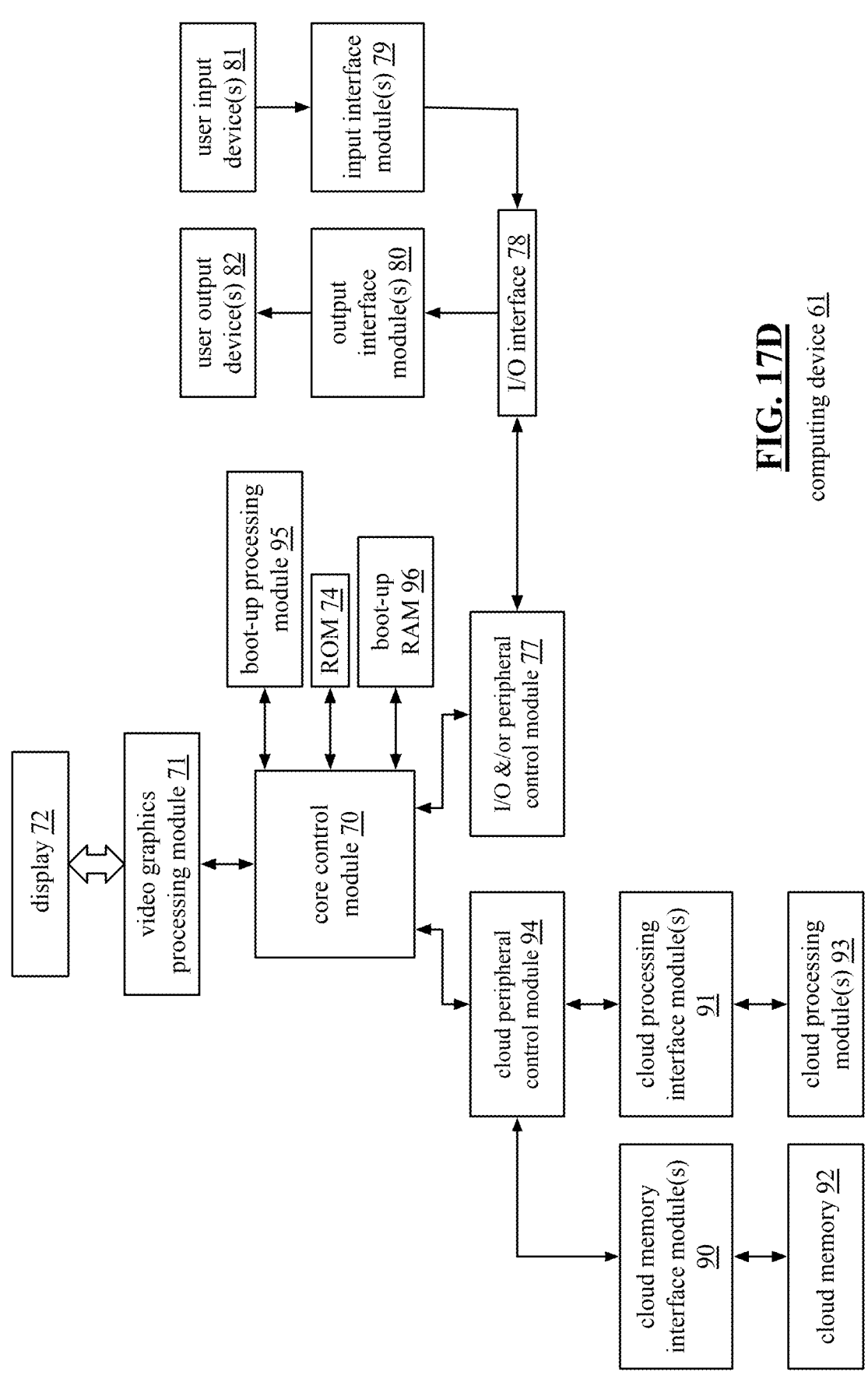

FIG. 17D is a schematic block diagram of an embodiment of a computing device 61 that includes a plurality of computing resources, which includes include a core control module 70, a boot up processing module 95, boot up RAM 96, a read only memory (ROM) 74, a video graphics processing module 71, a display 72 (optional), an Input-Output (I/O) peripheral control module 77, one or more input interface modules 80, one or more output interface modules 79, a cloud peripheral control module 94, one or more cloud memory interface modules 90, one or more cloud processing interface modules 91, cloud memory 92, and cloud processing module(s) 93.

In this embodiment, the computing device 61 includes enough processing resources (e.g., module 95, ROM 74, and RAM 96) to boot up. Once booted up, the cloud memory 92 and the cloud processing module(s) 93 function as the computing device's memory (e.g., main and hard drive) and processing module.

Figure 18:
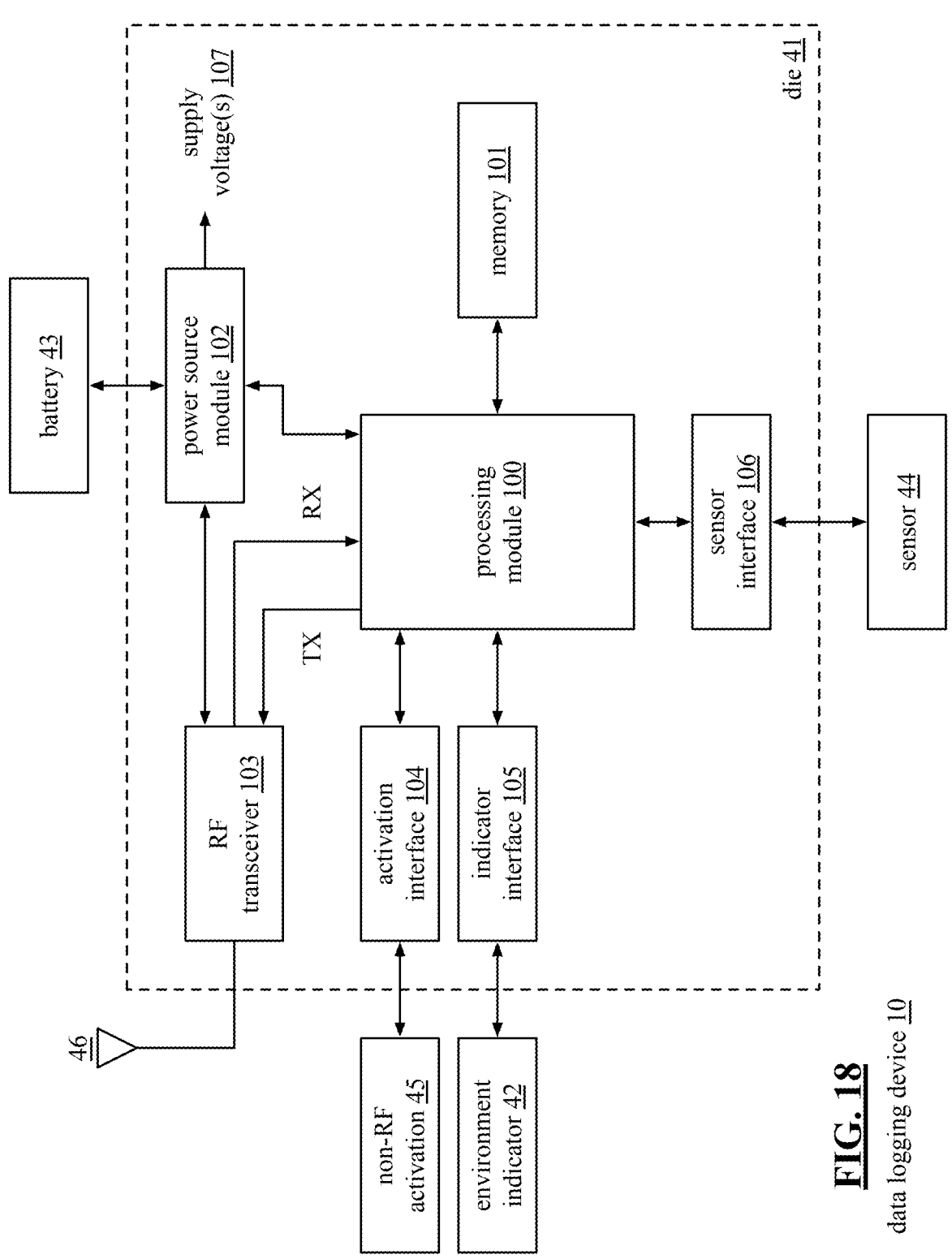
FIG. 18 is a schematic block diagram of another embodiment of a data logging device.

FIG. 18 is a schematic block diagram of another embodiment of a data logging device 10 that includes a die, or IC, 41, an environmental indicator 42, a battery 43, a sensor 44, a non-RF activation circuit 45, and an antenna 46. The die 41 includes a processing module 100, memory 101, a power source module 102, an RF transceiver 103, an activation interface 104, an indicator interface 105, and a sensor interface 106.

The battery 43 includes one or more cells (e.g., lithium cell, silver oxide and alkaline cell, zinc air cell, etc.) that has a capacity of at least 100 micro-amp-hours. The battery 43 may have a rigid structure or a flexible structure. When the battery 43 is coupled to the die, the data logging device enters a sleep mode. In the sleep mode, the data logging device 10 draws very little power (e.g., a few nano amps).

The power source module 102 is coupled to the battery 43, when it is installed, to the processing module 100, and to the RF transceiver 103. The power source module 102 generates one or more voltages 107 (e.g., 0.5 volts, 1.0 volts, 1.5 volts, 3.3 volts, etc.) from the battery and/or from a received RF signal. The power source module 102 will be described in greater detail with reference to one or more of FIGS. 26-29 and FIGS. 54-56.

The RF transceiver 103 includes a receiver section and a transmitter section. In an embodiment, the RF transceiver 103 is constructed in accordance with one or more RFID (ISO) communication standards. As such, the transceiver 103 receives a continuous wave signal that is provided to the power source module 102, which generates one or more voltages 107 therefrom. The transceiver 103 also receives RF command signals that are provided to the power source module 102. In addition, the transceiver 103 down converts the RF command signals into baseband or low intermediate frequency (IF) signals (RX signals) that are provided to the processing module 100.

The processing module 100 provides transmit baseband or low IF signals (TX signals) to the transceiver 103. Using a backscatter transmission scheme, the transceiver 103 transmits the TX signals as RF signals to a data communication device (e.g., device 51 of FIG. 12). The TX signals are often responses to commands of the RX signals (e.g., send data, confirm writing of data, update a configuration, etc.).

The data logging device 10 may be activated via the non-RF activation circuit 45 or via an RF signal received via the RF transceiver. When the non-RF activation circuit 45 (which will be described in greater detail with reference to FIGS. 21 and 22) detects some form of physical activation, it produces an activation signal. The non-RF activation circuit 45 provides the activation signal to the activation interface 104, which provides the activation signal or a representation thereof to the processing module.

The activation interface 104 includes one or more physical conductors that couple to the non-RF activation circuit 45. The activation interface 104 may further include firmware to adjust the signal level of the activation signal before it is sent to the processing module 100. For example, the activation interface 104 includes firmware for conformance with one or more of a low-voltage differential signaling protocol, a serial port protocol, a UART (universal asynchronous receiver-transmitter) protocol, an i2C protocol, etc.

When the data logging device 10 is in a logging mode (which will described in greater detail with reference to one or more of FIGS. 31-33), the processing module 100 periodically receives sample data from the sensor 44 via the sensor interface 106. The processing module 100 sets the rate for the periodic sampling of the sensor 44 based on one or more factors. For example, the processing module 100 sets the sampling rate based on a command received by a data communication device. As another example, the processing module sets the sampling rate based on stored configuration data.

As yet another example, the processing module sets the sampling rate based on analysis of previous sample data. As a further example, the sampling rate is set based on the nature of the object (e.g., more perishable objects have a higher sampling rate than less perishable objects), based on the mode of transportation (e.g., a refrigerated container on a train would have a lower sampling rate that a refrigerated truck), based on the number of times the secured environment is accessed during transit (e.g., the more times its access, the higher the sampling rate), etc.

The sampling of the sensor 44 is done in a push fashion or a pull fashion. In a push fashion, the sensor 44 sends a data sample to the processing module 100 without prompting from the processing module. In a pull fashion, the sensor 44 sends a data sample to the processing module 100 with prompting from the processing module. The data sample traverses through the sensor interface 106, which includes one or more physical conductors that coupled to the sensor 44. The sensor interface 106 may further include firmware to adjust the signal level of the data conveyed between the sensor 44 and the processing module 100. For example, the sensor interface 106 includes firmware for conformance with a low-voltage differential signaling protocol, a serial port protocol, a UART (universal asynchronous receiver-transmitter) protocol, an i2C protocol, etc.

When enabled, the processing module 100 timestamps the data sample it receives from the sensor and stores it. The processing module 100 also interprets the data sample to determine if the value of the data sample indicates a condition violation (e.g., too warm, too cold, too moist, too dry, too much pressure, too little pressure, etc.). When the processing module 100 determines that a condition violation has occurred, it sets a violation flag. In an embodiment, once the violation flag is set it cannot be reset.

In addition, the processing module generates a violation signal that it provides to the environmental indicator 42 via the indicator interface 105. The indicator interface 105 includes one or more physical conductors that couple to the environmental indicator 42. The indicator interface 105 may further include firmware to adjust the signal level and/or polarity of the activation signal before it is sent from the processing module 100 to the environmental indicator 42. For example, the indicator interface 105 includes firmware for conformance with one or more of a low-voltage differential signaling protocol, a serial port protocol, a UART (universal asynchronous receiver-transmitter) protocol, an i2C protocol, etc.

The environmental indicator 42, which may be video display, one or more LEDs, and/or a speaker, provides a visual and/or audible indication of the condition violation. Various embodiments of the environmental indicator 42 and the indicator interface 105 are described with reference to FIGS. 19 and 20. The processing module 100 may provide the condition violation signal to the environmental indicator 42 at different times. For example, the processing module provides the condition violation signal after expiration of a data logging timer, which will be described with reference to one or more subsequent figures. As another example, the processing module provides the condition violation signal at the time of violation.

When a condition violation for a data sample is not detected, the condition violation flag remains not set. When the data logging timer expires (e.g., which may be done based on a count-down clock or end logging signal received at the final destination of the labeled object) and the condition violation flag is not set, the processing module generates a non-violation signal and provides it to the environmental indicator 42. The indicator 42 provides a visual and/or audible indication that no condition violations occurred during the data logging time period.

Figures 19, 20:
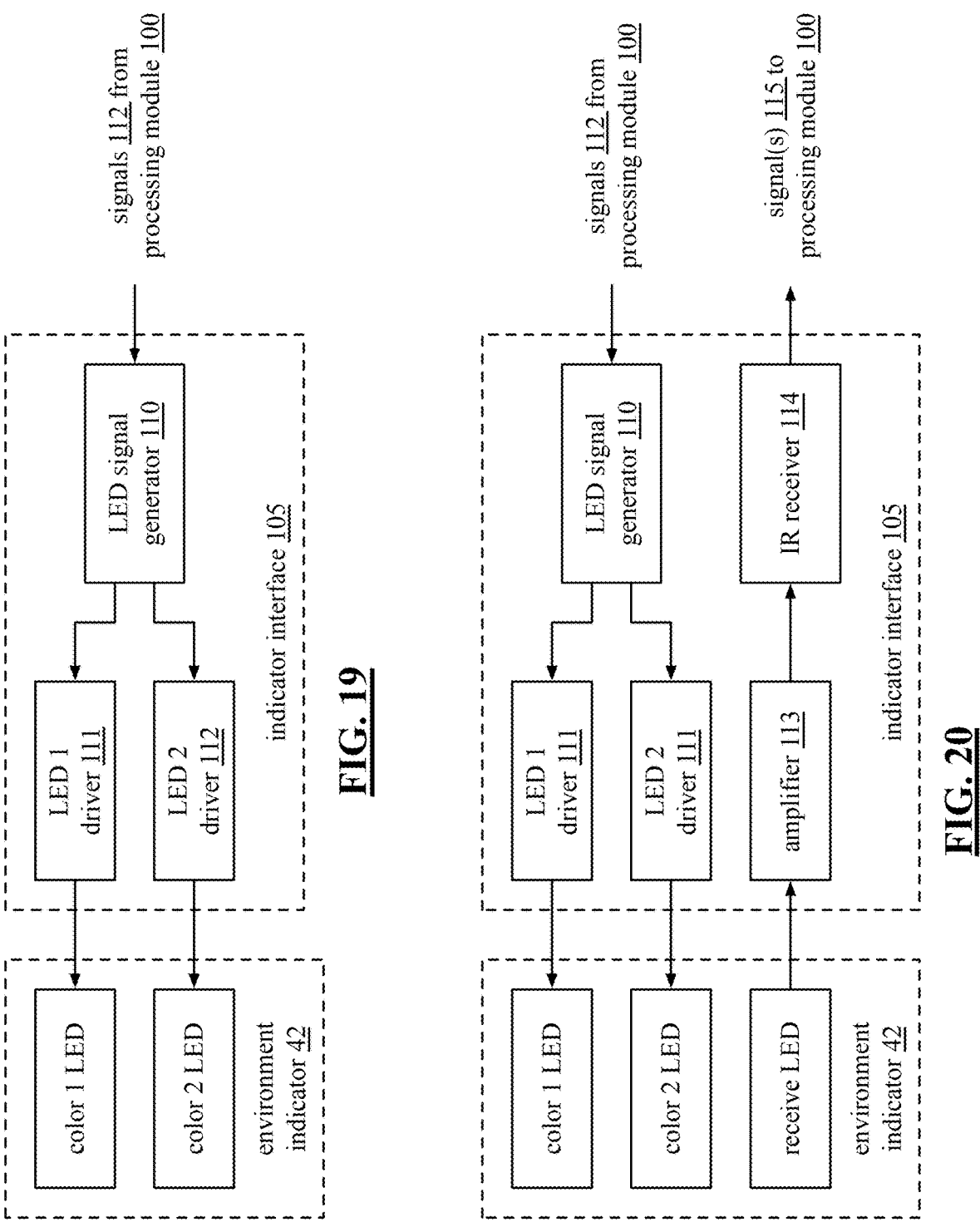
FIG. 19 is a schematic block diagram of an embodiment of an environmental indicator and an indicator interface of a data logging device.
FIG. 20 is a schematic block diagram of another embodiment of an environmental indicator and an indicator interface of a data logging device.

FIG. 19 is a schematic block diagram of an embodiment of an environmental indicator 42 and an indicator interface 105 of a data logging device 10. In this embodiment, the environmental indicator 42 includes two LEDs (light emitting diodes) with different colored lenses (e.g., red and green). The indicator interface 105 includes a first LED driver 111, a second LED driver 112, and an LED signal generator 110. In an alternate embodiment, the LED signal generator 110 is implemented by the processing module 100.

Using different combination of enabling the LEDs of the environmental indicator 42, different information is conveyed to the user of the data logging device. For example, a first pattern of enabling one or more of the LEDs indicates the enablement/activation of a real time clock (e.g., three on-off cycles of one of the LEDs). As another example, a second pattern of enabling one or more of the LEDs indicates the enablement/activation of the data logging mode (e.g., two on-off cycles of both LEDs). As a further example, a third pattern of enabling one or more of the LEDs indicates a low power mode (e.g., a few seconds of on-off cycles with the off period being much greater than the on period).

As a still further example, a fourth pattern of enabling one or more of the LEDs indicates the enablement of the MTP (multiple-time programmable) memory (e.g., a one second flash of one of the LEDs). As a still further example, a fifth pattern of enabling one or more of the LEDs indicates a condition violation (e.g., repeated flashing of the red LED or continuous illumination of the red LED). As a still further example, a sixth pattern of enabling one or more of the LEDs indicates a no condition violations (e.g., repeated flashing of the green LED or continuous illumination of the green LED). As a still further example, a seventh pattern of enabling one or more of the LEDs indicates no data logging or missing battery (e.g., no illumination of the LEDs).

The activation of the LEDs may be triggered through the non-RF activation circuit 45 after the data logging device has been enabled/activated (note that enabled and activated and versions thereof are used interchangeably). For example, the non-RF activation circuit 45 senses a human touch. The detection is provided to the processing module 100, which generates an appropriate signal 112, which is converted into the appropriate signal pattern by the LED signal generator 110. The drivers 111 and 112 generate a drive signal based on the signal pattern generated by the signal generator 110 to illuminate the corresponding LEDs to a desired brightness.

The activation of the LEDs may be triggered in response to a received RF signal. The processing module processes the received signal to produce an activation command. In response to the activation command, the processing module generates signal 112, which the LEDs render visibly as previously described.

FIG. 20 is a schematic block diagram of another embodiment of an environmental indicator 42 and an indicator interface 105 of a data logging device 10. This embodiment is similar to the embodiment of FIG. 19 with the additions of a receive LED in the environmental indicator 42, an amplifier 113 and an IR (infrared) receiver 114 in the indicator interface 105. The first and second colored LEDs and the corresponding indicator interface 105 function as discussed with reference to FIG. 19.

The receive LED (e.g., a photo diode) is operable to receive a light signal that is formatted in accordance with an IR communication protocol (e.g., IrDA—infrared data association protocols) and/or other proprietary communication. As the receive LED receives a light signal, its voltage changes. The voltage change is amplified by the amplifier 113 to produce an amplified signal. the IR receiver 114 converts, in accordance with an IR communication protocol, the amplified signal into a digital signal 115 and sends it to the processing module 110.

The IR communication path enables the data logging device 10 to communication with a data communication device (e.g., device 51 of FIG. 12) via IR in addition to RF communications. With multiple wireless communication options, secure communications between the data logging device and the data communication device is enhanced (e.g., reduces the risk of hacking and/or unauthorized access by five percentage or more in comparison to a single wireless communication path). For example, communication from the data communication device to the data logging device is done via IR communication and the communication from the data logging device to the data communication device is done via RF communication, or vice versa.

In another embodiment or in an extension of the above-described embodiment, the receive LED and/or one of the color LEDs is used as a transmit LED. In this instance, the indicator interface includes an IR transmitter to convert a digital signal from the processing module into an IR protocol compliant signal and a driver to drive the transmitting LED with the IR protocol compliant signal.

Figure 21A:
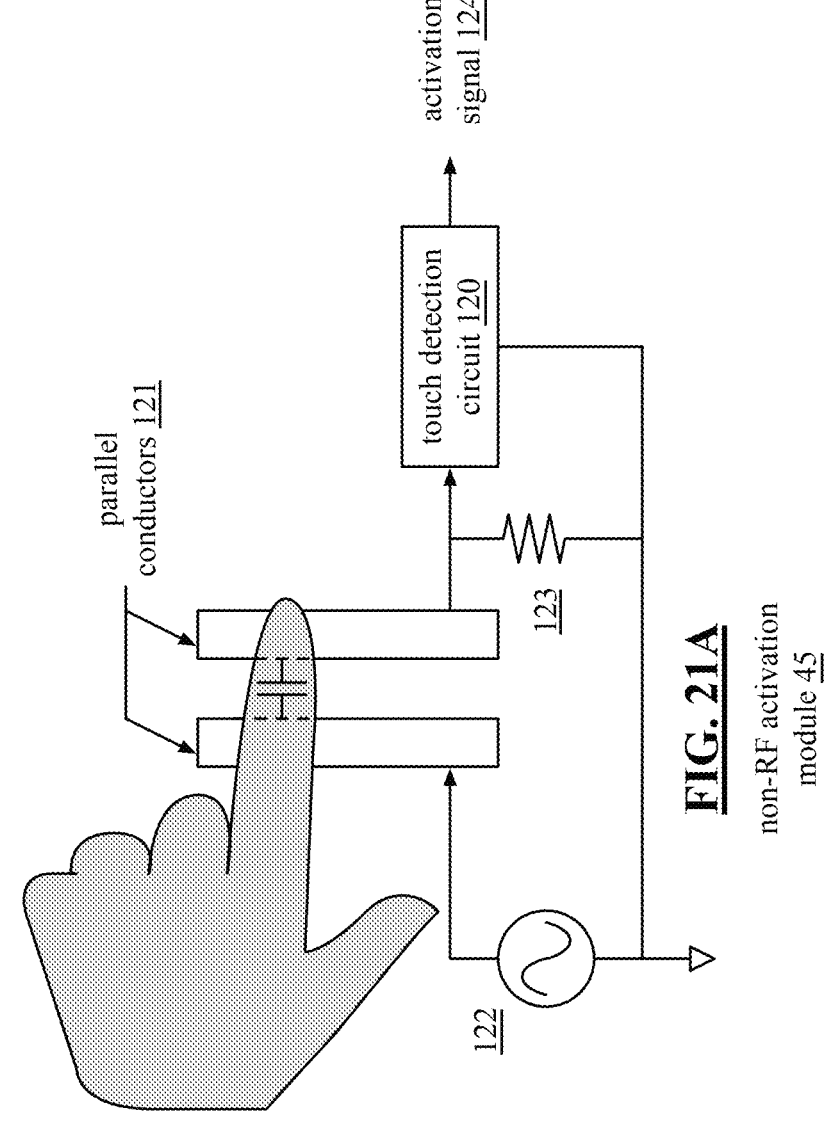
FIG. 21A is a schematic block diagram of an embodiment of a non-RF activation module of a data logging device.

FIG. 21A is a schematic block diagram of an embodiment of a non-RF activation module 45 of a data logging device 10. The non-RF activation module 45 includes an AC signal source 122, parallel conductors 121, a resistors 123 and a touch detection circuit 120. The AC signal source 122 may be implemented in a variety of ways. For example, the AC signal generation 122 is implemented as a stand-alone oscillation circuit (e.g., a crystal oscillator, a digital frequency synthesizer, etc.). In another example, the AC signal source 122 is a function of the processing module and/or of the clock circuit, which produces an AC voltage as a function of the RTC and/or of the system clock.

The parallel conductors form a capacitor that has a very low capacitance in comparison to the capacitance of a person. For example, the capacitance of a human finger is about 2 pF (pico-Farads) and the capacitance of the parallel conductors is at most 0.2 pF.

When a finger is applied across the conductors, the impedance of the finger in parallel with the capacitance of the conductors goes down. As such, the voltage across the resistor goes up. When the voltage across the resistor exceeds a threshold, the touch detection circuit 120 generates an activation signal 124. Once the processing module processes the activation signal, the non-RF activation module 45 can be turned off.

As a specific example of the non-RF activation circuit 45, the resistor has a resistance of a 5 Mega-Ohm, the AC signal source produces a sinusoidal signal of 10 mV (milli-volts) RMS at a frequency of 40 KHz. The capacitance of the parallel conductors is 0.2 pF. The impedance of the capacitance of the parallel conductors at 40 KHz is 20 Mega-Ohms. Thus, the voltage across the resistor is 5/25 of the 10 mV rms signal or 2 mV.

When a finger is across the parallel conductors, the capacitance increases to 2.2 pF, which has an impedance of 1.82 Mega-Ohms at 40 KHz. The voltage across the resistor is now 5/6.82 of the 10 mV rms signal or 7.33 mV. The touch detection circuit 120 detects the change in voltage across the resistor and generates the activation signal 124. Prior to a finger touch, the non-RF signal draws about 0.4 nA and about 4 nA when the touch occurs.

The touch detection circuit 120 may be implemented in a variety of ways. For example, the touch detection circuit 120 includes an operational amplifier or comparator that compares the voltage across the resistor with a threshold voltage. The output of the operational amplifier provides the activation signal 124. As another example, the touch detection circuit 120 includes a latch that latches a logic 1 signal when the voltage across the resistor exceeds a threshold. As yet another example, the touch detection circuit 120 includes a sample and hold circuit that is triggered when the voltage across the resistor exceeds a threshold.

In another embodiment, the touch detection circuit 120 detects a change in the RC time constant (RC=1/2πf) of the resistor and capacitor of the parallel conductors when a finger is applied. In this instance, the AC signal source 120 provides a square wave pulse signal. For each pulse, the touch detection circuit 120 determines the RC time constant. When the RC time constant increases due to the increase in capacitance of the finger, the touch detection circuit 120 sets the activation signal.

Figures 21B, 21C, 22:
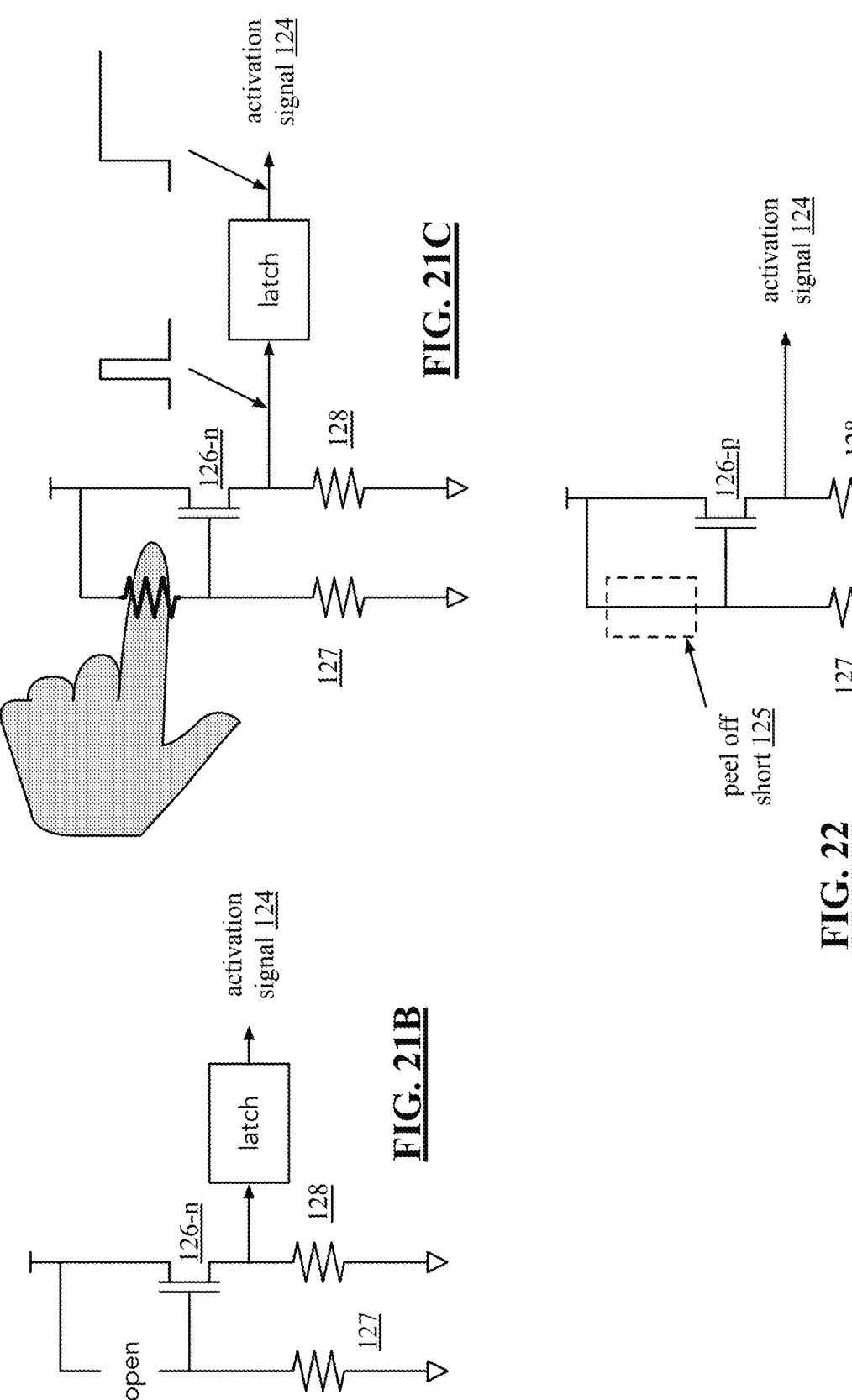
FIGS. 21B and 21C are a schematic block diagram of another embodiment of a non-RF activation module of a data logging device.
FIG. 22 is a schematic block diagram of another embodiment of a non-RF activation module of a data logging device.

FIG. 21B is a schematic block diagram of another embodiment of a non-RF activation module 45 of a data logging device 10. The non-RF activation module 45 includes a n-channel transistor 126-*n*, an open, a bias resistor 127, a load resistor 128, and a latch. With the open, the n-channel transistor is off and the input to the latch is logic 0. As such, the activation signal 124 is low, which indicates that activation signal is not activated. Note that the transistor could be differently biased and the non-activate state of the activation signal 124 could be a logic 1.

FIG. 21C is a schematic block diagram of another embodiment of the non-RF activation module 45 of FIG. 21B with a finger across the open. The resistance of the finger is sufficient with respect to resistor 127 to turn on transistor 126-*n*. This transitions the input of the latch to a logic 1, which produces a logic 1 latch output. While the finger is present, the input to the latch remains a logic 1. When the finger is removed, the input to the latch transitions to a logic 0 and the output of the latch remains a logic 1. FIG. 22 is a schematic block diagram of another embodiment of a non-RF activation module 45 of a data logging device 10. The non-RF activation module 45 includes a p-channel transistor 126-*p*, a peel-off short 125, a bias resistor 127, and a load resistor 128. As an example, the peel-off short 125 includes a wire mounted on an adhesive film. When manufactured, the peel-off short 125 is positioned to short the gate to the drain of the p-channel transistor to keep the transistor off.

When the peel-off short 125 is in place, the p-channel transistor is off and the activation signal 124 is held low via the load resistor 128. When the peel-off short 125 is removed, the bias transistor 127 pulls the gate voltage low, which turns on the transistor 126. With the transistor on, the activation signal 124 is pulled high, which activates the data logging device.

Figure 23:
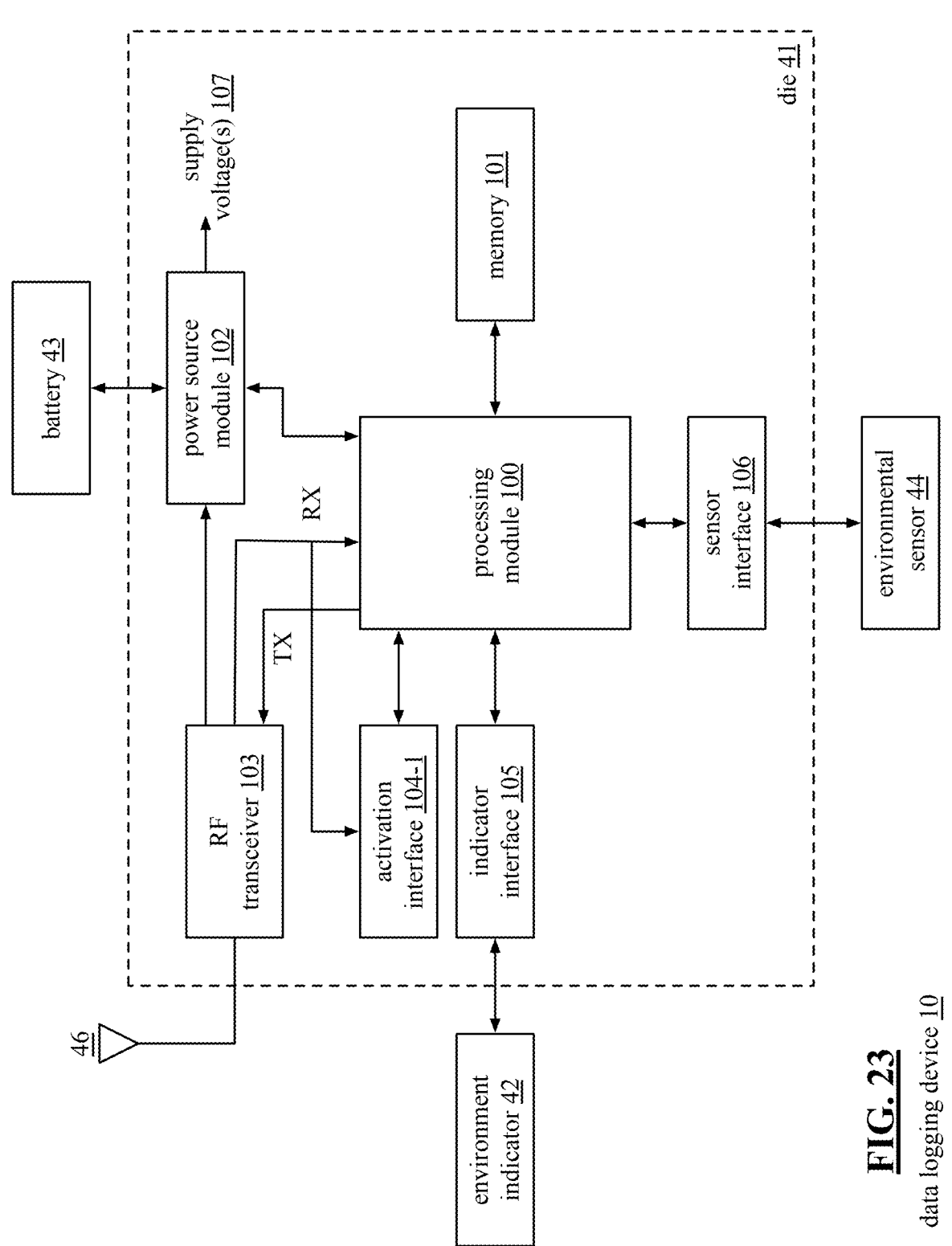
FIG. 23 is a schematic block diagram of another embodiment of a data logging device.

FIG. 23 is a schematic block diagram of another embodiment of a data logging device 10 that includes a die, or IC, 41, an environmental indicator 42, a battery 43, a sensor 44, and an antenna 46. The die 41 includes a processing module 100, memory 101, a power source module 102, an RF transceiver 103, an indicator interface 105, and a sensor interface 106. This embodiment of the data logging device 10 is similar to the embodiment of FIG. 18 with a difference being that this embodiment does not include the non-RF activation circuit 45.

As such, this embodiment of a data logging device 10 is activated based on an RF signal (or other wireless signal (e.g., IR, NFC)) via the environmental indicator 42. The activation interface 104-1 interprets received RF signals to determine when the data logging device is to be activated. When it detects such an RF signal, it sends an activation signal to the processing module 100.

In another embodiment, the power source module 102 generates supply voltage(s) 107 to power up the processing module 100. While powered up, the processing module 100 determines whether a received RF signal includes a command to activate the data logging device. If so, the processing module activates the data logging device.

Figure 24:
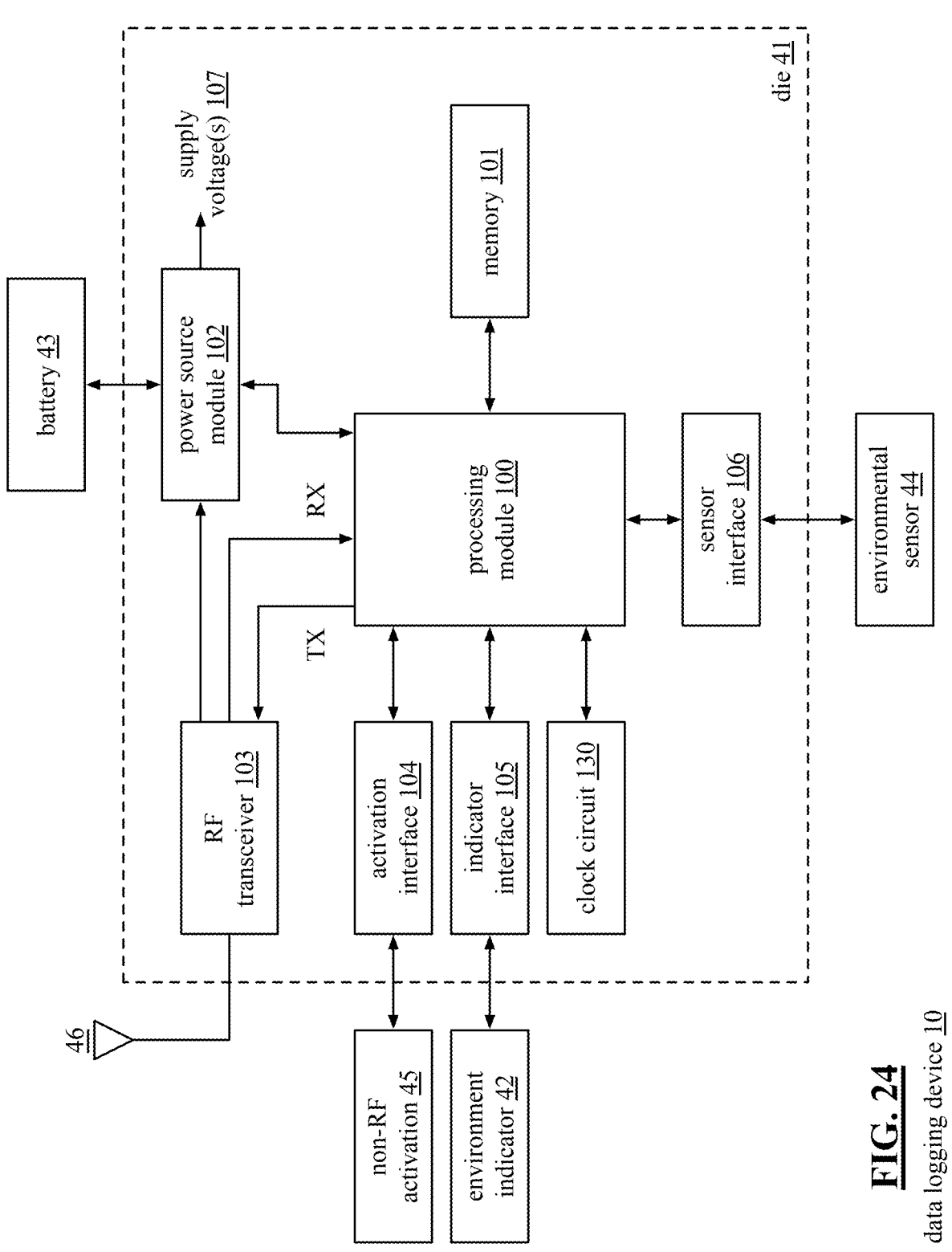
FIG. 24 is a schematic block diagram of another embodiment of a data logging device.

FIG. 24 is a schematic block diagram of another embodiment of a data logging device 10 that includes a die, or IC, 41, an environmental indicator 42, a battery 43, a sensor 44, a non-RF activation circuit 45, and an antenna 46. The die 41 includes a processing module 100, memory 101, a power source module 102, an RF transceiver 103, an activation interface 104, an indicator interface 105, a sensor interface 106, and a clock circuit 130. This embodiment is similar to the embodiment of FIG. 18 with the addition of the clock circuit 130 on the die 41.

The clock circuit 130 includes a real-time clock, an RF clock, and a system clock. The real time clock is used for time stamping the sample data of the sensor 44. The system clock provides the clock signals for the processing module 100 and for accessing the memory 101. The rate of the system clock is adjustable to balance processing speed of the data logging device with power consumption of the data logging device. The RF clock is used by the RF transceiver for tuning it and/or as a local oscillator for down-conversion of an inbound RF signal and/or for up-conversion of an outbound RF signal.

Figure 25:
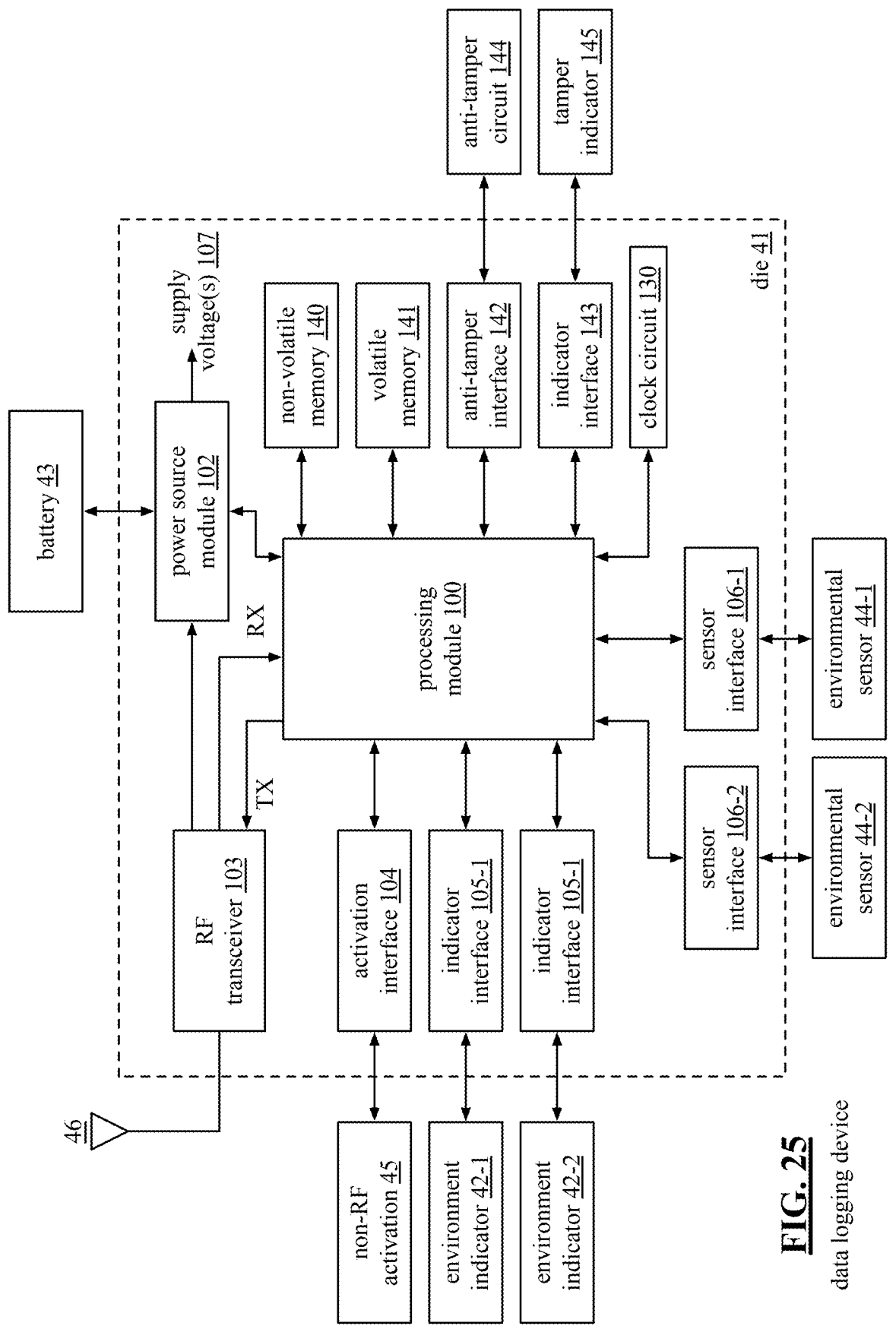
FIG. 25 is a schematic block diagram of another embodiment of a data logging device.

FIG. 25 is a schematic block diagram of another embodiment of a data logging device 10 that includes a die, or IC, 41, a first environmental indicator 42-1, a second environmental indicator 42-2, a battery 43, a first sensor 44-1, a second sensor 44-2, a non-RF activation circuit 45, an antenna 46, an anti-tamper circuit 144, and a tamper indicator 145. The die 41 includes a processing module 100, memory (which includes non-volatile memory 140 and volatile memory 141), a power source module 102, an RF transceiver 103, an activation interface 104, a first indicator interface 105-1, a second indicator interface 105-2, a first sensor interface 106-1, a second sensor interface 106-2, a clock circuit 130, an anti-tamper interface 142, and a tamper indicator interface 143.

This embodiment is similar to the embodiment of FIG. 24 with the addition of a second sensor 44, a second indicator 42, an anti-tamper circuit 144, and a tamper indicator 145. Within the die 41, this embodiment further includes a second sensor interface 106, a second indicator interface 105, an anti-tamper interface 142 and a tamper indicator interface 143. In addition, the memory includes non-volatile memory 140 and volatile memory 141. Note that anti-tamper circuit 144, the tamper indicator 145, the anti-tamper interface 142 and the tamper indicator interface 143 may be included in one or more previous embodiments of the data logging device.

The second sensor 44, the second indicator 42, the second sensor interface 106, and the second indicator interface 105 function as previously discussed. In an alternative embodiment, one environmental indicator 42 is used to provide indications regarding conditions sensed by the two sensors. In another alternative embodiment or in furtherance of the preceding alternative embodiment, one environmental indicator 42 is used to provide indications regarding conditions sensed by the two sensors and is further used to provide indications of tampering as detected by the anti-tamper circuit 144.

Each of the anti-tamper interface 142 and the tamper indication interface 143 includes one or more physical conductors that couple to the anti-tamper circuit 44 and the tamper indicator 145, respectively. Each interface 142 and 143 may further include firmware to adjust signal level and/or polarity of signals to and/or from the processing module 100. For example, one or both of the interfaces 142 and 143 includes firmware for conformance with one or more of a low-voltage differential signaling protocol, a serial port protocol, a UART (universal asynchronous receiver-transmitter) protocol, an i2C protocol, etc.

The anti-tamper circuit 144, which will be described in greater detail with reference to one or more of FIGS. 41B, 43-47, 50-53C, detects when the data logging device has been tampered with. When tampering has been detected, the anti-tamper circuit 144 sends a tamper indication to the processing module 100. The processing module determines whether the tampering has compromised the reliability of stored data, has compromised the reliability of the data logging device to record data, has compromised the reliability of the data logging device to interpret data, and/or has compromised the reliability of the data logging device to communicate the data. Alternatively, the processing module 100 does not determine whether data reliability has been compromised; instead, it records the time at which the tampering was detected and may further store the type of detected tampering for subsequent processing by the data logging device, a reader, and/or a computing device.

When the processing module 100 determines that tampering has compromised reliability of the data logging device, it generates a tamper signal. The tamper indicator 145, which includes a display, one or more LEDs and/or a speaker, produces a visual and/or audible indication of the tampering. When the processing module 100 determines that no tampering has affected the reliability of the data logging device, it generates a no tampering signal. In this instance, the tamper indicator 145 provides a visual and/or audible indication that no tampering has affected the reliability of the data logging device. Note that tampering may occur, but the data logging device has many safeguards built into protect its integrity and reliability as are discussed with reference to one or more subsequent figures.

As an alternative, the processing module records the time of the detected tampering and may further record the type of tampering with processing to determine if the tampering has compromised the data and/or the data logging device. When the data logging device reaches its destination, the stored tampering data is analyzed by a data processing device.

Figure 26:
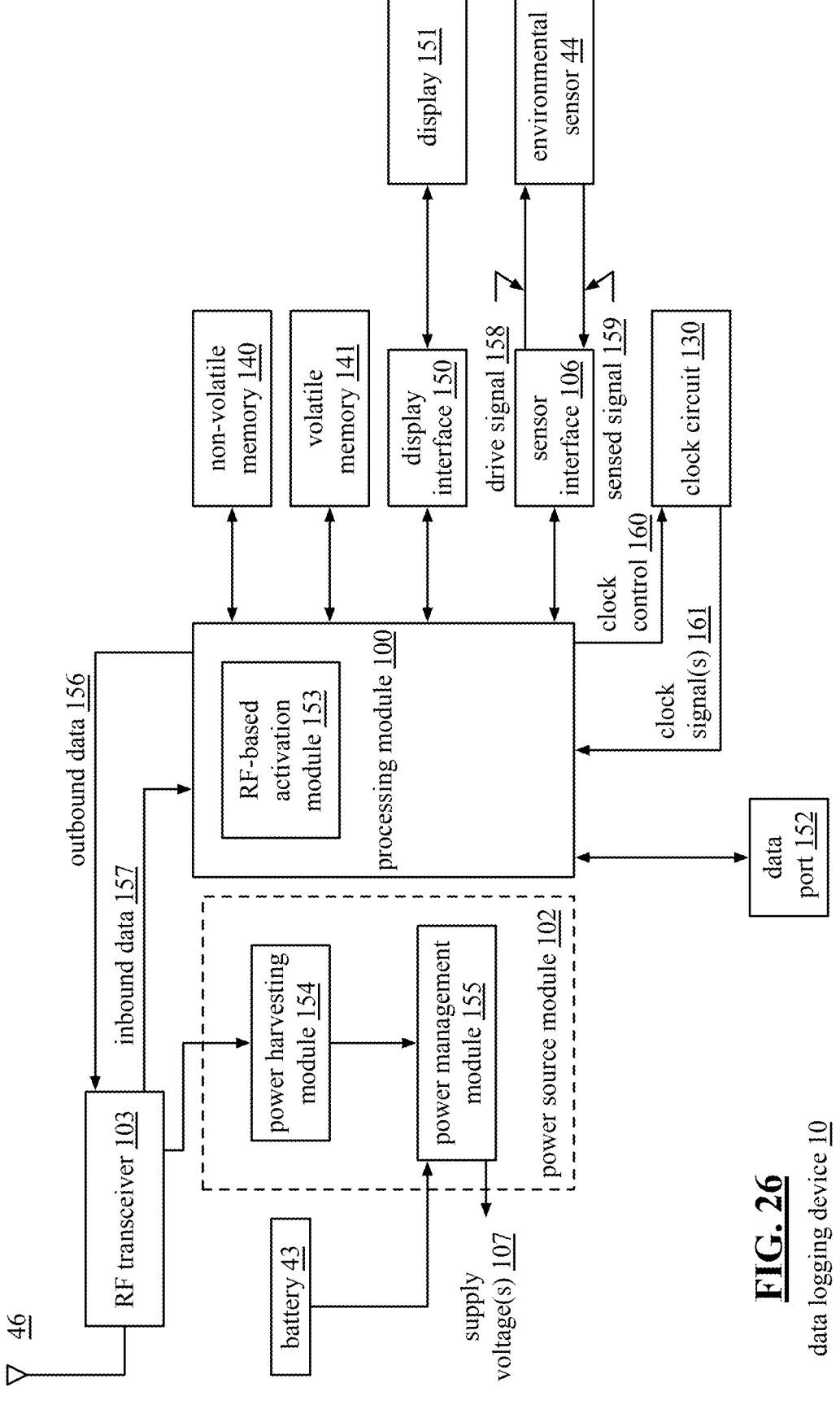
FIG. 26 is a schematic block diagram of another embodiment of a data logging device.

FIG. 26 is a schematic block diagram of another embodiment of a data logging device 10 that is implemented as discrete components and/or implemented as one or more dies and/or as one or more integrated circuits. In this embodiment, the data logging device 10 includes an antenna 46, an RF transceiver 103, a battery 43, a power source module 102, a processing module 100, non-volatile memory 140, volatile memory 141, a display interface 150, a display 151, a sensor interface 106, a sensor 44, a clock circuit 130, and one or more data ports 152. The power source module 102 includes a power harvesting module 154 and a power management module 155. The processing module 100 includes an implementation for an RF-based activation module 153.

The display 151 includes an LCD display, one or more LEDs, a speaker, and/or a combination thereof and, in general, provides a visual and/or audible indication of a condition sensed by the sensor 44. The display interface 150 includes one or more physical conductors that couple to the display. The display interface 150 may further include firmware to adjust signal level of signals to and/or from the processing module 100 and/or to format data for display.

The power source module 102 includes a power harvesting module 154 and a power management module 155. The power harvesting module 154 generates a DC voltage from received RF signals. The power harvesting module 154 will be described in greater detail with reference to FIG. 55.

The power management module 155 is coupled to the battery and to the power harvesting module 154. The power management module 155 produces one or more supply voltages 107 based on the mode of the data logging device and based on the available power source (e.g., the battery and/or the DC voltage from the power harvesting module). The power management module 155 will be described in greater detail with reference to one or more of FIGS. 54 and 56.

The processing module 100 is configured to include the RF-based activation module 153, which functions to detect an activation command and, in response, to activate the data logging device. Activation of the data logging device will be described in greater detail with reference to one or more of FIGS. 30-33, 35-41A.

The processing module 100 is further operable to processing inbound data 157 it receives from the RF transceiver 103. The inbound data 157 represents a communication from a data communication device (e.g., device 51 of FIG. 12) and the communication may be regarding a variety of topics. For example, the communication is regarding configuring the data logging device (which will be described in greater detail with reference to one or more of FIGS. 48 and 49).

As another example, the communication is regarding a request for the retrieval of data. The data may be regarding identity of the data logging device, configuration information, the recorded data obtained by sampling the sensor, and/or the outcome of the recording the sensor (e.g., condition violation or not). As yet another example, the communication is regarding an activation signal that instructs the data logging device to transition from one more to another.

The processing module 100 is further operable to generate outbound data 156 in response to the inbound data 157. For example, the outbound data 156 is an acknowledgement of configuring the data logging device. As another example, the outbound data 156 includes requested data, which it retrieves from memory 140 and/or 141.

The processing module 100 is further operable to enable, when in a data logging mode, the sensor interface 106 to provide a drive signal 158 to the sensor 44. The drive signal 158 provides power to the sensor 44, which allows the sensor to sense a condition (e.g., temperature, moisture, etc.). The sensor 44 generates a sensed signal 159, which is a measure of the sensed condition. The sensor interface 106 provides the sensed signal 159, or a representation thereof (e.g., different voltage level, different digital format, digital signal conversion, etc.), to the processing module 100.

The processing module 100 stores the sensed signal 159, or the representation thereof, in the non-volatile memory 140 (e.g., MPT memory) and/or in volatile memory 141. The processing module 100 also interprets the sensed signal 159 to determine if it corresponds to a condition violation (e.g., too warm, too cold, etc.). If no condition violation is detected, the processing module continues on to the next data sample from the sensor 44 until the data logging mode has ended. If a condition violation is detected, the processing module sets a condition violation flag and may cease processing further data.

The processing module 100 is further operable to adjust one or more clock signals 161 based on a clock control signal 160. For example, the processing module 100 reduces the rate of the system clock (e.g., the clock for digital processing and memory access) to lower power consumption. As another example, the processing module adjusts the sample clock rate for sampling the sensor 44. An example of adjusting the sampling of the sensor will be described with reference to one or more of FIGS. 41A-42.

The data port 152 allows for direct connection to the processing module by an external computing resource (e.g., a microcontroller unit, a computing device, etc.). In an embodiment, the data port 152 is configured in accordance with a serial-peripheral-interface (SPI) protocol, or I²C (inter-integrated circuit, also referred to as I2C).

While not shown, the data logging device may further include a battery charger. When included, the battery charger is powered by the power harvesting module 154. As such, battery charging can occur while the data logging device is receiving an RF signal. In an embodiment, the processing module 100 monitors the charging of the battery and adjusts the charging via one or more control signals.

Figure 27:
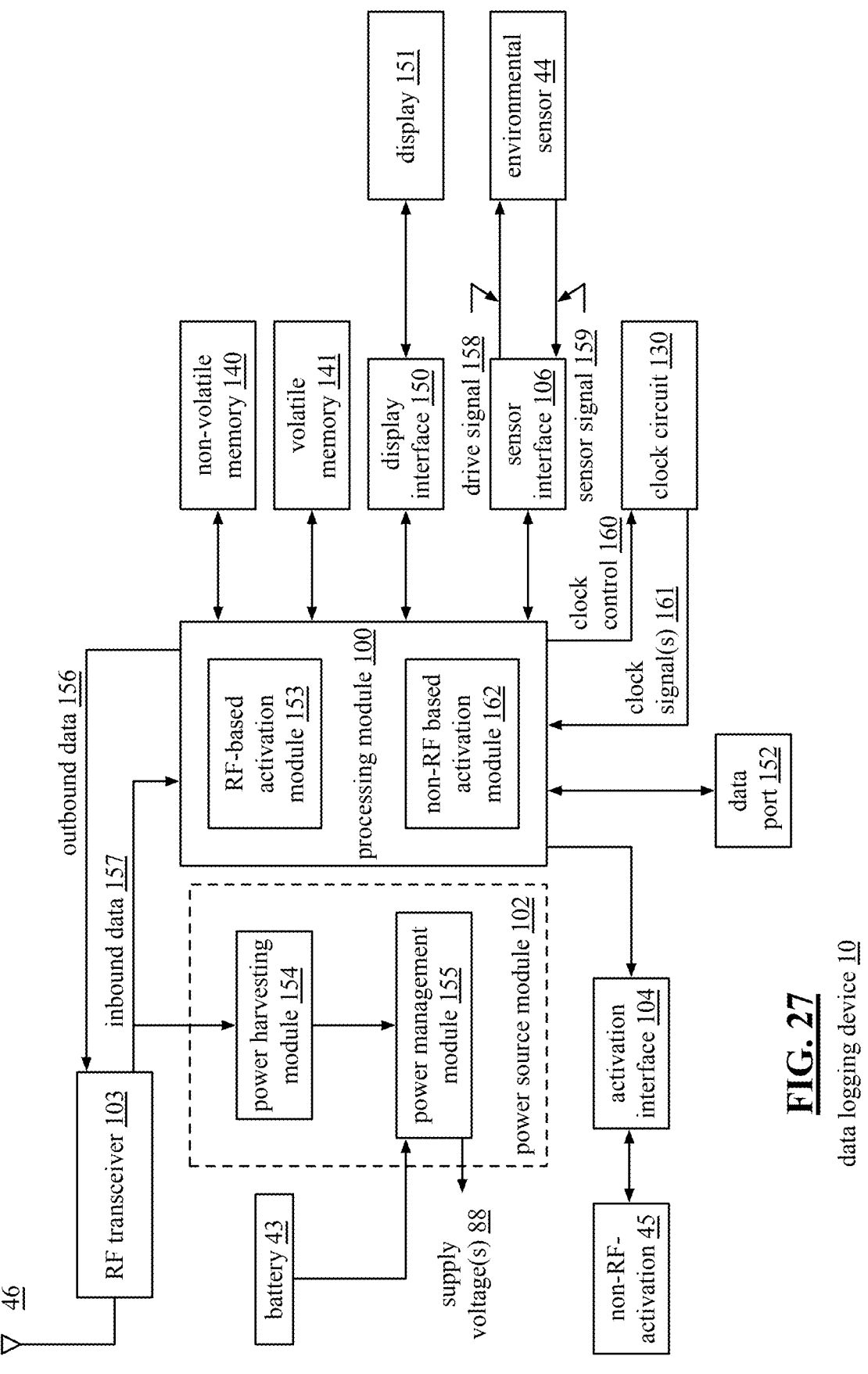
FIG. 27 is a schematic block diagram of another embodiment of a data logging device.

FIG. 27 is a schematic block diagram of another embodiment of a data logging device 10 that is implemented as discrete components and/or implemented as one or more dies and/or as one or more integrated circuits. In this embodiment, the data logging device 10 includes an antenna 46, an RF transceiver 103, a battery 43, a non-RF activation circuit 45, an activation interface 104, a power source module 102, a processing module 100, non-volatile memory 140, volatile memory 141, a display interface 150, a display 151, a sensor interface 106, a sensor 44, a clock circuit 130, and one or more data ports 152. The power source module 102 includes a power harvesting module 154 and a power management module 155. The processing module 100 includes an implementation for an RF-based activation module 153 and an implementation for a non-RF based activation module 162.

This embodiment is similar to the embodiment of FIG. 26 with the inclusion of the non-RF activation circuit 45, the activation interface 104, and the non-RF based activation module 162. The non-RF activation circuit 45 and the activation interface 104 function as previously discussed. The non-RF based activation module 162 functions to detect an activation command via a touch, removal a short, closing of a fold over switch, or other non-RF means and, in response, to activate the data logging device. Activation of the data logging device will be described in greater detail with reference to one or more of FIGS. 30-33, 35-41A.

In an alternative embodiment, the activation interface 104 (or the non-RF activation circuit 45) couples to the power management unit 155. In this embodiment, the power management module 155 produces a supply voltage that powers the processing module 100 and, as such, activates the data logging device for data logging.

Figure 28:
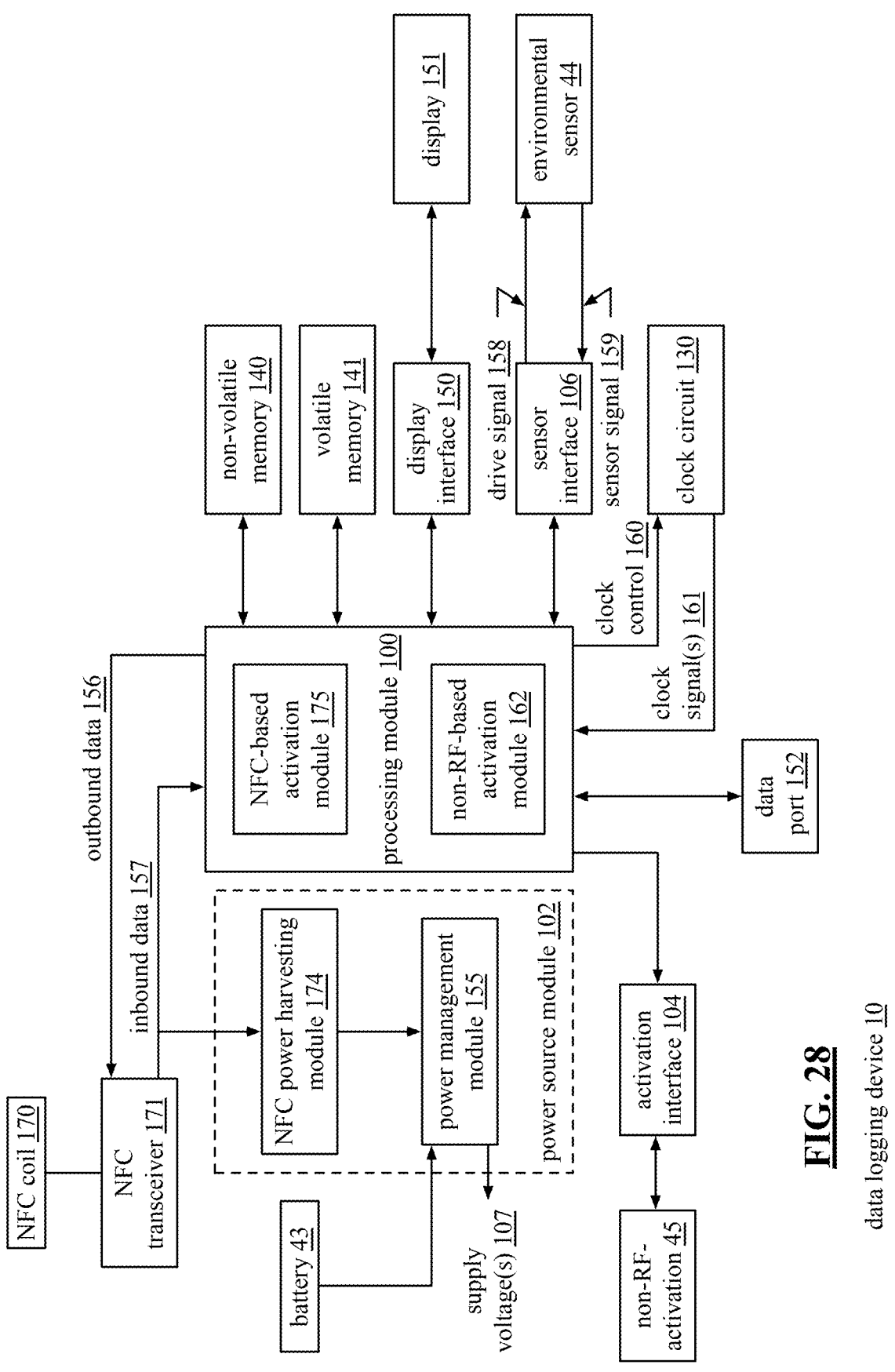
FIG. 28 is a schematic block diagram of another embodiment of a data logging device.

FIG. 28 is a schematic block diagram of another embodiment of a data logging device 10 that is implemented as discrete components and/or implemented as one or more dies and/or as one or more integrated circuits. In this embodiment, the data logging device 10 includes a near field communication (NFC) coil 170, an NFC transceiver 171, a battery 43, a non-RF activation circuit 45, an activation interface 104, a power source module 102, a processing module 100, non-volatile memory 140, volatile memory 141, a display interface 150, a display 151, a sensor interface 106, a sensor 44, a clock circuit 130, and one or more data ports 152. The power source module 102 includes an NFC power harvesting module 174 and a power management module 155. The processing module 100 includes an implementation for an NFC-based activation module 175 and an implementation for a non-RF based activation module 162.

This embodiment is similar to the embodiment of FIG. 27 with exceptions regarding wireless communication. This embodiment includes NFC wireless communication circuitry, which functions in accordance with one or more NFC protocols. This embodiment of a data logging device may be expanded to includes the RF wireless communication circuitry of FIG. 27.

The NFC based activation module 175 functions to detect an activation command and, in response, to activate the data logging device. Activation of the data logging device will be described in greater detail with reference to one or more of FIGS. 30-33, 35-41A.

The NFC power harvesting module 174 converts the electromagnetic fields of an NFC communication into a DC voltage via a transformer, a rectifying circuit, and a capacitor. The resulting DC voltage is provided to the power management module 155.

Figure 29:
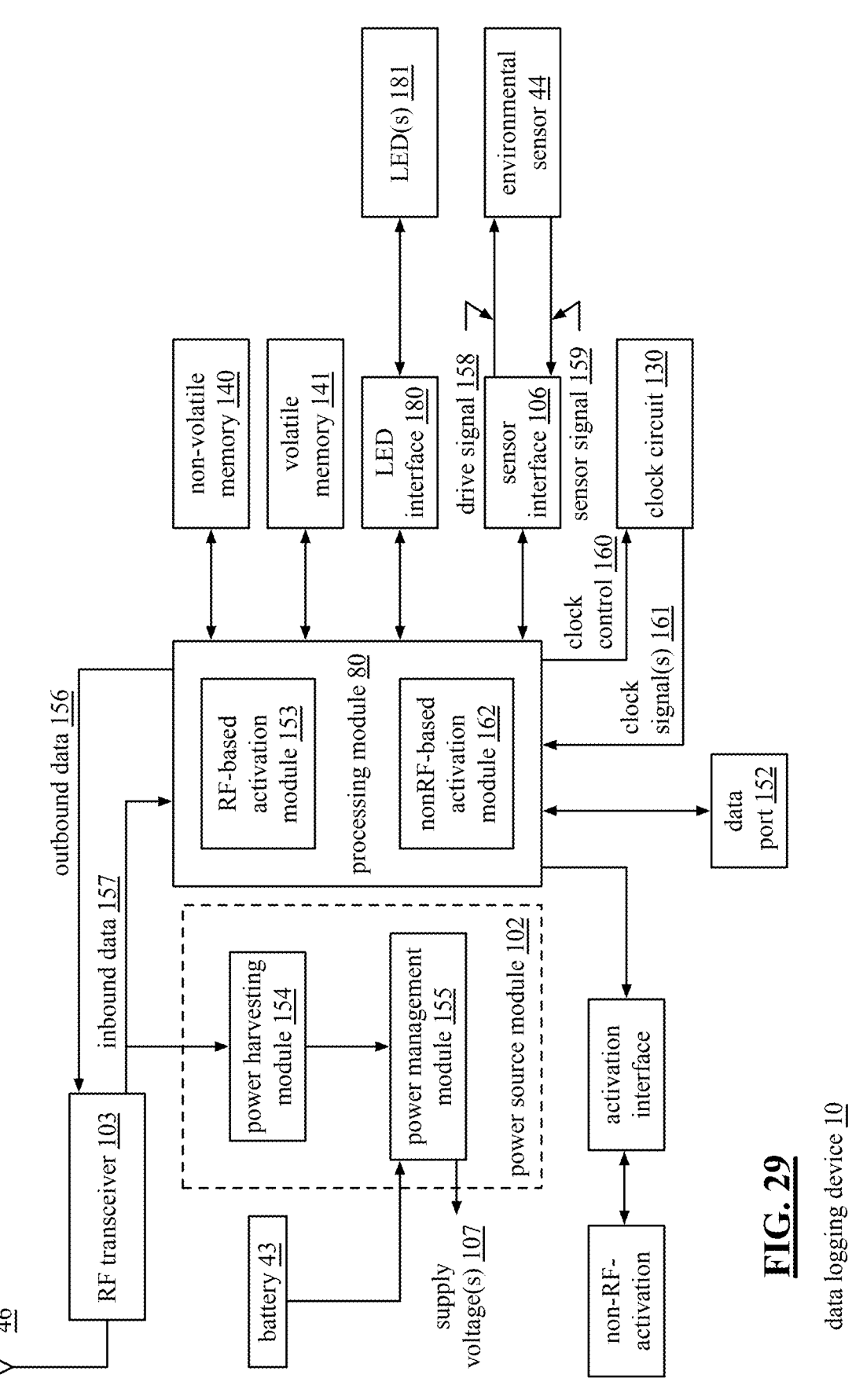
FIG. 29 is a schematic block diagram of another embodiment of a data logging device.

FIG. 29 is a schematic block diagram of another embodiment of a data logging device 10 that is implemented as discrete components and/or implemented as one or more dies and/or as one or more integrated circuits. In this embodiment, the data logging device 10 includes an antenna 46, an RF transceiver 103, a battery 43, a non-RF activation circuit 45, an activation interface 104, a power source module 102, a processing module 100, non-volatile memory 140, volatile memory 141, an LED interface 180, one or more LEDs 181, a sensor interface 106, a sensor 44, a clock circuit 130, and one or more data ports 152. The power source module 102 includes a power harvesting module 154 and a power management module 155. The processing module 100 includes an implementation for an RF-based activation module 153 and an implementation for a non-RF based activation module 162.

This embodiment of the data logging device is similar to the embodiment of FIG. 27 with a difference being that this embodiment includes one or more LEDs and a corresponding interface in place of the display and the display interface. The LED interface 180 and the one or more LEDs function as previously discussed with reference to one or more of FIGS. 19 and 20.

Figure 30A:
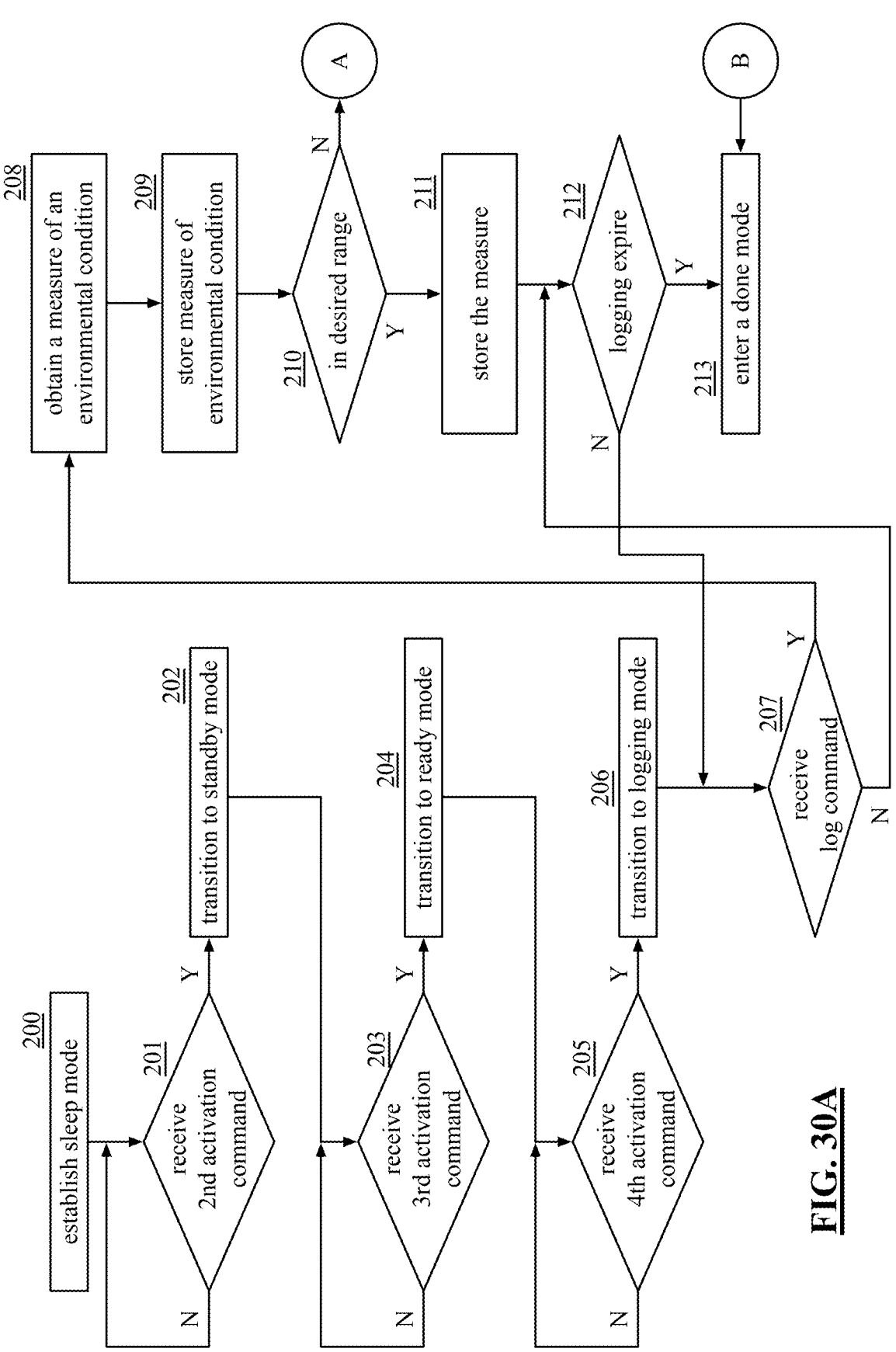
FIGS. 30A and 30B are logic diagrams of an example of a method of data logging.
Figure 30B:
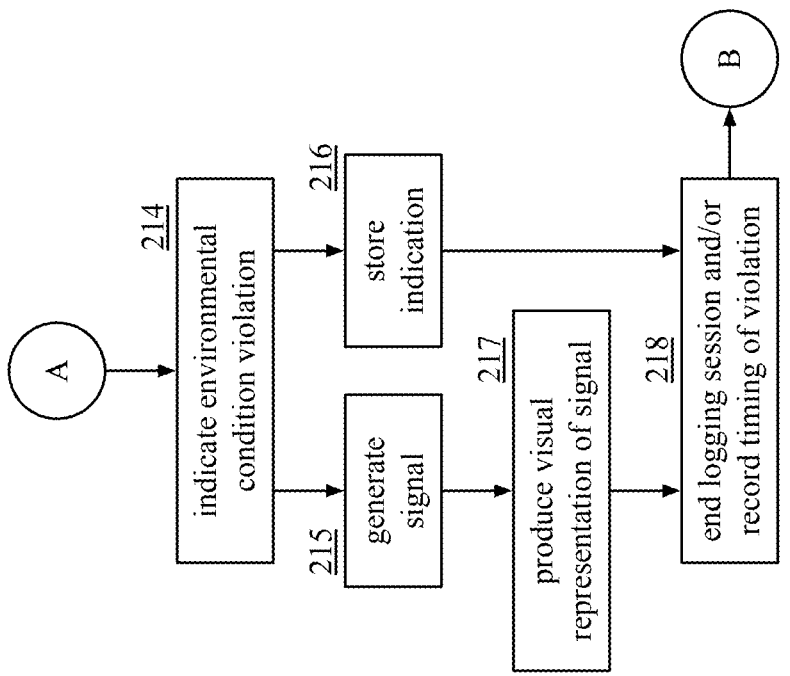

FIGS. 30A and 30B are logic diagrams of an example of a method of data logging, which is performed by the data logging device in general and, for at least some of the steps, by the processing module of the data logging device. The method begins at step 200 of FIG. 30A where the data logging device establishes a sleep mode. In an example, when a battery is installed in the data logging device, the data logging device generates a first activation command that transitions the data logging device from a dormant (off) mode to the sleep mode. Alternatively, recognition of the battery being installed triggers the transition from the dormant mode to the sleep mode and functions as the first activation command.

The method continues at step 201 where the data logging device determines whether a second activation command is received, wherein the second activation command causes the data logging device to transition from the sleep mode to a standby mode. The second activation command may be received via the non-RF activation circuit, via an RF signal, via an IR signal, or via an NFC signal. Alternatively, the second activation signal is automatically generated by the data logging device a prescribed period of time after the data logging device enters the sleep mode (e.g., fractions of a second, seconds, minutes, hours, days, weeks, months or longer).

When the second activation command is received, the method continues at step 202 where the data logging device transitions to the standby mode. In the standby mode, the data logging device enables the real time clock (RTC). In an embodiment, the RTC generates units of time (e.g., fractions of a second, seconds, minutes, hours, or longer per unit), where the passing of time corresponds to a number of units of time that have passed. Note that in the standby mode, the data logging device may be configured as will be further described with reference to at least FIG. 33A.

The method continues at step 203 where the data logging device determines whether a third activation command is received. The third activation signal may be received via the non-RF activation circuit, via an RF signal, via an IR signal, or via an NFC signal. Alternatively, the third activation signal is automatically generated by the data logging device a prescribed period of time after the data logging device enters the standby mode (e.g., fractions of a second, seconds, minutes, hours, days, weeks, or longer). As a specific example, of step 203, a finger couples to the parallel conductors of the non-RF activation circuit of FIG. 21A or 21B to produce the third activation signal.

When the third activation signal is received, the method continues at step 204 where the data logging devices transitions from the standby mode to a ready mode. Upon entering the ready mode, the data logging device provides a visual and/or audible indication of being in the ready mode. In addition, the data logging device records (e.g., stores in memory) the real time of entering the ready mode from the real time clock.

In an example, the data logging device obtains (e.g., receives from a reader, a communication device, etc.) a UTC (Coordinated Universal Time) time and date. The UTC time and date are writing into memory. The stored time and date are linked to a current unit of time produced by the RTC. As such, the units of time produce by the RTC record real time with reference to the stored UTC time and date. An example will be further described with reference to FIG. 33B. The method continues at step 205 where the data logging device determines whether it has received a fourth activation signal. The fourth activation signal may be received via the non-RF activation circuit, via an RF signal, via an IR signal, or via an NFC signal. Alternatively, the fourth activation signal is automatically generated by the data logging device a prescribed period of time after the data logging device enters the ready mode (e.g., fractions of a second, seconds, minutes, hours, days, or longer).

When the fourth activation command is received, the method continues at step 206 where the data logging device transitions form the ready mode to a logging mode. In the logging mode, the data logging device is enabled to engage with the one or more sensors to monitor and/or record conditions sensed by the one or more sensors. The conditions include, but are not limited to, temperature, moisture, pressure, humidity, shock (e.g., vibrations), gas, a conductive short, a conductive open, proximity of an object, and light.

As an example of timing for receiving the various activation commands, the second activation command is received when the data logging device is associated with the object; the third activation command is received prior to the object being in transit; and the fourth activation command is received when the object is in transit. As used herein, "in transmit" includes the labeled object in preparation for shipping, on a conveyor belt, at a loading dock, in a vehicle, boat, airplane, etc., at a receiving dock, in storage prior to inspection. "In transit" may further include returns by the destination of a labeled object.

In the logging mode, the method continues at step 207 where the data logging device determine whether a log command is obtained (e.g., generated, received, calculated, timetable triggered, etc.). As an example, the data logging device is configured to obtain sample data from a sensor periodically, where each sampling of the sensor corresponds to a log command. The sampling rate of a sensor ranges from a few seconds to a few hours or longer. Other configuration settings regarding sampling a sensor includes condition thresholds (e.g., a minimum temperature, a maximum temperature, etc.); duration of sampling the sensor (e.g., minutes, hours, or longer); alarm mode for condition violation (e.g., continuous, on-demand, periodic); and/or duration of a sampling window (e.g., the time in which the sensor is sampled). Note that sampling of sensors may be individually configured or jointly configured.

When a log command is obtained, the method continues at step 208 where the data logging device obtains (e.g., push data or pull data) a measure of an environmental condition from the sensor. The measure of the environmental condition may be a raw data format, a representative data format, or a natural data format. For example, when the sensor is sensing temperature, raw data is a voltage or current value. Representative data of the raw data format includes a code that represents the measured raw data as it's mapped to a reference matrix. As specific example, the reference matrix ranges from 0000 to 1111 and the raw data voltage ranges from −0.35 volts to 0.35 volts. The most significant bit (MSB) of the code corresponds to the sign of the voltage (e.g., 0 for a negative voltage and 1 for a positive voltage). Thus, a raw voltage of 0.15 would have a code value of 1011, MSB of 1 for a positive voltage and 011 for 3 times a 0.05-volt increment.

For the nature data, the temperature is recorded as an actual temperature (e.g., Fahrenheit, Celsius, Kalvin). To accomplish nature temperature units a single point calibration or a multiple point calibration process is used. For either process, a curve of the raw data versus actual temperature is obtain for the sensor. When the curve is substantially linear, the single point calibration will most likely produce sufficiently accurate results. The more non-linear the curve, then a multiple point calibration process should be used.

For the single point calibration, a calibration temperature (e.g., 0 degrees) is sensed by the sensor and produces a raw data sample. The raw data sample is then mapped to the curve corresponding to the calibration temperature (e.g., 0 degrees). Once mapped, subsequent raw data samples are mapped to the curve as an offset from the raw data sample of the calibration temperature to obtain a true temperature value.

For example, if the temperature corresponds to the y-axis and the raw data sample corresponds to the x-axis, then $y=a*x+b$, where y is the temperature, x is the raw data sample, a is the slope of the curve, and b is the offset. If the temperature is calibrated to 0 degrees, then "b" is 0 and the raw data samples are mapped to the curve based on the slope of the curve.

For the multiple point calibration, the curve of the raw data versus actual temperature is broken into substantially linear sections. Each linear section has a start point and an end point. For an intermediate linear section of the curve, its start point is the end point of the preceding linear section, and its end point is the start point for the next linear section. For the start points and end points of the curve, the data logging device is subjected to the actual temperature and the raw data is measured and mapped to curve (e.g., the multiple linear sections). For subsequent raw data values, a linear section of the curve is identified, and the raw data value is offset from a start point to find the corresponding real temperature value.

The single point calibration and/or the multiple point calibration may be used for other sampled data. For example, the single point calibration and/or the multiple point calibration is used to obtain real battery voltage. As another example, the single point calibration and/or the multiple point calibration is used to obtain a real moisture value. As a further example, the single point calibration and/or the multiple point calibration is used to obtain a real pressure value. As a still further example, the single point calibration and/or the multiple point calibration is used to obtain a real gas concentration reading.

The method continues at step 209, where the data logging device at least temporarily stores the measure of the environmental condition in memory of the data logging device. In an example, the data logging device stores the measure of the environmental condition long enough to determine if it represents a condition violation or not. Once the determination is made, the measure of the environmental condition is deleted from memory. In another example, the measure of the environmental condition is stored in the non-volatile memory and/or volatile memory of the data logging device. In an alternative embodiment, the data logging device stores the measure of the environmental condition without determining whether it was a condition violation. Such a determination is made at a later time by the data logging device, a communication device (e.g., a reader), and/or a computing device.

The method continues at step 210 of FIG. 30B where the data logging device determines whether the measure of the environmental condition is within a desired range. For example, the measure of the environmental condition is within the desired range when the measure of the environmental condition is above a minimum threshold value (e.g., measured temperature is above a minimum threshold temperature). As another example, the measure of the environmental condition is within the desired range when the measure of the environmental condition is below a maximum threshold value (e.g., measured temperature is below a maximum threshold temperature). As a further example, the measure of the environmental condition is within the desired range when the measure of the environmental condition is above a minimum threshold value and below a maximum threshold (e.g., measured temperature is above a minimum threshold temperature and below a maximum threshold temperature).

When the measure of the environmental condition is within the desired range, the method continues at step 211 where the data logging device stores the measure of the environmental condition in non-volatile and/or volatile memory of the memory. In an alternate embodiment, the data logging device stores the data with a timestamp. The method continues at step 212 where the data logging device determines whether the data logging session has expired (e.g., the duration of data sampling has concluded). If yes, the method continues at step 213, where the data logging device enters a done mode. If the data logging session has not expired, the method then returns to the ready mode of step 207 where the data logging devices awaits another logging command.

If, at step 210, the measure of the environmental condition is not within the desired range, the method continues at step 214 of FIG. 30B where the data logging device sets an indication of an environmental condition violation. The method continues at step 215 and/or step 216. At step 215, the data logging device generates a signal corresponding to the environmental condition violation. From step 215, the method continues at step 217 where the data logging device produces a visual representation of the signal.

At step 216, the data logging device stores, in memory of the data logging device, a digital value representing the environmental condition violation for subsequent access by a reader. The digital value represents the environmental condition and may further include a timestamp as to when the violation was detected. From step 216 or 217, the method continues at step 218 where the data logging device disables re-entry into the logging mode regardless of receiving additional log commands and/or additional fourth activation commands. For instance, once a condition violation is detected, subsequent samplings of the sensor become irrelevant and is stopped. After step 218, the method continues at step 213 of FIG. 30A, which places the data logging device in the done mode.

Figure 31:
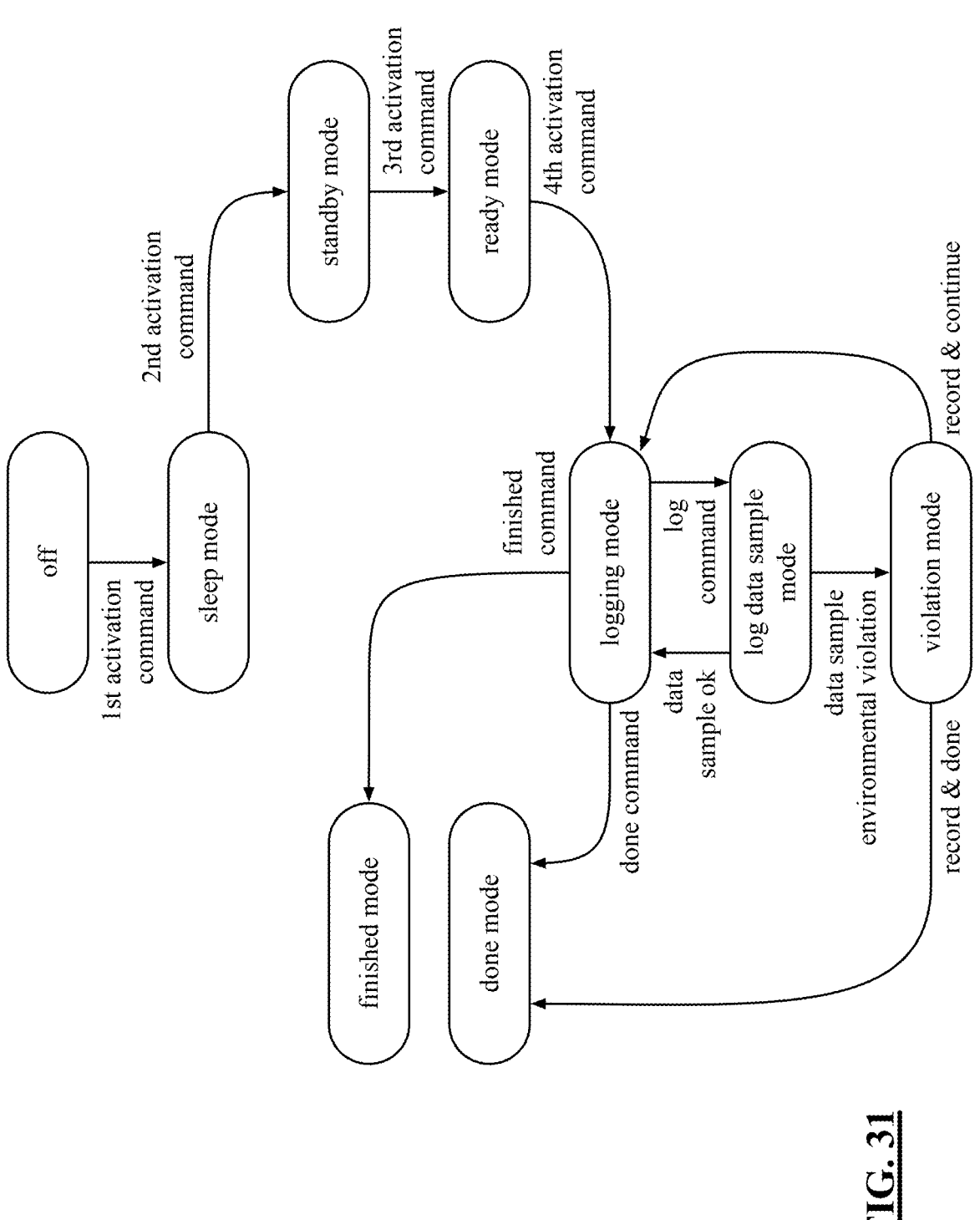
FIG. 31 is a state diagram of an example of data logging.

FIG. 31 is a state diagram of an example of data logging that beings in an off or dormant mode. The data logging device transitions to a sleep mode in response to a first activation command, which corresponds to a battery being installed into the data logging device. The data logging device transitions to a standby mode in response to a second activation command. In the standby mode, the data logging device enables a real time clock and may further record the time (e.g., UTC) when the real time clock was enabled.

As an example, the second activation command is a wireless signal (RF, IR, or NFC) that is received by the data logging device when it's associated with an object, forming a labeled object. This may be done when the data logging device is adhered to an object or prior to then. Note that the labeled object may reside at the source and in the standby mode for some time before it is shipped to a destination.

When the labeled object is being prepared for shipping, the data logging device receives a third activation command, which transitions the data logging device from the standby mode to the ready mode. For shipping facilities that do not include wireless data communication devices (e.g., device 52 of FIG. 12), the third activation command can be activated via the non-RF activation circuit. This allows for the data logging device to be activated for data logging without special wireless (RF, IR, and/or NFC) equipment. Alternatively, the third activation command could be received from a wireless communication device. The data logging device may further provide a visual and/or audible indication that it's in the ready mode (e.g., three flashes of one or more LEDs or a message that reads "ready", a tone that indicates "ready").

The data logging device transitions into the logging mode in response to a fourth activation command. In an embodiment, the fourth activation command is automatically generated after a time period (e.g., processing speed of circuitry to generate the fourth activation command (e.g., virtually no delay), seconds, minutes, hours, or longer) has elapsed after the data logging device entered the ready mode. Alternatively, the fourth activation command is received via a wireless signal or via the non-RF activation circuit. For instance, each activation of the non-RF activation circuit bumps up the mode of the data logging device, maxing out at the logging mode.

In the logging mode, the data logging device awaits a log command. In an embodiment, the log command is generated by the data logging device based on configuration data. As an example, the data logging device generates a log command once every five minutes. When a log command is detected, the data logging device transitions into a log data sample mode.

In the log data sample mode, the data logging device receives sensed data from a sensor and may further determine whether the sensed data corresponds to a condition violation. If the sensed data is ok (no condition violation), the data logging device returns to the logging mode and awaits another log command, a done command, or a finished command. The done command corresponds to the end of obtaining data from the sensor and the accumulated sensed data is reliable (e.g., very high confidence level that the data is accurate). When the done command is received (which could be via an RF signal), the data logging device transitions to the done mode.

The finished command corresponds to ending the sampling of the sensor and that the reliability of the accumulated sensed data is questionable and the questionability of the data cannot be resolved. A finished command is created when the battery is depleted, when an unresolvable tamper has been detected, when the device has failed, or other factor that raises questions about the integrity of the data. When the finished command is received, the data logging device transitions to the finished mode.

When in the log data sample mode and the data sample is a violation, the data logging device transitions to the violation mode. In this mode, the data logging device determines whether the level of violation requires entering the done state and indicating a condition violation or whether the level violation is tolerable, and the data logging should continue. In one embodiment, a single condition violation, no matter the magnitude of the violation, requires entering the done state and generating a condition violation signal. In another embodiment, a cumulative level of violations would require entering the done mode and generating the condition violation signal. Until that level is reached, the data logging device would return to the logging mode after recording the most recent sample. An example of levels of violations is further discussed with reference to FIG. 34.

Figure 32:
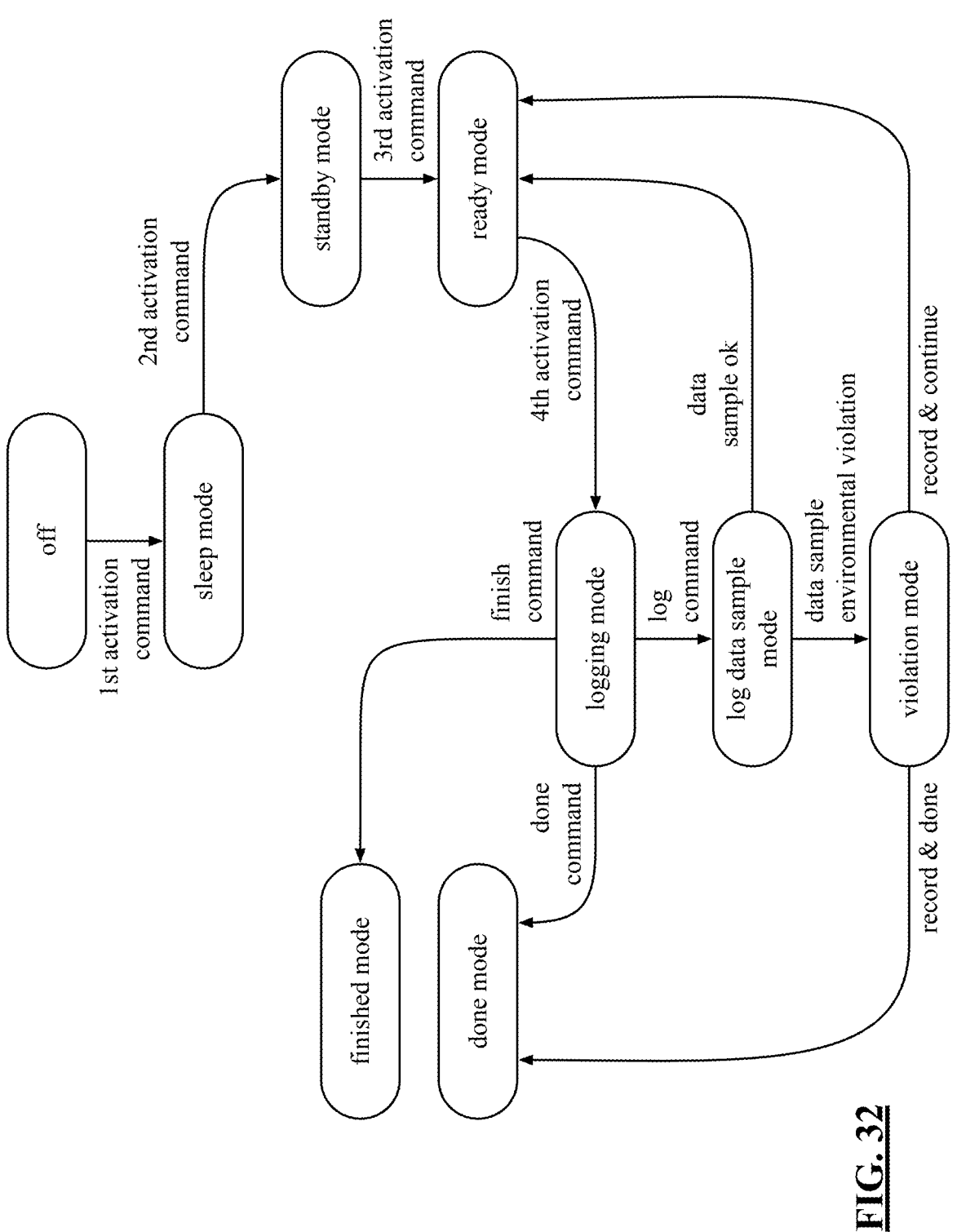
FIG. 32 is a state diagram of another example of data logging.

FIG. 32 is a state diagram of another example of data logging that is similar to the state diagram of FIG. 31. In this state diagram, the data logging device transitions to the ready mode from the log data sample mode when the current sample is ok. The data logging device transitions to the ready mode from the violation mode when the cumulative violations do not amount to final condition violation. As such, the data logging device needs to receive another 4$^{th}$ activation command and another log command to sample the data of a sensor.

Figure 33A:
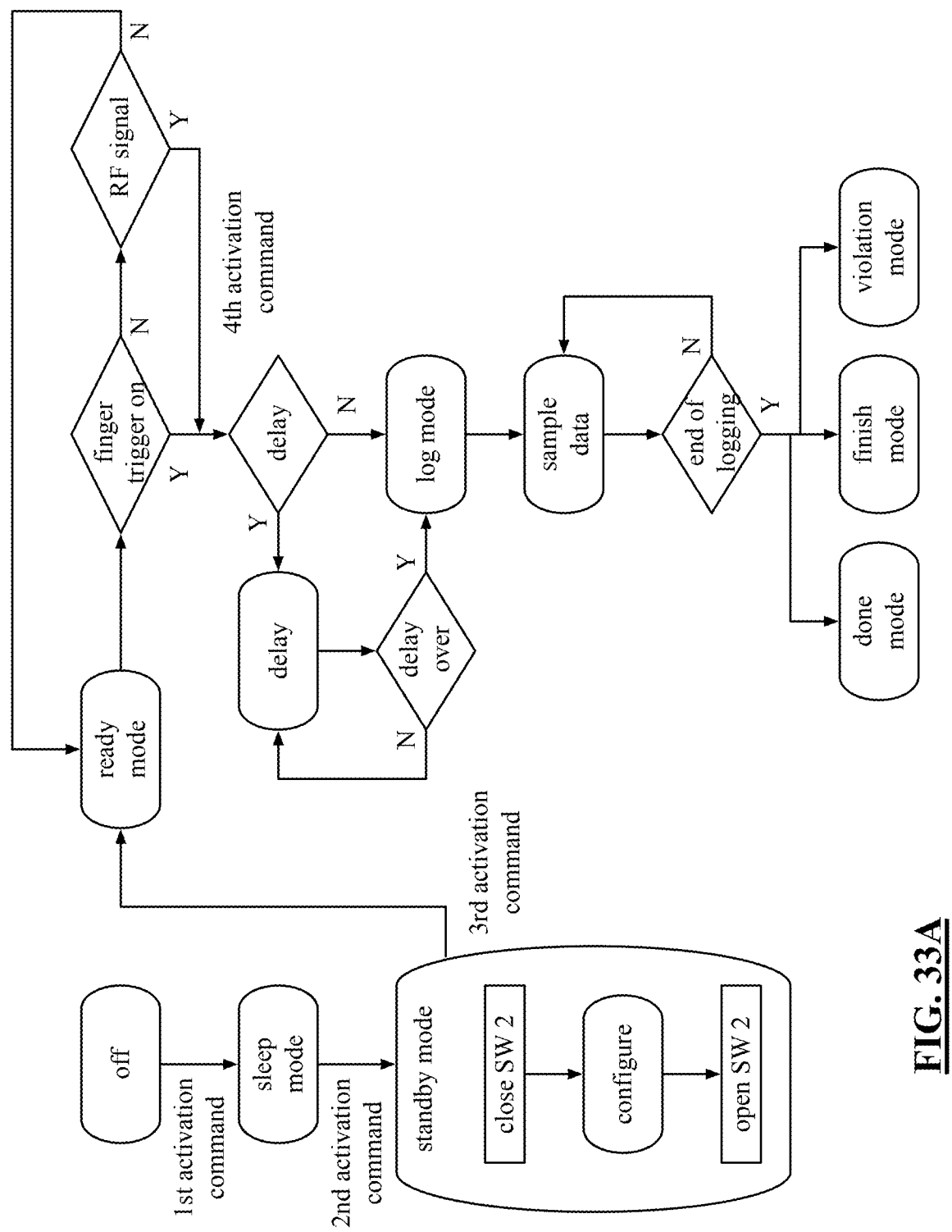
FIG. 33A is a logic diagram of an example of a method of data logging.
Figures 54, 55, 56:
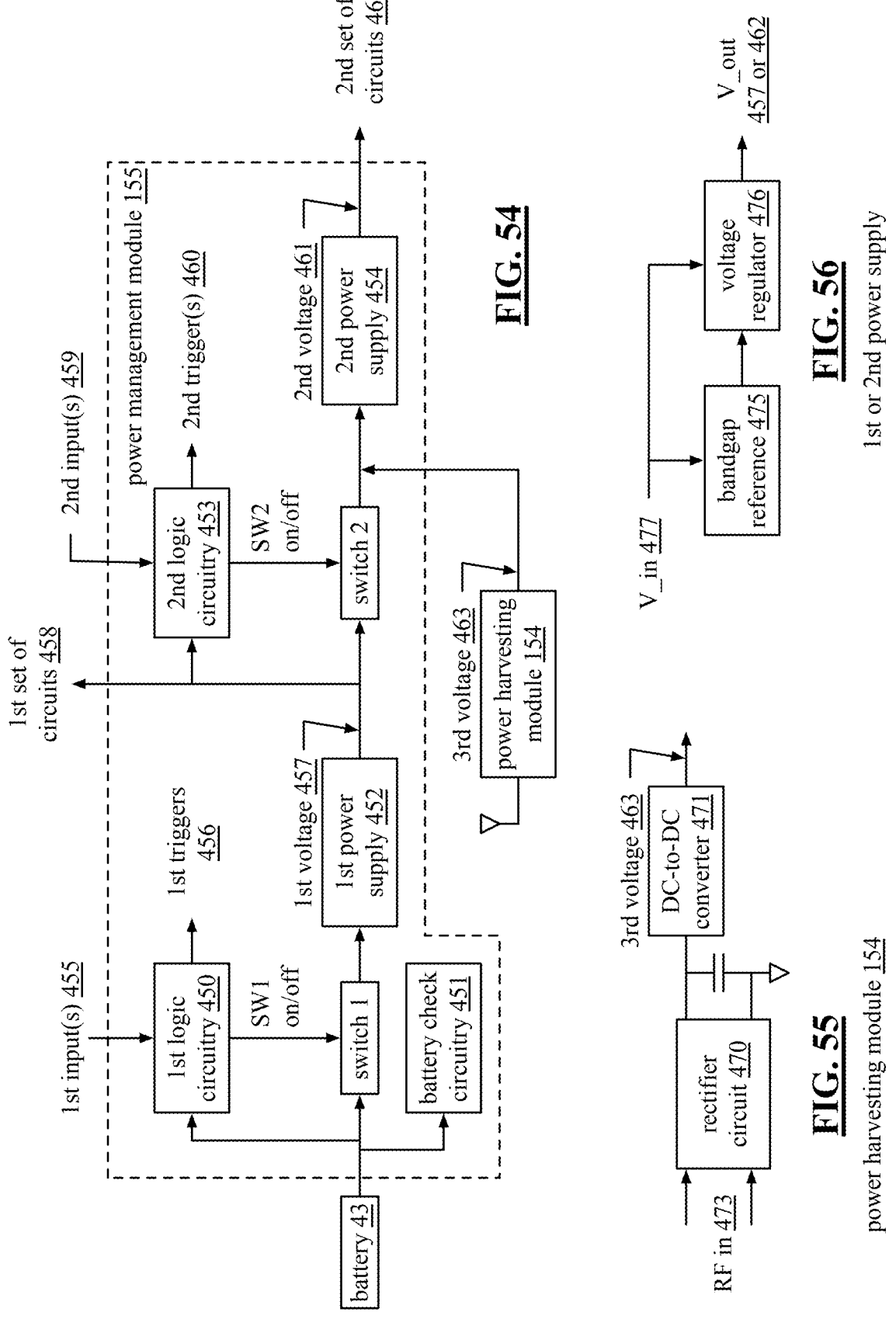
FIG. 54 is a schematic block diagram of an embodiment of a power management module of a data logging device.
FIG. 55 is a schematic block diagram of an embodiment of a power harvesting module of a power management module of a data logging device.
FIG. 56 is a schematic block diagram of an embodiment of a power supply of a power management module of a data logging device.

FIG. 33A is a state diagram of another example of data logging that begins in an off mode (no battery, switch 1 and switch 2 are open of FIG. 54). When a first activation command is detected (e.g., when the battery is installed), the data logging device transitions to the sleep mode (switch 1 is closed and switch 2 is open). In this mode, switch 1 is closed powering the real time clock, battery monitoring circuitry, and/or an anti-tamper circuit (first set of circuits).

In response to a second activation command (which may be auto-generated a time delay after entering the sleep mode, which may be received via an RF communication, or which may be received via a non-RF activation circuit), the data logging device transitions into the standby mode (switch 1 is closed and switch 2 starts off closed). In the standby mode, the data logging device awaits a configure command and/or a third activation command. Note that the configure command and the third activation command may be separate commands or combined in a single command.

If the data logging device receives the configure command (e.g., from a reader), the data logging device closes switch 2 to power at least a portion of a second set of circuits (e.g., the processing module and memory). The second set of circuits will be described with reference to at least FIG. 54. With power to the processing module and memory configuration data from a reader (or other source) can be received and stored in memory. The configuration data includes, but is not limited to information regarding the object, data logging parameters (e.g., data sampling rate, minimum threshold, maximum threshold, single or multiple violation option, etc.), various durations for the units of time of the RTC, visual and/or audio indication parameters (e.g., LED and/or audio patterns for various data logging device conditions, for a condition violation, for tampering, conditional polarity settings, etc.), antitampering parameters (e.g., type enabled, threshold settings, resolution protocol, etc.).

When the configuration is complete, switch 2 is opened and the data logging device remains the standby mode until the third activation command is received. When it is, the data logging device transitions to the ready mode. In addition, the data logging device awaits a fourth activation command either via a finger trigger via a non-RF activation circuit or via an RF signal from a reader (e.g., a communication device 51).

When the fourth activation command is received, the data logging device determines whether a delay is enabled prior to transitioning to the log mode. A delay may be enabled if it is highly likely that the data logging device can wait the prescribed time before sampling data from a sensor with a negligible chance of a condition violation occurring during the delay. If delay is enabled, the data logging device waits for the delay to expire.

When the delay expires or if there was no delay, the data logging device transitions to the log mode. In the log mode, the data logging device samples data from a sensor in accordance with the data logging parameters (e.g., sampling rate and sample duration). In the log mode, the data logging device determines whether the logging of data should end. If not, the data logging device continues sampling data per the data sampling parameters.

The logging of data may end for a variety of reasons. For example, the sample duration has expired, and the sampled data is reliable. If so, the data logging device transitions to the done state. As another example, if the sampled data is not reliable, the data logging ends and the data logging device transitions to the finished mode. As another example, if the sampled data indicates a condition violation, the data logging ends and the data logging device transitions to a violation mode. The violation mode is a specific state of the done mode meaning that the data is reliable, and a violation has occurred.

Figure 33B:
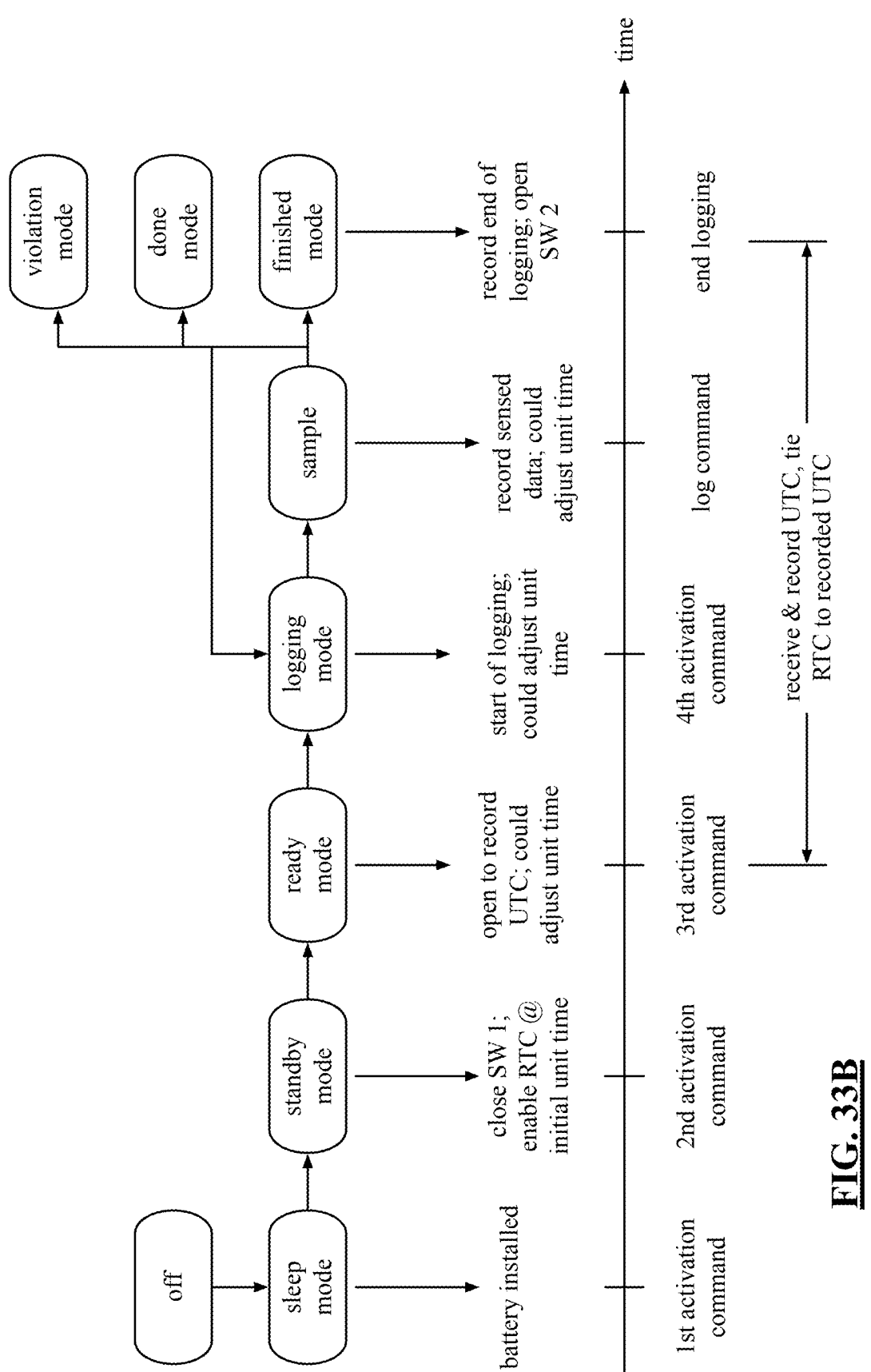
FIG. 33B is time-based diagram of an example of data logging.

FIG. 33B illustrates a timing diagram of the various modes of a data logging device. In response to a first activation command, the data logging device transitions from an off mode to a sleep mode. This mode transition typically corresponds to battery installation.

At some later point in time, which could be seconds to months, the data logging device receives a second activation command. In response, the data logging device transitions to a standby mode. As part of the transition, switch 1 is closed to provide power to at least some of the first set of circuits and switch 2 is open. The first set of circuits includes the RTC, a battery check circuit, and/or a tamper detect circuit. With power applied, each of the first set of circuits is individually activated and, when not activated, are in a sleep mode.

As a further part of the transition, the RTC is enabled to generate units of time in accordance with a standby unit of time setting. For example, a unit of time is programmed to be seconds, or minutes, or hours, or days, etc.).

At another later point in time, which again could be seconds to months, the data logging device receives a third activation command. In response, the data logging device transitions to a ready mode. In the ready mode, the data logging device closes switch 2, which provides power to the second set of circuits. In addition, the data logging device may adjust the unit of time of the RTC. Further, the data logging device is open to record a UTC time and date.

For example, if the third activation command was received from a reader, the reader downloads the UTC time and date. As another example, if the third activation command was received via the non-RF activation circuit, the data logging device waits until it is in communication with a reader. When it is, it receives the UTC time and date. Once the UTC time and date are recorded, the units of time of the RCT are linked thereto. Note that as long as the data logging device receives the UTC time and date prior to battery depletion, the receiving of the UTC time and date may occur any time prior to or after the data logging device enters the ready mode.

At another later point in time, which again could be seconds to months, the data logging device receives a fourth activation command. In response, the data logging device transitions to a logging mode. In the logging mode, the data logging device is enabled to start logging data of an associated sensor. The recording is done in accordance with the units of time produced by the RTC. Note that, in the logging mode, the data logging device may adjust the unit of time of the RTC.

While in the logging mode, the data logging device periodically obtains sample data from a sensor in accordance with a log command. The data sample is recorded (i.e., temporarily or permanently stored in memory). The data logging device remains in the logging mode and receiving log commands until the end of logging. The end of logging occurs as a result of entering a violation mode, a done mode, or a finish mode. When the data logging has ended, the ending of the logging is recorded in accordance with the unit time of the RTC and switch 2 is opened, removing power from the second set of circuits.

Figure 34:
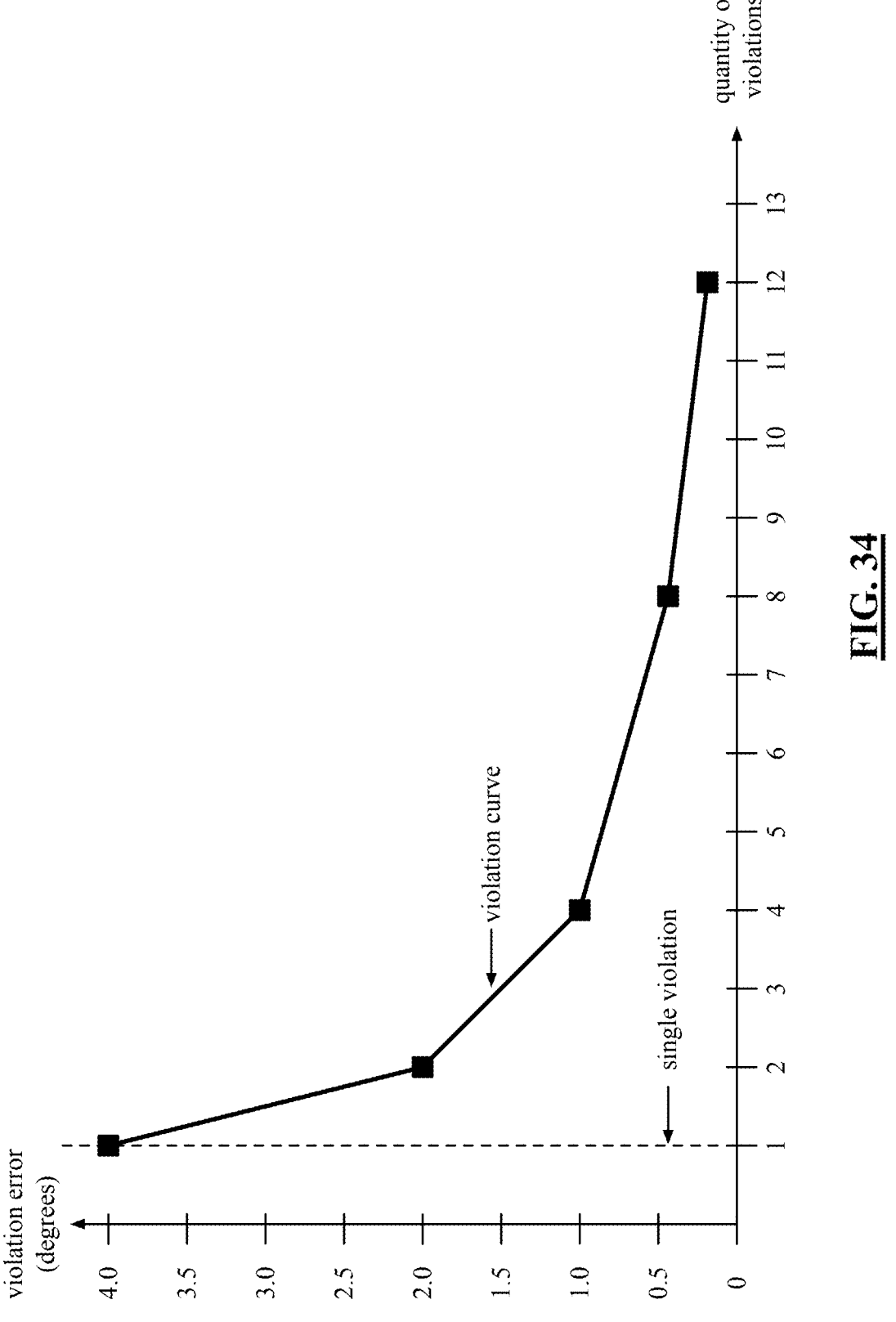
FIG. 34 is a graph of an example of scaling condition violations.

FIG. 34 is a graph of an example of scaling condition violations. The horizontal axis of the graph is quantity of violations, and the vertical axis is for margin of violation error. The numbers on the vertical and horizontal axis are for illustrative purposes only and, in practice, any combination of values may be used.

This example illustrates two types of condition violations. The first is a single violation regardless of the error margin. For instance, if the maximum allowable temperature is −20° C., any single sampling of the temperature that is above −20° C. will trigger a condition violation.

The other example is a cumulative violation such that small violations, by themselves, don't trigger a condition violation. Basically, if the cumulative violation errors stay below the curve, it is not a violation condition. If the cumulative violation errors goes above the curve, then it is a violation.

In the specific example shown, a total of 4° C. above the threshold of −20° C. can be tolerated without triggering a condition violation. As an example, any single violation that is above 4° C. or more off (e.g., −16° C. or warmer), that will trigger a condition violation. As another example, if one sampling is −18° C. (e.g., 2° C. off) and another sampling is −19° C. (e.g., 1° C. off), the cumulative error is 3° C., which is below the allowed 4° C. and thus would not trigger a condition violation.

As yet another example, if one sampling is −18° C. (e.g., 2° C. off) and another sampling is −17° C. (e.g., 3° C. off), the cumulative error is 5° C., which is above the allowed 4° C. and thus would trigger a condition violation. As a further example, if there are eight samples each that are 0.5° C., the cumulative error is 4° C., which is at the allowed 4° C. and thus would not trigger a condition violation. In this example, any further samples that are above the minimum threshold of −20° C., regardless of how minimal the error might be, will trigger a condition violation since the cumulative error will exceed 4° C.

Figure 35:
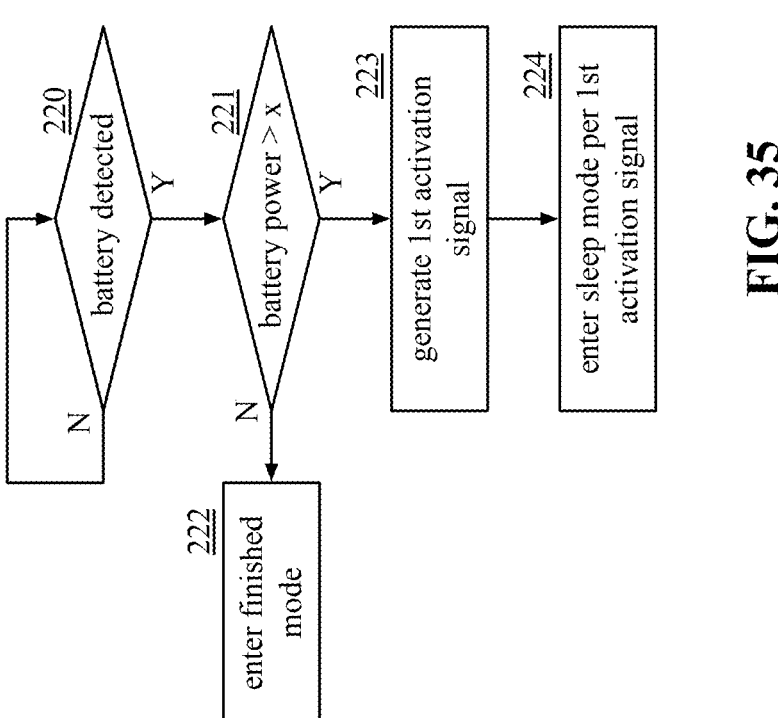
FIG. 35 is a logic diagram of an example of a method of sleep mode for a data logging device.

FIG. 35 is a logic diagram of an example of a method of establishing sleep mode for a data logging device. The method begins at step 220, where the data logging device determines whether the battery is detected (e.g., installed and it produces a measurable voltage). When the battery is detected, the method continues at step 221, where the data logging device determines whether the battery has sufficient power, which is represented by the letter "x". Typically, available power of a battery is measured as a voltage and/or as amp-hours. As a battery is being depleted, its voltage drops as does its available amp-hours. When the voltage (or amp hours) drops below a threshold, the battery is deemed to have insufficient power to power the data logging device.

If the battery power is insufficient, the method continues at step 222, where the data logging device enters a finished mode. If, however, the battery power is sufficient, the method continues to step 223, where the data logging device obtains (e.g., receives, generates, etc.) the first activation signal. The method continues at step 224, where the data logging device enters the sleep mode in accordance with the first activation signal. This may be a near immediate mode transition or delayed for some pre-programmed period of time. In an alternative embodiment, steps 221 and 222 could be omitted such that once the battery is installed, it automatically triggers the 1$^{st}$ activation command.

Figure 36:
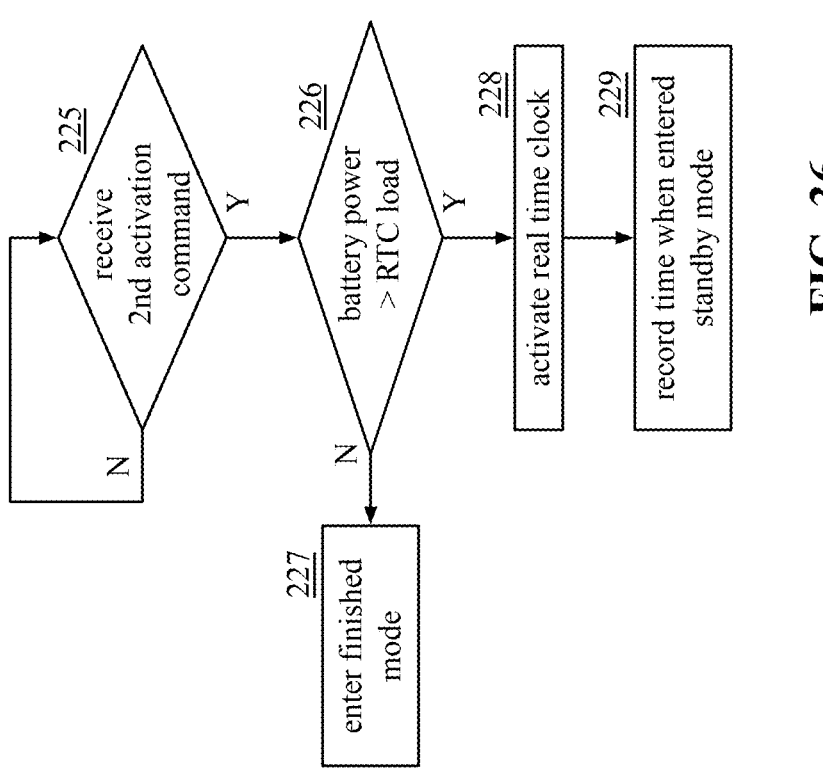
FIG. 36 is a logic diagram of an example of a method of standby mode for a data logging device.

FIG. 36 is a logic diagram of an example of a method of a data logging device transitioning from a sleep mode to standby mode. The method begins at step 225, where the data logging device determines whether it has received a second activation command. When it does, the method continues at step 226, where the data logging device determines whether the battery has sufficient power to power a real time clock.

If not, the method continues at step 227, where the data logging device enters the finished mode. If, however, the battery has sufficient power, the method continues at step 228, where the data logging device activates the real time clock. The method continues at step 229, where the data logging device enters the standby mode and the time at which it does is recorded (e.g., stored in memory) by linking units of time of the RTC from the start of the RTC to a UTC time and date, when obtained. For example, the units of time are measured in minutes and 80 minutes have passed when the UTC time and date are obtained (e.g., 10:05 AM on Jul. 12, 2022). As such, the entry into the standby mode occurred 80 minutes earlier, which was 8:45 AM on Jul. 12, 2022.

In an alternative embodiment, the method proceeds from step 225 to step 228 without checking the status of the battery. As an extension of the previous alternate embodiment or another alternate embodiment, the method omits step 229.

Figure 37:
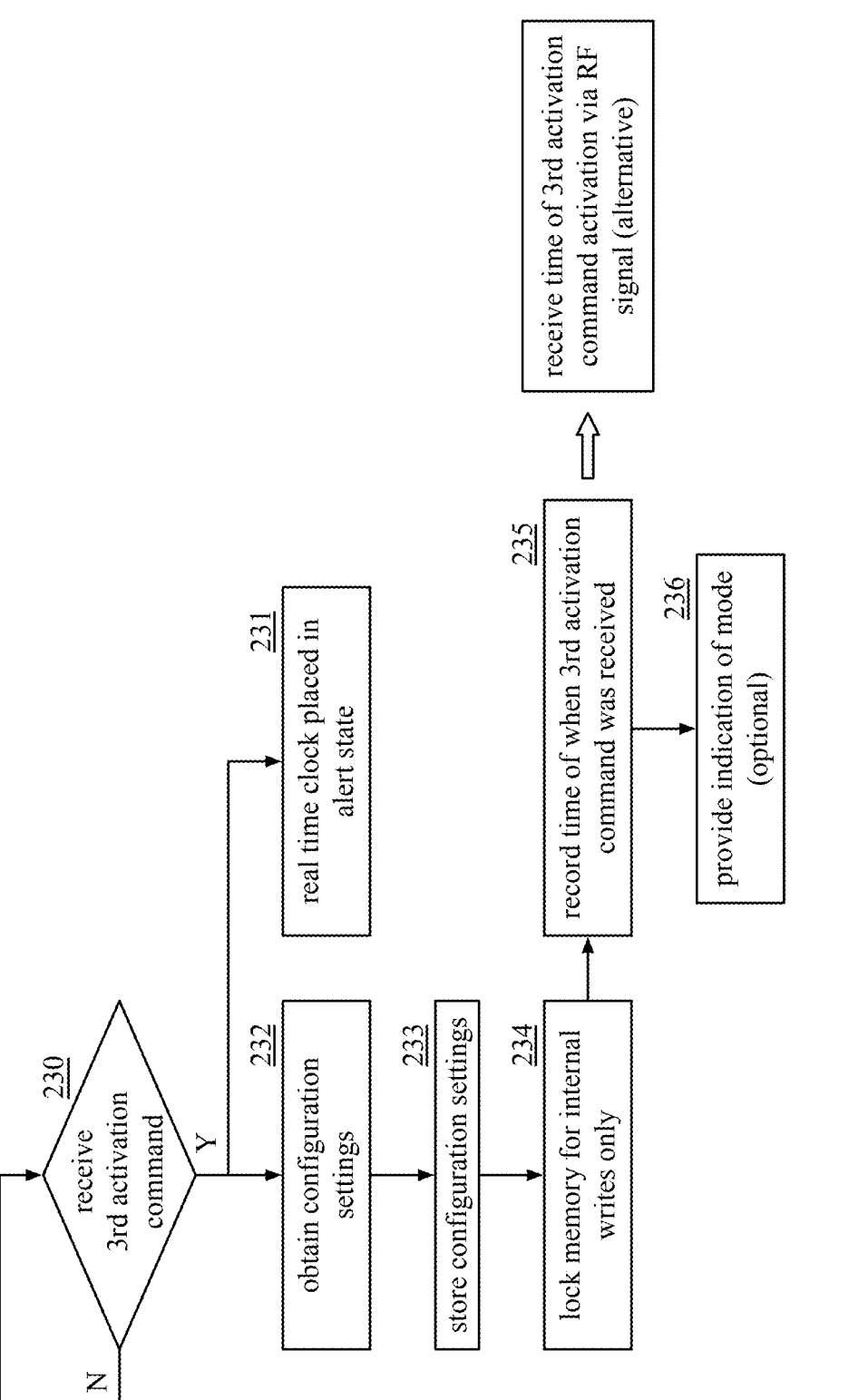
FIG. 37 is a logic diagram of an example of a method of ready mode for a data logging device.

FIG. 37 is a logic diagram of an example of a method of a data logging device transitioning from a standby mode to ready mode. The method begins at step 230 where the data logging device determines whether a third activation command is received. When it is, the method continues at steps 231 and 232. At step 231, the data logging device places the real time clock in an alert state (e.g., ready for subsequent recording or logging of data for which the unit of time may be reprogrammed by increasing or decreasing a unit of time). In addition, the units of the RTC clock are linked to the UTC time and date received from the reader.

At step 232, the data logging device obtains (receives, looks up, generates, etc.) configuration settings. The configuration settings include: delayed start of data logging by 0 to 7 (for a three bit field) logging intervals; logging interval programmable from 1 second to 8 hours; logging sample count programmable from 0 to 4,096; a high temperature threshold; a low temperature threshold; a high moisture threshold; a low moisture threshold; a high pressure threshold; a low pressure threshold; a high gas (e.g., oxygen, carbon monoxide, etc.) parts per million; a high shock or vibration level; a high light (visible or UV) threshold; a low light threshold; alarm delay programmable from 1 to 8 (for a three bit field) consecutive intervals; an anti-tamper polarity programmable to open or closed for an alarm; battery use time intervals programmable from 1 to 31 seconds for a five bit field; photo diode loop threshold programmable from 40 nA to 1 μA; display mode programmable to be on demand or continuous; repetition delay for continuous display mode programmable from 1 to 31 seconds; on time programmable from 10 to 310 mSec; and drive strength programmable from 1.5 k to 5 k series resistance; IC trim parameters; security settings; password; and/or other parameters of the data logging device.

The method continues at step 233, where the data logging device stores the configuration setting. The method continues at step 234, where the data logging device locks the memory for internal writes only. This can be done with a permanent lock or through one or more layers of password protection. Basically, once the data logging device is configured for data logging, step 234 ensures that no unauthorized writes to the data logging device's memory occur, which provides a high level of data integrity for the logged or recorded data.

The method continues at step 235, where the data logging device records the real time of entering the ready mode by linking the units of time of the RTC with the UTC time and date. The method continues at step 236 where the data logging device provides a visual and/or audible indication of entering the ready mode. This step may be a programmable option.

Figure 38:
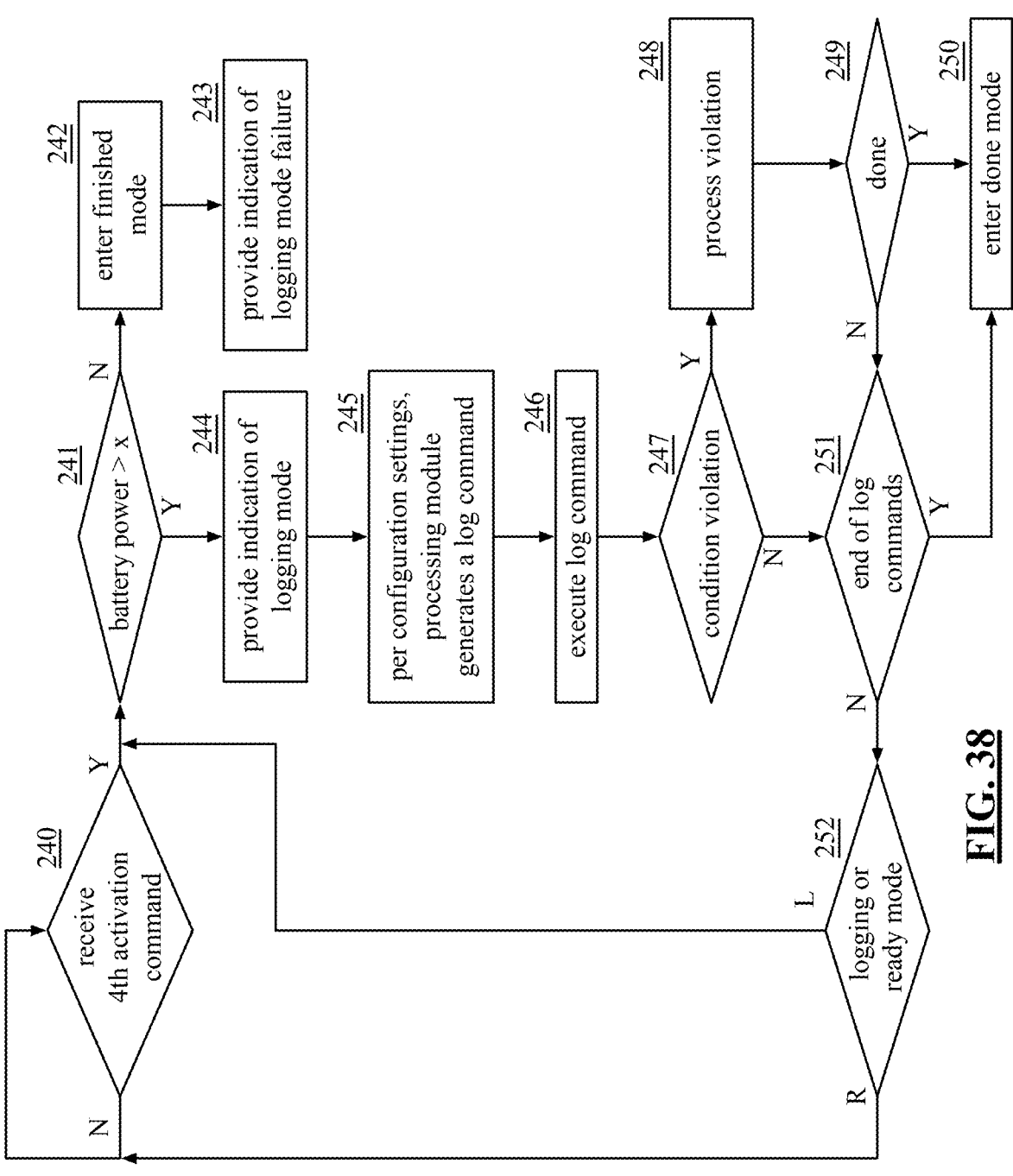
FIG. 38 is a logic diagram of an example of a method of logging mode for a data logging device.

FIG. 38 is a logic diagram of an example of a method of the data logging device transition from the ready mode to the logging mode. The method begins at step 240 where the data logging device determines whether it has received a fourth activation command. When it does, the method continues at step 241, where the data logging device determines whether the battery has sufficient power ("x") to enter the logging mode. Sufficient power is a measure of whether the battery has enough battery life to perform the remaining data logging sampling of the sensor(s) of the configured number of data logging samplings.

If the battery lacks sufficient power, the method continues at step 242, where the data logging device enters a finished mode, which indicates that the data recorded is unreliable due to, in this case, battery depletion. The method continues at step 243, where the data logging device provides an indication of logging mode failure due to low battery. For example, a failure signal is generated that is rendered into a visual and/or audible alarm. In an alternate embodiment, steps 241 through 243 are bypassed.

When the battery has sufficient power, the method continues at step 244, where the data logging device provides an indication of entering the logging mode (e.g., a visual and/or audible indication). The method continues at step 245, where the data logging device, based on the configuration settings, generates a log command. For example, the data logging device is configured to generate a log command every five minutes for ten hours. As another example, the data logging device is configured to generate a log command every five minutes until it receives an external signal to cease.

The method continues at step 246, where the data logging device executes the logging command. For example, the data logging device engages with a sensor to receive sample data of a sensed condition. The sample data is stored in memory and evaluated to determine if it represents a condition violation (e.g., too hot, too cold, etc.). The method continues at step 247, where the data logging device determines whether the sample data corresponds to a condition violation.

If not, the method continues at step 251, where the data logging device determines whether the data logging session has ended (e.g., has executed all of the programmed log commands per configuration). If yes, the method continues at step 250, where the data logging device enters the done mode. If the data logging session has not ended, the method continues at step 252, where the data logging device determines whether it is to return to the ready mode or the logging mode (this is a configurable option). If the data logging device returns to the ready mode, the method repeats at step 240. If the data logging device return to the logging mode, the method repeats at step 241. Note that when the method is repeated, step 244 may be omitted; one indication of being in the logging mode would suffice for most situations.

When, at step 247, there is a condition violation (as previously discussed), the method continues at step 248, where the data logging device processes it. For example, when the data logging device is configured for one violation, it generates a violation signal based on the one condition violation and the data logging session ends with a condition violation via steps 249 and 250. As another example, when the data logging device is configured for a cumulative violation, it generates a violation signal when the cumulative violations exceeds a threshold and enters the done mode via steps 249 and 250. When the cumulative violations do not exceed the threshold, the data logging session continues via steps 249 and 251.

Figure 39:
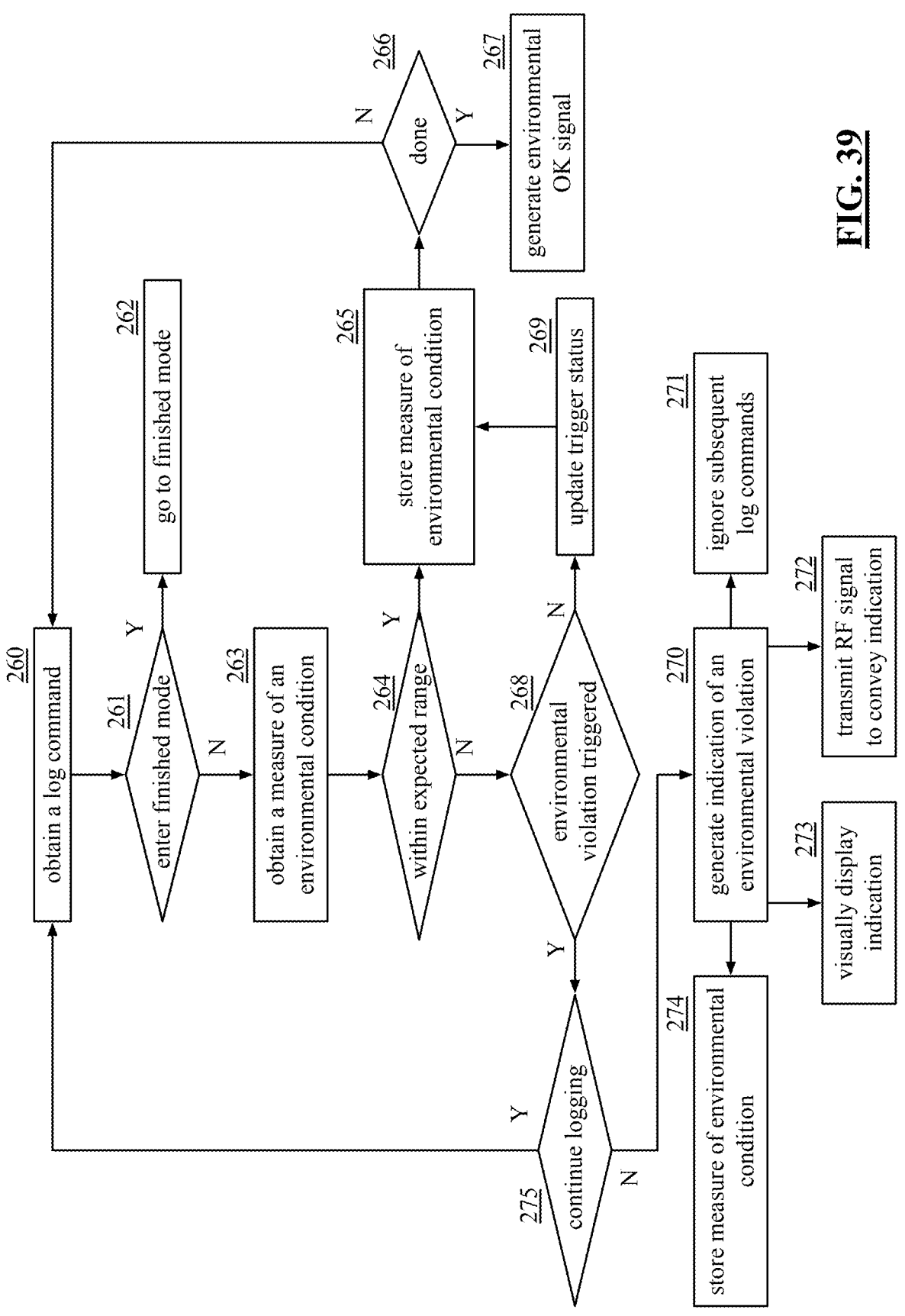
FIG. 39 is a logic diagram of another example of a method of data logging.

FIG. 39 is a logic diagram of another example of a method of data logging. The method begins at step 260, where the data logging device obtain a log command. As previously discussed, the log command is one of a plurality of log commands that are to be generated during a logging session (e.g., the data logging device transitioning from the standby mode to the ready mode to the logging mode). The transition from one mode to another may be initiated via a non-RF activation circuit.

The method continues at step 261, where the data logging device determines whether to enter a finished mode for the data logging device based on a data logging condition (e.g., low battery power, tampering that compromises data integrity, a device failure, etc.). If a data logging condition exists, the method continues at step 262, where the data logging device enters the finished mode. If the cause for entering the finished mode is insufficient battery power, the data logging device generates, a power violation signal and sends it to the display, which provides a visual an indication of a power violation.

If the data logging device does not enter the finished mode, the method continues at step 263, where the data logging device obtains a measure of an environmental condition (as previously discussed). The method continues at step 264, where the data logging device determines whether the measure of the environmental condition is within an expected range.

When the measure of the environmental condition is within the expected range, the method continues at step 265, where the data logging device stores the measure of the environmental condition. The method continues to step 266, where the data logging device determines whether the logging session is done (i.e., enter the done mode). If yes, the method continues at step 267, where the data logging device generates an environmental OK signal (e.g., a green light for OK). If the logging session is not done, the method repeats at step 260.

If, at step 264, the measure of the environmental condition is not within the expected range, the method continues at step 268, where the data logging device determines whether the measure of the environmental condition not being within the expected range triggers an environmental violation (e.g., one exception triggers it, or a cumulative effect triggers it as discussed with reference to FIG. 34). If not, the method continues at step 269, where the data logging device updates the trigger status (e.g., records the exception and adds to the cumulative exceptions). The method then continues at step 265.

If the measure of the environmental condition not being within the expected range triggers an environmental violation, the method continues at step 275, where the data logging device determines whether to continue data logging of the environmental condition. If yes, the method continues at step 260. For example, the data logging device continues the data logging of the environmental condition after a likely environmental violation where, at a later time, a reader and/or a computing device definitively determine whether an environmental violation has occurred or not. In this example, the data logging device continues logging data until the done mode is entered.

If, at step 275, data logging is not to continue, the method continues at step 270, where the data logging device generates an indication of an environmental violation. The method continues at one or more steps 271-274. At step 271, the data logging device ignores subsequent log commands when the environmental violation signal has been generated.

At step 272, the data logging device transmits an RF signal to convey the environmental violation signal. At step 273, the data logging device generates a visual and/or audible indication based on the environmental violation signal (e.g., a red light). At step 274, the data logging device stores the measure of the environmental condition in memory of the data logging device. Note that the data logging device may wait for the data logging device to be in a done mode before providing the environmental violation signal to the display.

Figure 40:
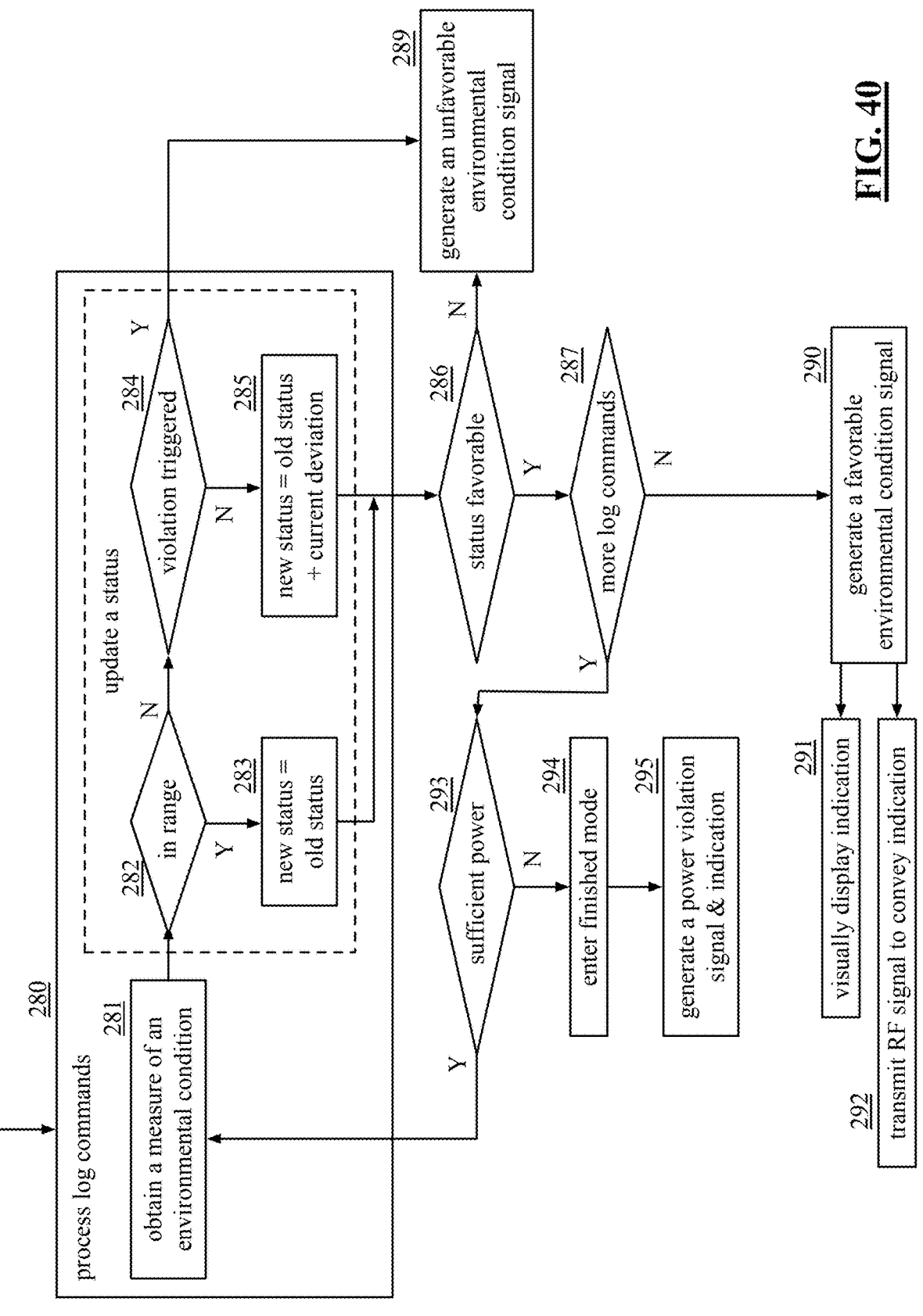
FIG. 40 is a logic diagram of another example of a method of data logging.

FIG. 40 is a logic diagram of another example of a method of data logging. The method begins at step 280, where the data logging device processes a plurality of log commands. The processing includes step 281 in which the data logging device obtains a measure of an environmental condition. The processing also includes the data logging device updating a status of the environmental condition based on the measure of an environmental condition. The updating includes steps 282-285.

At step 282, the data logging device determines whether the measure of the environmental condition is within an expected range. If so, the method continues to step 283, where the data logging device indicates a current status of favorable for the log command. For example, the data logging device sets the new status to equal the old status (e.g., no existing violations or cumulative violations below a triggering threshold).

When the measure of the environmental condition is not within an expected range, the method continues at step 284, where the data logging device determines whether the current measure of the environmental condition not being within the expected range triggers an unfavorable status by itself. If it does, the method continues at step 289, where the data logging device generates an unfavorable environmental condition signal, or an environmental violation signal.

If the current measure by itself does not trigger an unfavorable status, the method continues at step 285, where the data logging device updates the violation status to include the most recent out of range measurement. After the status has been updated at step 283 or at step 285, the method continues at step 286, where the data logging device determines whether the updated status is favorable (e.g., the cumulative violations do not constitute an environmental violation). If the updated status is unfavorable, the method continues at step 289, where the data logging device generates an unfavorable environmental condition signal, or an environmental violation signal.

If the status is favorable, the method continues at step 287, where the data logging device determines whether there are more log commands to process (e.g., the programmed logging duration has not ended, the programmed number of log commands have not been processed, and/or a command to enter the done mode). If there are more log commands to process, the method continues at step 293, where the data logging device determines whether the battery has sufficient power to power the data logging device for processing one or more remaining log commands. If yes, the method repeats at step 281.

If the battery has insufficient power for processing one or more remaining log commands, the method continues at step 294, where the data logging device enters a finished mode. The method continues at step 295, where the data logging device generates a power violation signal in response to the data logging device lacking sufficient power. The data logging device may further display an indication of a power violation based on the power violation signal.

If, at step 287, there are no more log commands to process, the method continues at step 290, where the data logging device generates a favorable environmental condition signal (e.g., an environment OK signal and enters the done mode). As configured, the data logging device displays an indication of the status of the environmental condition being favorable based on the favorable environmental condition signal. As requested by an authorized communication device, the data logging device transmits an RF signal that includes the favorable environmental condition signal.

Figure 41A:
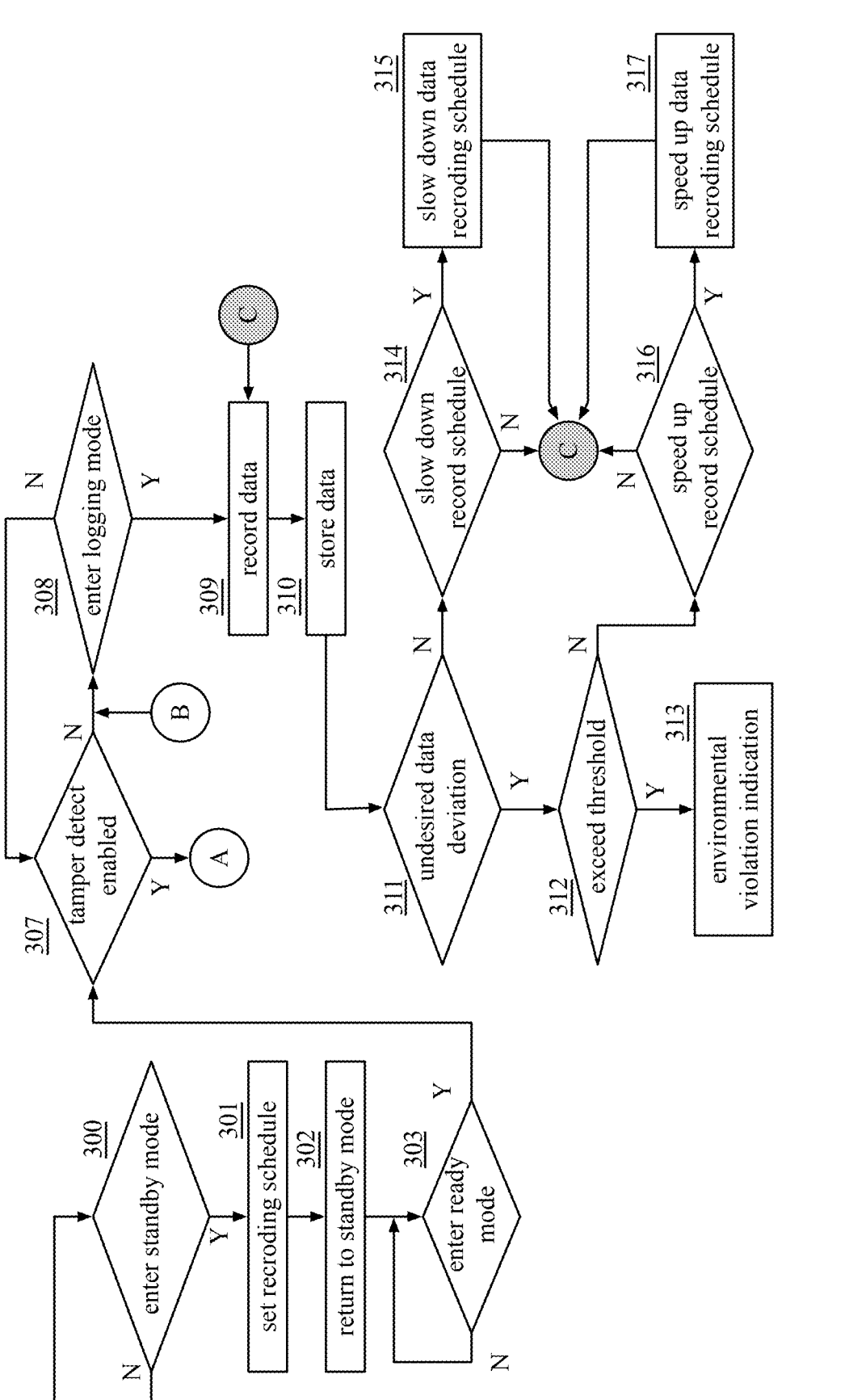
FIGS. 41A and 41B are logic diagrams of another example of a method of data logging.
Figure 41B:
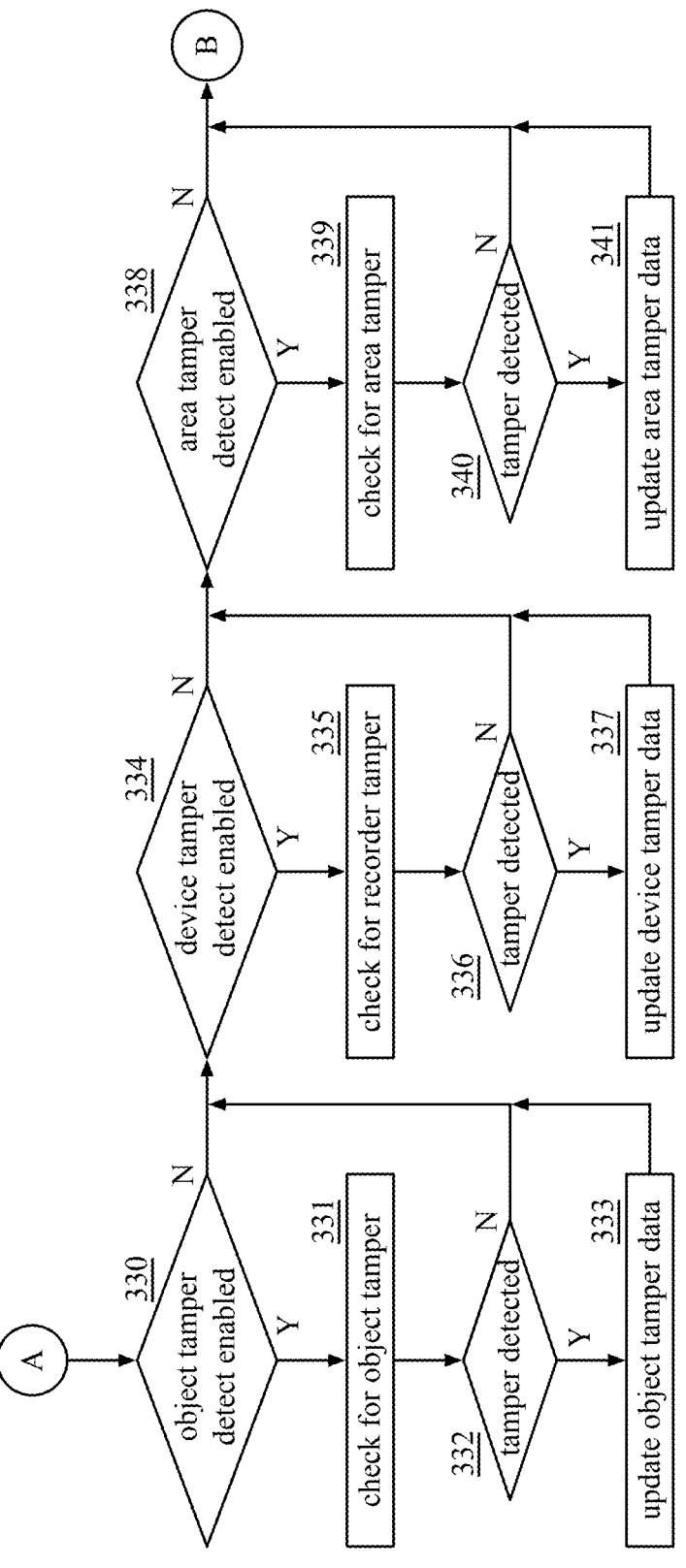

FIGS. 41A and 41B are logic diagrams of another example of a method of data logging. The method begins at step 300 of FIG. 41A, where a data logging device determines whether to enter the standby mode. For example, the data logging device determines whether it has received a second activation command. If so, the data logging device transitions from the sleep mode to the standby mode.

While in the standby mode, the method continues at step 301, where the data logging device enters a configuration state and sets a recording (e.g., data logging) schedule. For example, the recording schedule includes a number of data logging commands to process, the timing between data logging commands, the duration of data logging, etc.

After configuration, the method continues at step 302, where the data logging device returns to the standby mode. The method continues at step 303, where the data logging device determines whether it should transition to a ready mode (e.g., the data logging device receives the third activation signal).

The method continues at step 307, where the data logging device determines whether tamper detection has been enabled. Tamper detection may be enabled any time a battery is installed. In this example, it's enabled after entering the ready mode and before entering the logging mode. In a different example, the enablement of tamper detection occurs after the data logging device enters the logging mode. If tamper detection is not currently enabled, the method continues at step 308, where the data logging device determines whether to enter the logging mode (e.g., the data logging device received a 4th activation signal). If not, the method repeats at step 307.

If the data logging device entered the logging mode, the method continues to step 309, where the data logging device records data in accordance with log commands. The method continues at step 310, where, for a log command, the data logging device stores a measure of an environmental condition. The method continues at step 311 where the data logging device determines whether the current measure of the environmental condition is an undesired deviation from previous measures of the environmental condition. For example, if the maximum temperature is set to −20° C., the current measure is −28° C., the average of previous measures is −31.2° C., and the previous standard deviation is +/−1.1° C. (as calculated or as configured), then the deviation of the current measure from the average measure is beyond the standard deviation. Thus, while the current measure does not violate the maximum temperature threshold, it would constitute an undesired deviation.

If the current measure does not constitute an undesired deviation, the method continues at step 314, where the data logging device determines whether to slow down the rate of log commands. An example of slowing down the log command rate will be described in greater detail with reference to FIG. 42. If not, the method repeats at step 309. If the rate can be slowed down, the method continues at step 315, where the data logging device slows down the rate of the recording schedule (e.g., the rate of the log commands). The amount of slowing down the rate is dependent on how consistent the data has been, how much data has been collected, and/or the margin of error from one or more thresholds.

For example, if the maximum temperature is set to −20° C., the average of previous measures is −31.2° C., and the measured standard deviation is +/−0.1° C., the average is far enough away from the threshold and the standard deviation is very low. Thus, the rate of log commands could be reduced by 25% or more. As another example, if the maximum temperature is set to −20° C., the average of previous measures is −21.2° C., and the measured standard deviation is +/−0.1° C., then the rate of log commands should not be reduced since the average is close to the threshold. Once the rate is slowed down, the method repeats at step 309.

If, at step 311, the current measure constitutes an undesired deviation, the method continues at step 312, where the data logging device determines whether the current measures exceeds an environmental violation threshold (e.g., individual violation or cumulative violation). If yes, the method continues at step 313, where the data logging device generates an environmental violation indication and the data logging device enters the done mode (done mode not shown in Figure).

If the current measure does not trigger an environmental violation, the method continues at step 316, where the data logging device determines whether to speed up the recording schedule (e.g., increase the rate of log commands). In general, the more volatility of the measures of the environmental condition in combination with the sensitivity of the object to an environmental violation, the more likely the data logging device will increase the rate of log commands.

For example, the data logging device determines to increase the rate of log commands based on a variety of factors and a varied weighting of the factors based on the object to which the data logging device is affiliated. The factors include the current measure, the average of previous measures, the standard deviation of the previous measures, the standard deviation of the current measure, the rate of change of the standard deviation, the margin between the average measures and a threshold value, and/or the margin between the current measure and a threshold value.

For example, the data logging device utilizes the following equation:

increase rate=$a$*(difference between current measure and threshold value)−$b$*(the current standard deviation)+$c$*(difference between the average measure and the threshold value)−$d$*(difference between current standard deviation and previous overall standard deviation)−$e$*(rate of change of the standard deviation).

The coefficients "a" through "e" are programmable based on the sensitivity of the object to an environmental violation (e.g., a medicine that must be kept frozen is highly sensitive to an environmental violation).

In general, to keep the rate of the log commands at the same rate, the values for the (difference between current measure and threshold value) and the (difference between the average measure and the threshold value) should be large (e.g., 5° C. or more); the values for the (current standard deviation) and the (difference between current standard deviation and previous overall standard deviation) should be low (e.g., 2° C. or less) and the value for the (rate of change of the standard deviation) should be very low (e.g., less than 0.2° C.)

As an example, the maximum temperature is set to −20° C., the current measure is −27.5° C., the average of previous measures is −31.2° C., the previous overall standard deviation is +/−1.1° C., the current standard deviation is +/−1.3° C., the standard deviation for the current measure is 3.7° C. For this example, the following values are obtained:

the (difference between current measure and threshold value)=−27.5° C.−(−20.0° C.)=7.5° C.;

the (current standard deviation)=−27.5° C.−(−31.2° C.)=3.7° C.;

the (difference between the average measure and the threshold value)=31.2° C.−(−20° C.)=11.2° C.;

the (difference between current standard deviation and previous overall standard deviation)=3.7° C.−1.1° C.=2.6° C.;

the (rate of change of the standard deviation)=1.3° C.−1.1° C.=0.2° C.

For this example and for a sensitive object, the coefficients are a=1; b=2, c=1, d=3, and e=25. With these coefficients and the data above, the equation=1*7.5−2*3.7+1*11.2−3*2.6−25*0.2=−1.5.

With the increase rate value being negative, it indicates that the rate should be increased. The "1.5" magnitude indicates by how much. For this example, the 1.5 magnitude indicates an increase of 5% or more. The rate of increase may be linear or non-linear with respect to the magnitude of the increase rate resultant. If the increase rate resultant is a positive number, it indicates that the rate does not need to be increased.

If the data logging device determines that the rate does not need to be increased, the method repeats at step 309. If the data logging device determines that the rate does need to be increased, the method continues at step 317, where the data logging device increases the rate. The method then repeats at step 309.

If, at step 307, the tamper detection is enabled, the method continues at step 330 of FIG. 41B, where the data logging device determines whether object tamper detection (e.g., detect tampering of the object) is enabled. If it is, the method continues at step 331, where the data logging device checks for unauthorized tampering of the object. For example, the data logging devices determines when packaging of the object has been damage (e.g., sense a rip or tear in the packaging via a conductive short or open in a packaging conductor).

The method continues at step 332, where the data logging device determines whether an object tampering has occurred. If not, the method continues at step 334. If a tamper is detected, the method continues at step 333, where the data logging device updates object tamper data. For example, the data logging device sets an object tamper flag, and/or timestamps the detection. As another example, the data logging device records a type of object tampering (e.g., packaging tampering, swelling of the packaging, opening of the packaging, etc.).

The method continues at step 334, where the data logging device determines whether the tamper detection for the data logging device (e.g., tampering with the data, unauthorized writes, unauthorized reads, etc.) is activated. If not, the method continues at step 338. If it is, the method continues at step 335, where the data logging device checks for tampering of the data logging device. For example, the data logging device checks for low battery, damage to the circuitry of the data logging device, unauthorized memory access that compromises the integrity of the data, removal from the object, etc. Tamper detection of the data logging device will be described in greater detail with reference to one or more of FIGS. 50-53C.

The method continues at step 336, where the data logging device determines whether a device level tampering has been detected. If not, the method continues at step 338. If there is a tamper detection, the method continues at step 337, where the data logging device updates device tampering data (e.g., enters the finished mode and the reason, or reasons, for it).

The method continues at step 338, where the data logging device determines whether the tamper detection for the area housing the labeled object is activated. The area housing the labeled object includes a box, a refrigerator, a truck bed, a room, a container, etc. If not, the method continues at step 308 of FIG. 41A. If it is, the method continues at step 339, where the data logging device checks for tampering of the area housing the labeled object (e.g., loss of power for a refrigeration unit, too much ambient light, too much moisture, tool little moisture, too much pressure, too little pressure, etc.).

If tampering of the area is not detected, the method continues at step 308 of FIG. 41A. If tampering is detected at step 340, the method continues at step 341, where the data logging device updates area tampering data. For example, the data logging device records the type of tampering (e.g., power loss, ambient light, moisture, pressure, etc.) and the time of the tampering.

Figure 42:
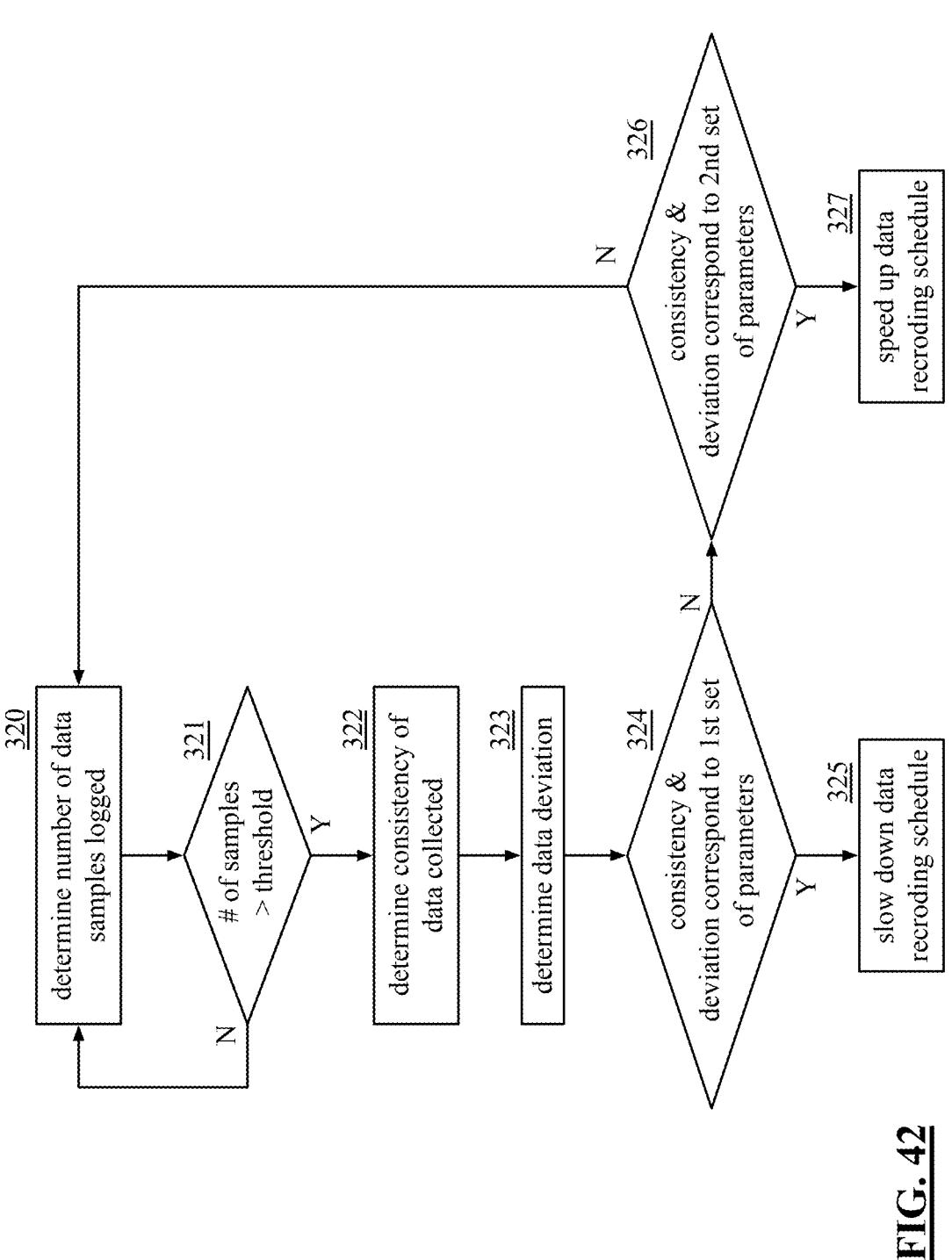
FIG. 42 is a logic diagram of an example of a method of adjusting data logging.

FIG. 42 is a logic diagram of an example of a method of adjusting data logging rate (e.g., the rate of log commands). The method begins at step 320, where the data logging device determines a number of data samples that have been logged. The method continues at step 321, where the data logging device determines whether the number of data samples that have been logged exceeds a threshold number. For example, if there are 100 samples to be performed, has the current number of samples performed exceed a threshold (e.g., 20 or more). If not, the method repeats at step 320.

If the number exceeds the threshold, the method continues at step 332, where the data logging device determines the consistency of the data collected and the data deviation at step 333 (examples were provided with reference to FIG. 41A). The method continues at step 324, where the data logging device determines whether the consistency and deviation correspond to a first set of parameters (e.g., parameters to slow down the rate of log commands as discussed with reference to FIG. 41A). If yes, the method continues at step 325, where the data logging device slows down the data recording schedule (e.g., the rate of log commands).

If the first set of parameters is not met, the method continues to step 326, where the data logging device determines whether the consistency and the deviation corresponds with a second set of parameters (e.g., parameters to speed up the rate of log commands as discussed with reference to FIG. 41A). If yes, the method continues at step 327, where the data logging device increases the data recording schedule (e.g., the rate of log commands). If not, the method repeats at step 320.

Figures 43, 44:
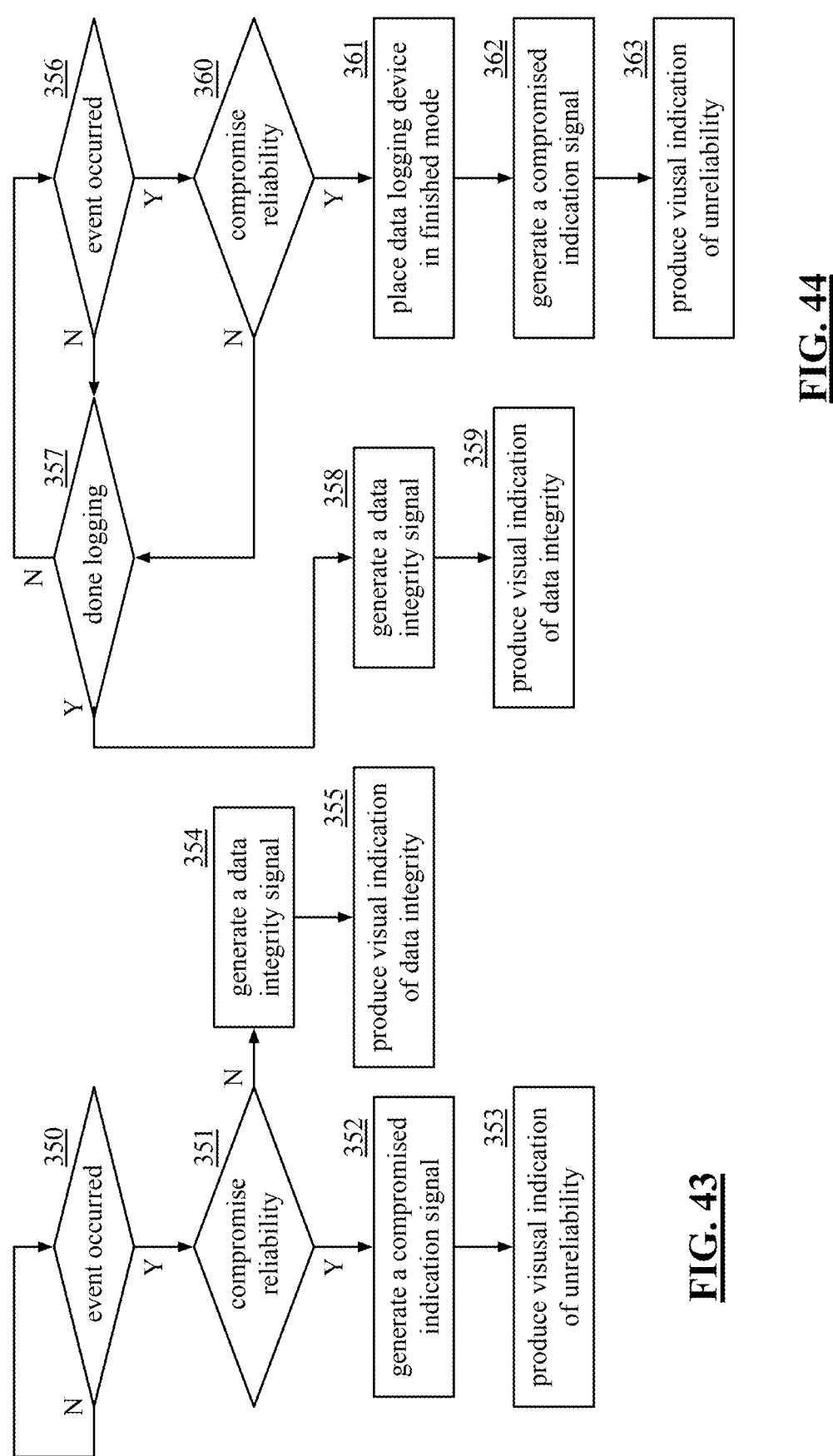
FIG. 43 is a logic diagram of another example of a method of data logging.
FIG. 44 is a logic diagram of another example of a method of data logging.

FIG. 43 is a logic diagram of another example of a method of data logging and, in particular, tamper detection. The method begins at step 350, where the data logging device determines whether an event has occurred that potentially compromises reliability of the data logging device. In an embodiment, an anti-tamper detector of the data logging device detects the event and provides an indication of detection of the event to the processing module.

For example, the event includes an invalid data write request, which results when a reader doesn't have an encryption key (authentication), there are too many pings to the data logging device, and/or the digital signature for data integrity cannot be authenticated. As another example, the event includes an invalid data read request. As yet another example, the event includes physical damage to the data logging device (e.g., too much pressure, temperature exceeds operating condition of device, test connection opens or closes, and/or operational failure).

As a further example, the event includes removal of the data logging device from an object (e.g., break a connection to conductive element on the object, change in impedance of adhesive, and/or two layers of adhesive—one to object more bonding than one between circuitry and first layer). As a still further example, the event includes a tear strip removed or damage (e.g., opens or closes a conductive path).

As a still further example, the event includes an auxiliary environmental condition; (e.g., ambient light for primary of temperature). As a still further example, the event includes a battery failure (e.g., voltage and/or current sensing circuits). As a still further example, the event includes a functional failure of the data logging device (e.g., not measuring an environmental condition in response to a logging request, and/or a failure to transition from one mode to another in accordance with the appropriate activation signals). As a still further example, the event includes an invalid mode change request (e.g., go backwards in the modes of FIG. 31).

The method continues at step 351, where the data logging device determines whether the reliability of the data logging device has been compromised. In general, the data logging device is compromised when an unauthorized access of the memory of the data logging device has occurred and the data integrity of the memory as a result of the unauthorized access cannot be assured. For example, if an unauthorized access device (e.g., a data communication device not associated with the source, not associated with the destination, and/or associated with the means of transit) overwrites configuration data or recorded data, then the data integrity has been compromised. As another example, if a write command from an unauthorized access device is not executed, it is an unauthorized access, but it did not compromise the data integrity.

In an example, the data logging device determines whether the reliability of the data logging device has been compromised further by determining whether a data write request is received from a reader or other external device subsequent to the data logging device being place in a ready mode (e.g., via an RF signal or via the data port). This example continues with the data logging device indicating that the reliability of the data logging device has been compromised when it cannot verify that such a write request was not executed.

In another example, the data logging device determining whether the reliability of the data logging device has been compromised further by obtaining a request for a mode change. In response to the request, the data logging device determining whether it is valid (e.g., a proper transition of modes, from a valid source, and/or changed in stored mode configuration data). If it is invalid, the data logging device indicates that the reliability of the data logging device has been compromised.

If the reliability of the data logging device has been compromised, the method continues at step 352, where the data logging device generates a compromised indication signal. The method continues at step 353, where the data logging device produces a visual indication of the unreliability of the data logging device. In an embodiment, a display of the data logging device produces a visual indication that reliability of the data logging device has been compromised based on the compromised indication signal.

In another embodiment, the processing module generates the compromised indication signal that supersedes an environmental favorable indication signal and an environmental unfavorable indication signal. In this embodiment, the display of the data logging device provides no visual indication for the data logging device to indicate that the data logging device has been compromised. In this instance, without the data logging device being compromised, the display would provide a visual indication based on the environmental favorable indication signal (e.g., a green light) or the environmental unfavorable indication signal (e.g., a red light).

If, at step 351, the reliability of the data logging device has not been compromised, the method continues at step 354, where the data logging device generates a data integrity indication signal (e.g., favorable or unfavorable environmental indication signal). The method continues at step 355, where the data logging device produces a visual indication of the data integrity (e.g., a green light for favorable and a red light of unfavorable).

FIG. 44 is a logic diagram of another example of a method of data logging and, in particular, tamper processing. The method begins at step 356, where the data logging device determines whether an event (as described with reference to FIG. 43) has occurred. If not, the method continues at step 357, where the data logging device determines whether data logging is complete (e.g., time to enter the done mode). If yes, the method continues at step 358, where the data logging device generates a data integrity signal (e.g., an environmental violation occurred, or it didn't). The method continues at step 359, where the data logging device produces a visual indication of the data integrity signal (e.g., a green light for environment ok and a red light for an environmental violation).

If, at step 356, an event does occur, the method continues at step 360, where the data logging device determines whether the event compromises the reliability of data (examples were provided with reference to FIG. 43). If not, the method repeats at step 357.

If the event does compromise the reliability of the data, the method continues at step 361, where the data logging device places itself in a finished mode. The method continues at step 362, where the data logging device generates a compromised indication signal and generates a visual display of the compromised indication signal at step 363.

Figure 45:
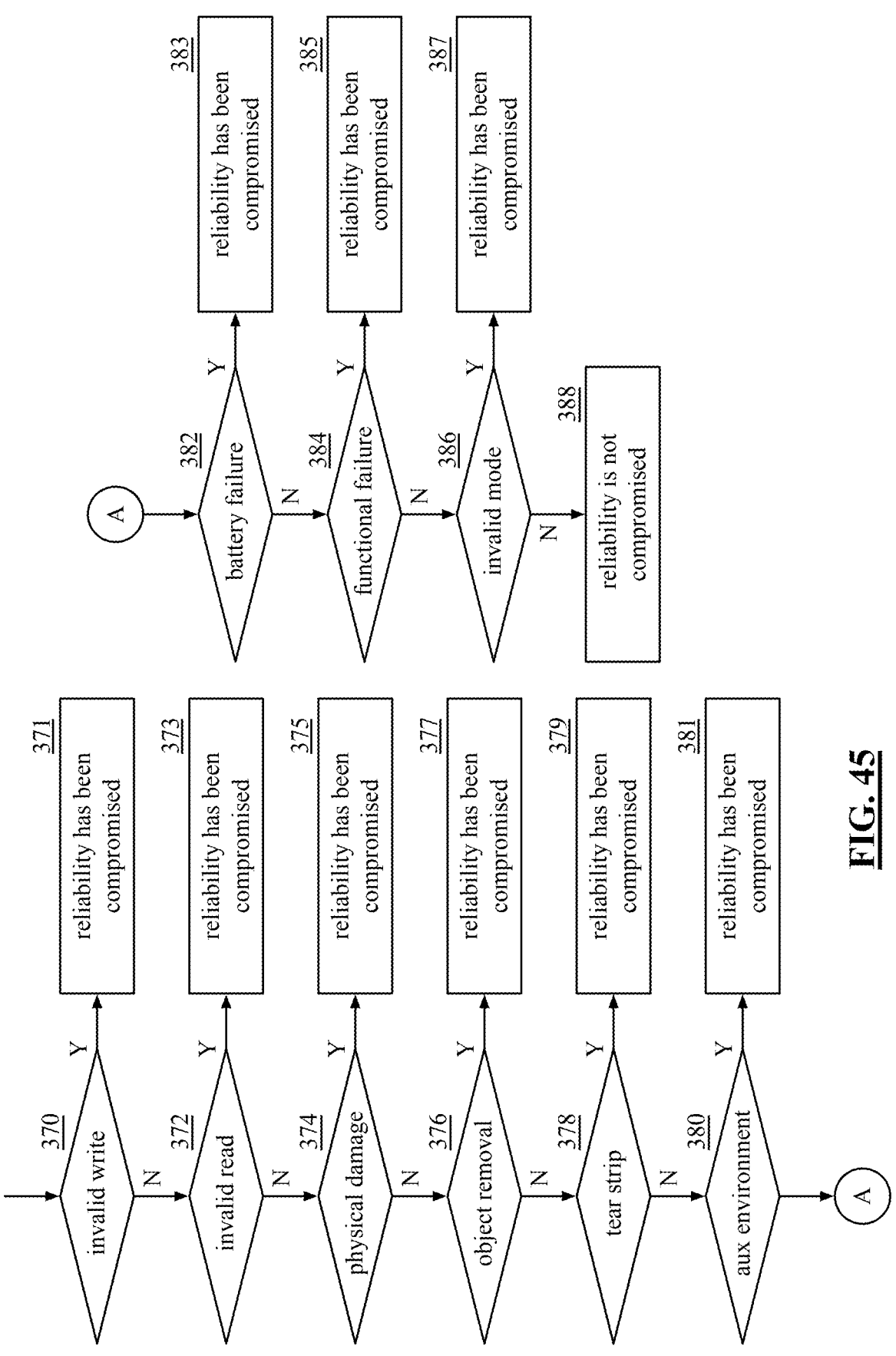
FIG. 45 is a logic diagram of another example of a method of data logging.

FIG. 45 is a logic diagram of another example of a method of data logging and in particular to detecting an event that compromising the reliability of the data logging device. The method begins at step 370, where the data logging device determines whether an invalid write request has been executed. If yes, the method continues at step 371, where the data logging device indicates that it has been compromised. If not, the method continues at step 372, where the data logging device determines when an invalid read have been executed.

If yes, the method continues at step 373, where the data logging device indicates that it has been compromised. If not, the method continues at step 374, where the data logging device determines it has suffered physical damage (e.g., a broken trace, a damage component, no responding to valid requests, etc.). If yes, the method continues at step 375, where the data logging device indicates that it has been compromised. If not, the method continues at step 376, where the data logging device determines whether it has been removed from the object.

If yes, the method continues at step 377, where the data logging device indicates that it has been compromised. If not, the method continues at step 378, where the data logging device determines whether a tear strip has been opened or shorted. If yes, the method continues at step 379, where the data logging device indicates that it has been compromised. If not, the method continues at step 380, where the data logging device determines whether an auxiliary environmental violation occurred (e.g., ambient light).

If yes, the method continues at step 381, where the data logging device indicates that it has been compromised. If not, the method continues at step 382, where the data logging device determines whether the battery has failed (e.g., damage or depleted). If yes, the method continues at step 383, where the data logging device indicates that it has been compromised. If not, the method continues at step 384, where the data logging device determines whether a functional failure has occurred (e.g., RTC stops working properly, sensor not working, etc.).

If yes, the method continues at step 385, where the data logging device indicates that it has been compromised. If not, the method continues at step 386, where the data logging device determines whether an invalid mode transition has been executed. If yes, the method continues at step 387, where the data logging device indicates that it has been compromised. If not, the method continues at step 388, where the data logging device indicates that, at this time, the reliability of the data logging device has not been compromised.

Figure 46:
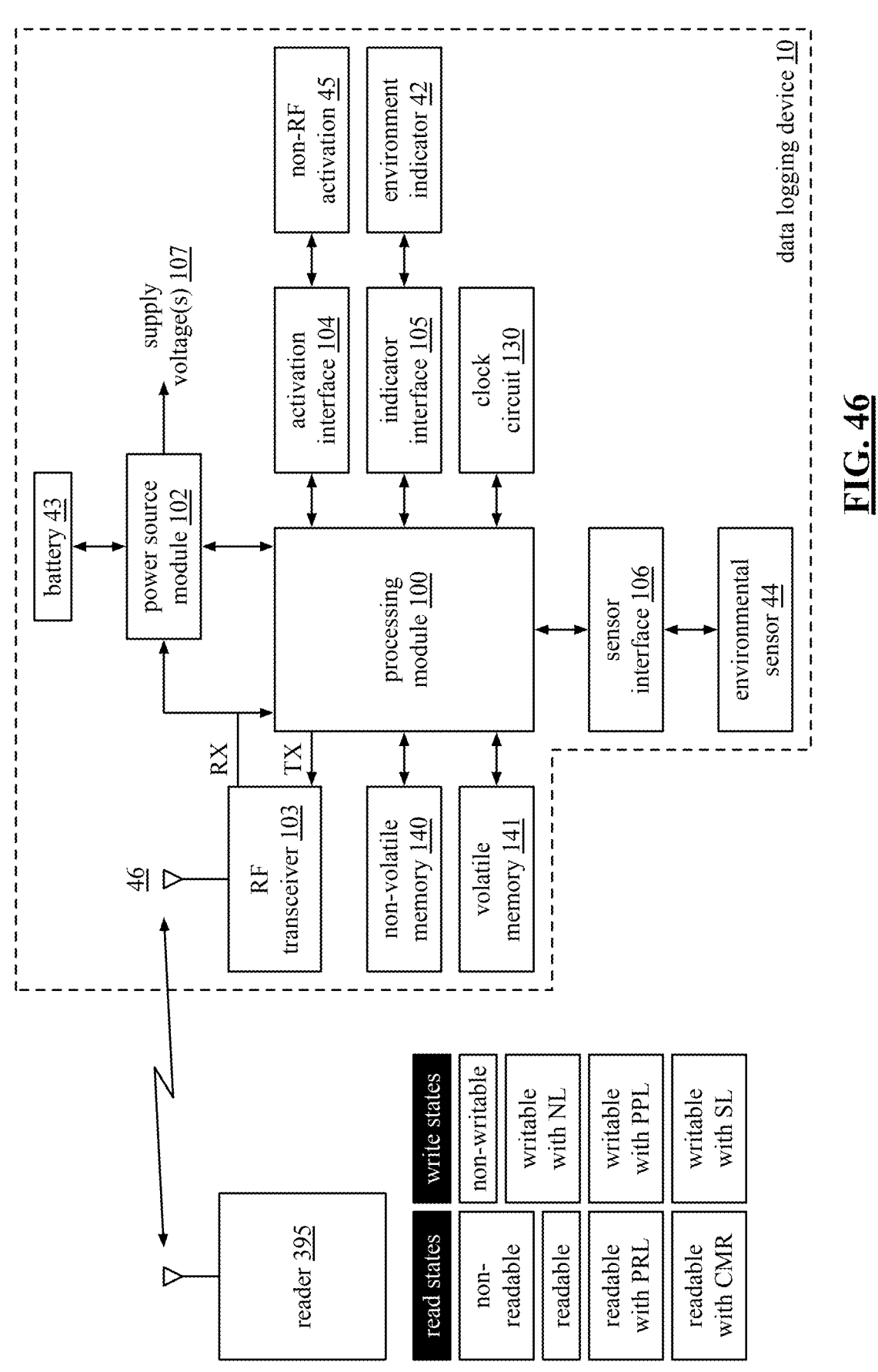
FIG. 46 is a schematic block diagram of an example of a data logging device communicating with a reader.

FIG. 46 is a schematic block diagram of an example of a data logging device 10 communicating read and write requests with a reader 395 (e.g., a data communication device 51 of FIG. 12). The data logging device 10 includes an environmental indicator 42, a battery 43, a sensor 44, a non-RF activation circuit 45, an antenna 46, a processing module 100, non-volatile memory 140, volatile memory 141, a power source module 102, an RF transceiver 103, an activation interface 104, an indicator interface 105, a clock circuit 130, a supply voltage 107, and a sensor interface 106.

The data logging device 10 can communicate with the reader 395 using security protocols based on the AES-128 private key cryptography. Under the reader's control, the message transmission from the logging device to the reader has four methods: 1) unsigned clear message transmission, 2) signed clear message transmission, 3) unsigned secret message transmission, and 4) signed secret message transmission. Message secrecy is achieved by encrypting the message using an AES-128 based message secrecy protection protocol, and message signature is obtained using an AES-128 based message integrity protection protocol with a separate 128-bit AES key.

The non-volatile memory 140 includes MTP (multi-time programmable) memory and flash memory. The volatile memory 141 includes register files. During various modes of the data logging device, external access to the memories 140 and 141 is only through an RF communication link.

The volatile memory is reader-read only and cannot be programmed by a reader. The non-volatile memory can be write-protected at the 16-bit word boundaries (each word consists of 16-bit memory cells) subject to the settings of the word write-lock attributes under the controls of the IC manufacturer and/or a reader. Write-lock attributes include read only (R), access password write lockable (APWL), proprietary password write lockable (PPWL), logger sticky lockable (LSWL), and write non-lockable (WNL). The proprietary password write lockable is based on a proprietary password injected during the chip wafer probe, while the access password write lockable is based on an access password either injected at the chip probe or programmed by a reader at a later time.

The read only (R) memory words are not writable by the reader. Such words include all volatile memory, identification of the data logging device, the logged data words, and some communication protocol required state word. For example, these words include a 48-bit serial identification number for the data logging device, an extended TID (tag Identification) header (16 bits), a data logging device model number (16 bits), and a manufacturing identification code (16 bits).

For writeable non-volatile memory words, writing the words by a reader is subjected to the lock attributes of APWL, PPWL, LSWL, and WNL for the words.

For protocol access password write lockable (APWL) words, an authorized reader first sets the access password for the logging device, and then locks the words such that these words are only writable by a reader possessing the same access password.

For write non-lockable (WNL) words, there are no write restrictions for a reader.

For proprietary password write lockable (PPWL) words, these words are protected by the proprietary password only. To write to PPWL words, the reader writes the propriety password into the proprietary password word of the non-volatile memory. PPWL words include a variety of parameter settings regarding one or more sensors calibration data, and the logging device's IC circuit trim values.

For logger sticky write lockable (LSWL) words, these words are protected by a hardware sticky bit if the corresponding enabling non-volatile memory location is set by a reader. Once the LSL hardware bit is set to high it remains high until the battery is depleted or an authorized reader's re-initialization process takes place. The LSWL words include the crypto keys, the entire EPC memory bank, the entire TID memory bank, and the logger configuration space in User memory bank.

The non-volatile memory words storing cryptographic keys can be write locked indirectly by the access password. These words have a key write lock (KWL) attribute which can be set and locked by a reader using the access password. Once the KWL attribute is set for the KWL words, these words become non-writable.

The volatile memory and/or the non-volatile memory can be read protected at the 16-bit word boundaries (each word consists of 16-bit memory cells) subject to the settings of the word read-lock attributes under the control of a reader.

Read-lock attributes include write only (W), access password read lockable (APRL), and read non-lockable (RNL). The access password read lockable is based on an access password either injected at the chip probe or programmed by a reader at a later time.

The write only (W) memory words are not readable by the reader, and they are only visible to the circuitry of the data logging device. Such words include proprietary password, and cryptographic keys. For example, they include a pair of 128-bit AES symmetric keys.

For protocol access password read lockable (APRL) words, an authorized reader first sets the access password for the logging device, and then locks or hides the words such that these words are only readable by a reader possessing the same access password. In addition, the kill password and access password can be made permanently readable or not readable by an authorized reader based on the access password.

For read non-lockable (RNL) words, there are no read restrictions for a reader. The RNL words include all propriety password write lockable (PPWL) words, and some communication protocol required state words such as Stored CRC and Stored PC.

The volatile memory and/or the non-volatile memory words can be cryptographically processed using standard AES-128 security protocols to form cipher text messages before they are transmitted to a reader. For example, the data logging device includes a crypto engine to process the data stored in the memory upon a reader's request. The crypto engine processes the raw memory data to derive a payload message and sends the message directly to a reader. An example of memory mapping is provided with reference to one or more of FIGS. 48 and 49.

Figure 47:
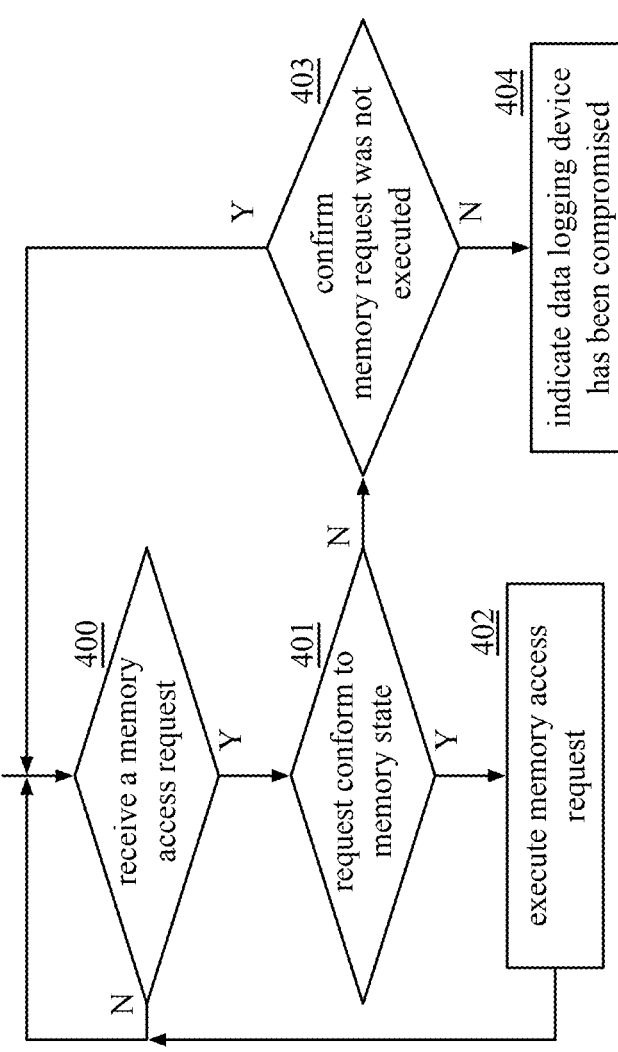
FIG. 47 is a logic diagram of another example of a method of memory access to a data logging device.

FIG. 47 is a logic diagram of another example of a method of accessing a data logging device's memory. The method begins at step 400, where the data logging device determines whether it has received a memory access request (e.g., a read request or a write request). Once a memory access request is received, the method continues at step 401, where the data logging device determines whether the request conforms to an appropriate memory state (e.g., read state or write state as shown). For example, does the request come from a reader with the correct password and authentication?

If yes, the method continues at step 402, where the data logging device executes the memory access request, and the method repeats at step 400. If, at step 401, the access request does not conform to an appropriate memory state, the method continues to step 403, where the data logging device determines whether the request was executed or not. If not, the method repeats at step 400. If the memory access request was executed, the method continues at step 404, where the data logging device indicates that it has been compromised.

FIGS. 48 and 49 are schematic block diagrams of an example of memory allocation within a data logging device. The example includes a memory bank column, a name column, a write column, a read column, and a comments column. The memory bank column indicates a memory category, which, for this example includes TID, reserved, and user.

The name column is for the name of the word stored in the particular memory category. The write column indicates the write state for the individual words. The read column indicates the read state for the individual words. The comments column includes comments regarding specific words or groups of words.

Figures 50, 51:
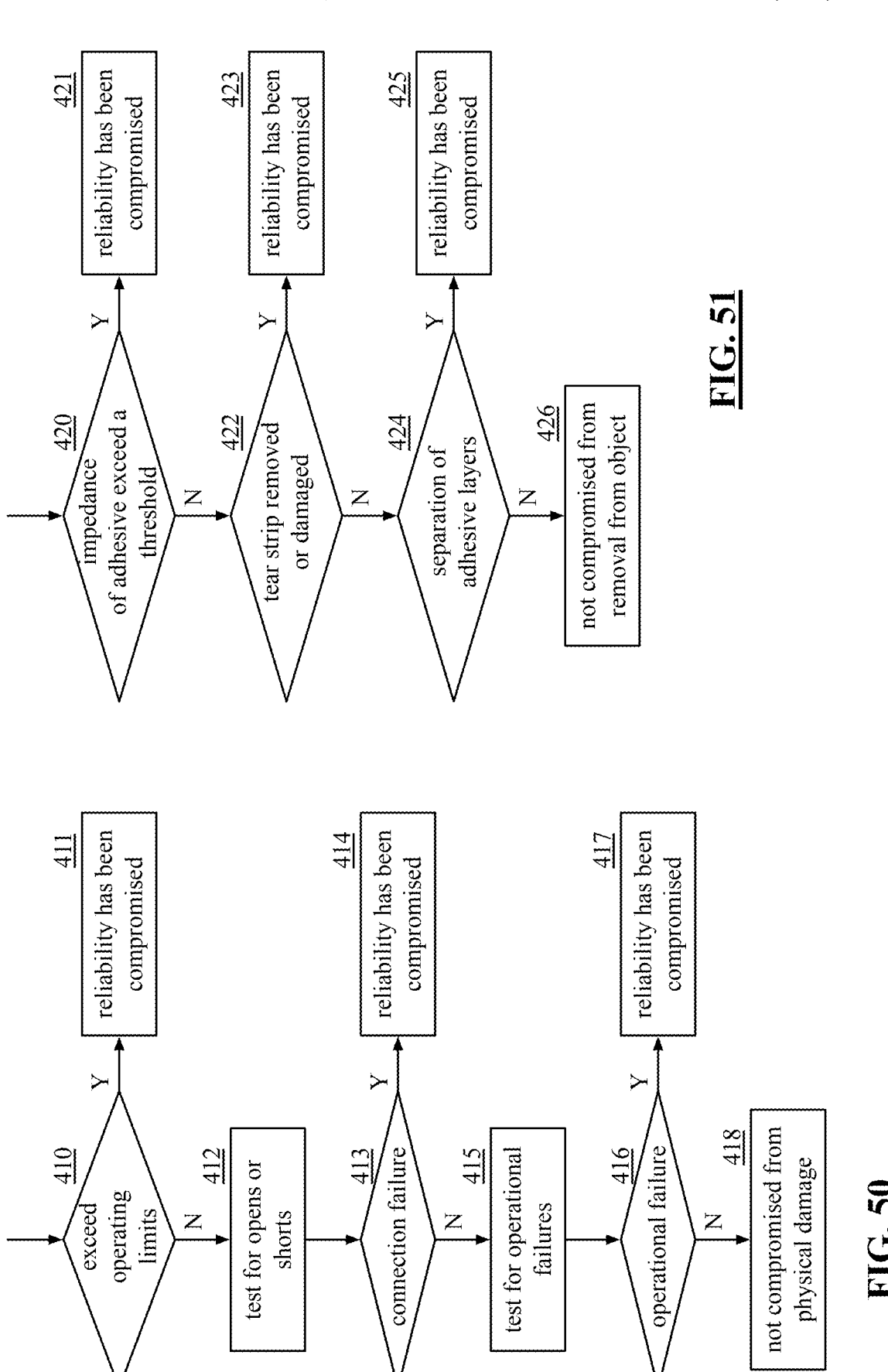
FIG. 50 is a logic diagram of an example of a method of detecting physical damage to a data logging device.
FIG. 51 is a logic diagram of an example of a method of detecting removal of a data logging device from an object.

FIG. 50 is a logic diagram of an example of a method of detecting physical damage to a data logging device. The method begins at step 410, where the data logging device determines whether it is subjected to operating conditions that exceeds its limits (e.g., operating temperature, over voltage, undervoltage, over current, etc.). If yes, the method continues at step 411, where the data logging device indicates that its reliability has been compromised due to physical damage.

If not, the method continues at step 412, where the data logging device tests for opens and/or shorts of traces of the circuitry of the data logging device and/or of test traces (e.g., traces for the purpose of testing for physical abuse of the object). The method continues at step 413, where the data logging device determines whether it detected any connection failures of the circuitry traces and/or the test traces. If yes, the method continues at step 414, where the data logging device indicates that its reliability has been compromised due to physical damage.

If not, the method continues at step 415, where the data logging device tests itself for operational failures (e.g., RTC stopped working, sensor stopped working, not responding to a valid memory access request, etc.). The method continues at step 416, where the data logging device determines whether it detected any operational failures. If yes, the method continues at step 417, where the data logging device indicates that its reliability has been compromised due to physical damage. If not, the method continues at step 418, where the data logging device indicates that no physical damage that compromises the reliability of the data logging device has been detected.

FIG. 51 is a logic diagram of an example of a method of detecting removal of a data logging device from an object. The method begins at step 420, where the data logging device determines whether the impedance of adhesive film of the data logging device exceeds a threshold. For example, the adhesive film includes an impedance strip on it. If the film is manipulated, the impedance strip will be damaged.

If yes, the method continues at step 421, where the data logging device indicates that its reliability has been compromised. If not, the method continues at step 422, where the data logging device determines whether a tear strip of the data logging device has been removed or damaged. An example of a tear strip will be described in greater detail with reference to one or more of FIGS. 52A-52D.

If yes, the method continues at step 423, where the data logging device indicates that its reliability has been compromised. If not, the method continues at step 424, where the data logging device determines whether a separation of adhesive layers has occurred. An example of the separation of adhesive layers will be described in greater detail with reference to one or more of FIGS. 53A-53C.

If yes, the method continues at step 425, where the data logging device indicates that its reliability has been compromised. If not, the method continues at step 426, where the data logging device indicates that it has been damaged from removal or attempted removal from the object.

Figures 52A, 52B, 52C, 52D:
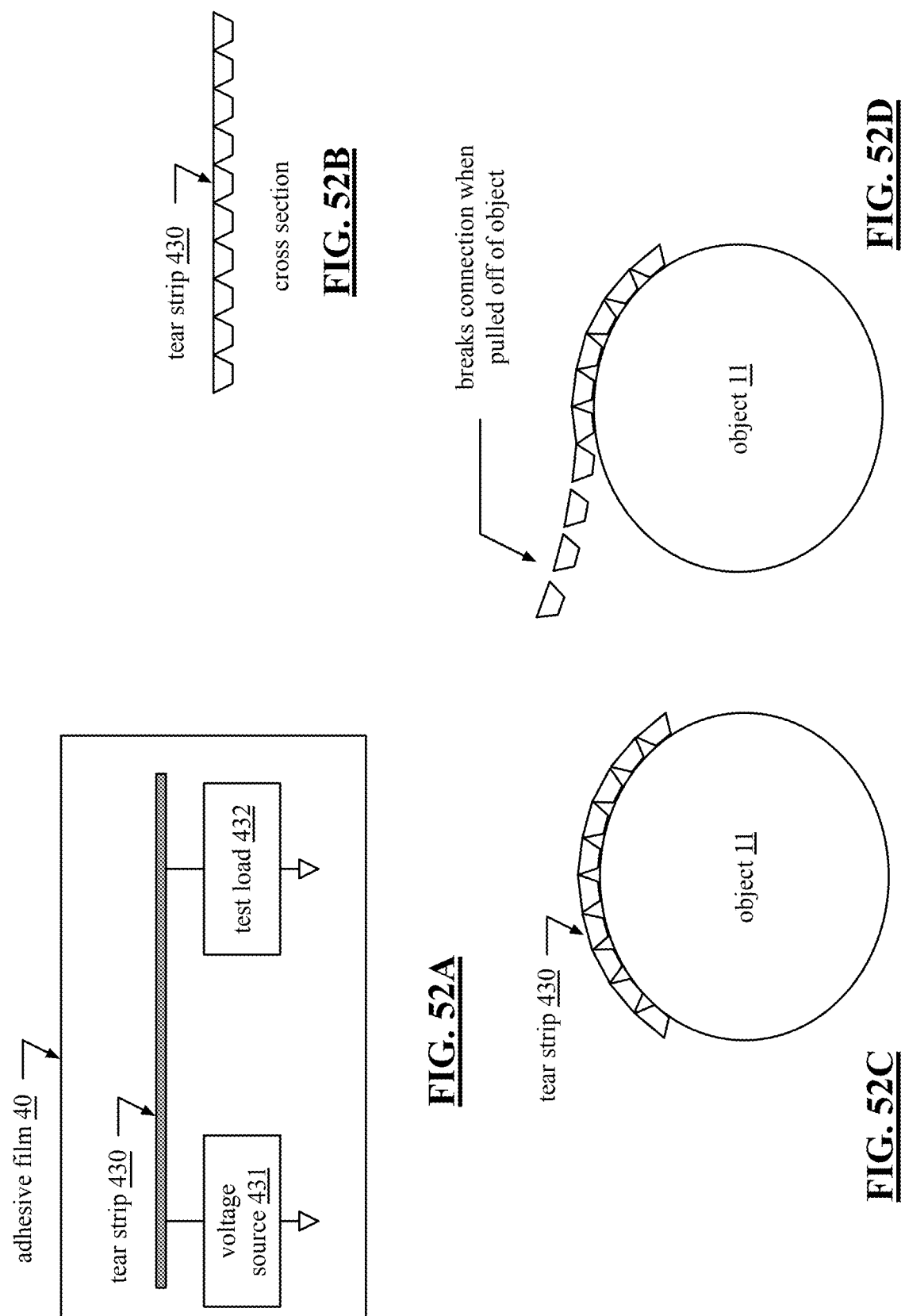
FIGS. 52A-52D are schematic block diagrams of an example of a tamper detection circuit of a data logging device.

FIGS. 52A-52D are schematic block diagrams of an example of a tamper detection circuit of a data logging device. FIG. 52A illustrates a tear strip 430 applied to the surface of the adhesive film 40. The tear strip 430 is coupled to voltage source 431 and to test load. For example, the voltage source is the battery, and the test load is a large resistor (e.g., 100 K-Ohms or more).

In an embodiment, the battery is connected to the tear strip only when anti-tamper detection is enabled. When enabled, the battery provides a voltage to the test strip, which is comprised of a conductive material (e.g., copper). When it's intact, it has a low impedance, and the battery voltage can be measured across the test load 432. If the tear strip is damaged, it becomes an open and the voltage across the test load will be zero.

FIG. 52B is a cross sectional view of the tear strip. In this example, the tear stirp has is a thin metal trace that includes notches, which allows it to bend and be folded around an object as shown in FIG. 52C. If the data logging device is being removed from the object, the pulling of the adhesive film off of the object will cause the tear strip to break as shown in FIG. 52D.

Figures 53A, 53B, 53C, 53D:
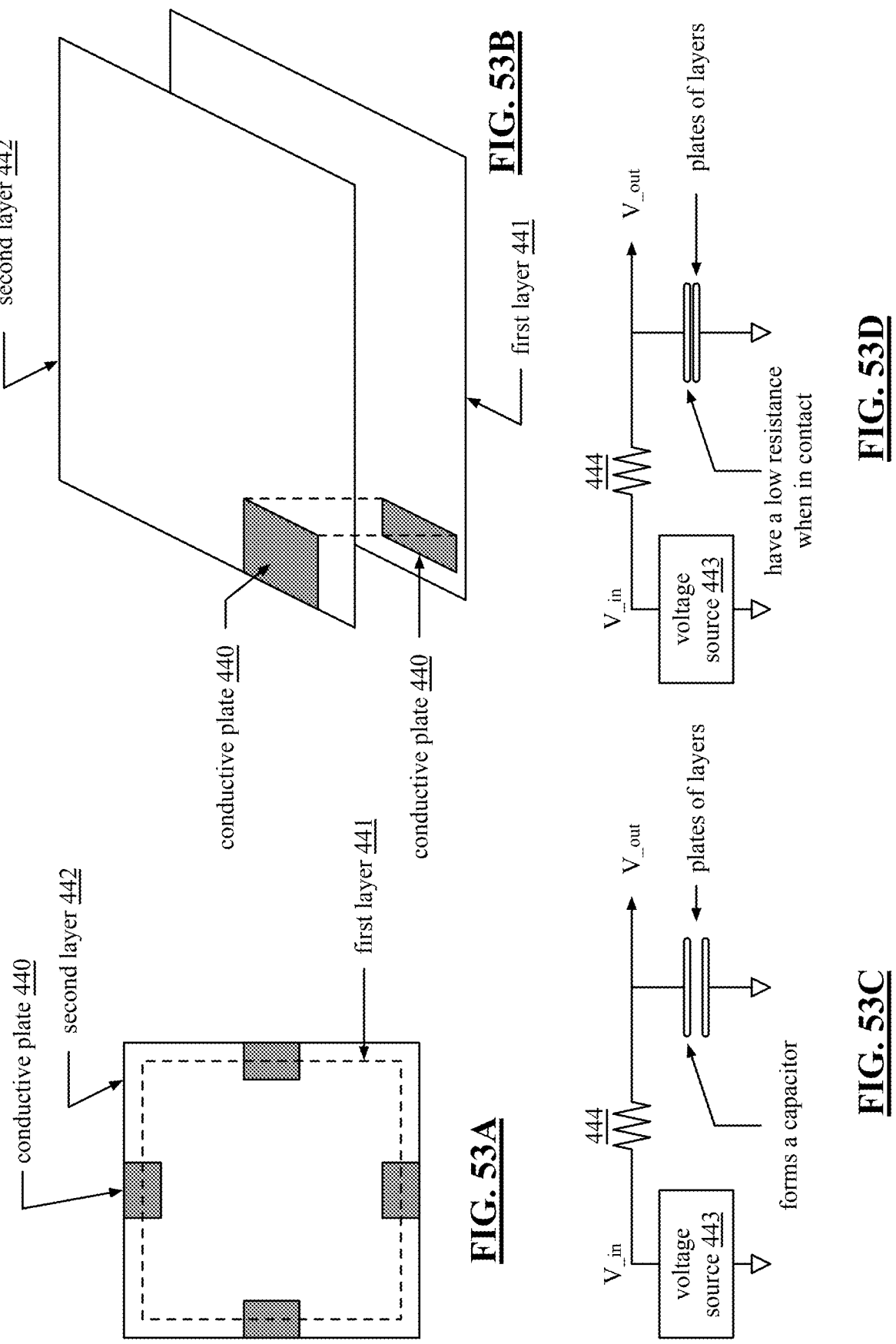
FIGS. 53A-53D are schematic block diagrams of another example of a tamper detection circuit of a data logging device.

FIGS. 53A-53D are schematic block diagrams of another example of a tamper detection circuit of a data logging device. FIG. 53A illustrates a top view of dual adhesive layers 441 and 442 of the adhesive film 40 of the data logging device. Each adhesive layer 441 and 442 includes one or more aligned conductive plates 440. The second, or outer layer, 442 is slightly larger than the first layer 441 such that the second layer has to be at least partially removed to access the first layer. In addition, the first layer 441 has a higher adhesive strength than that of the second layer 442.

FIG. 53B shows the alignment of a conductive plate 440 on the first layer 441 aligning with a conductive plate 440 of the second layer 442. When data logging device is adhered to an object, the align conductive plates of the first and second layers touch to form a short or are in very close proximity to for a capacitor that has a large capacitance.

FIG. 53C is a circuit diagram of an anti-tamper detection circuit that includes a voltage source 443, an impedance (e.g., resistor 444), and the conductive plates 440 of the first and second layers. When the plates form a capacitor as shown, the capacitance can be measured using an AC voltage source that generates a signal having a specific frequency. At the frequency, the impedance of the capacitor is comparable to the impedance of resistor 444. Thus, the output voltage has a magnitude that is about ½ of the magnitude of the input voltage when the plates are in a non-tampered position.

If the plates are pulled apart, the capacitance between the plate decreases, which increases the impedance. As the impedance increases, so does the output voltage, which indicates a tampering of the label.

As an alternate embodiment, the voltage source of the data logging device periodically outputs a square wave pulse. The RC time constant can be determined based on the change in the output voltage based on the pulse input. Knowing R, C is readily calculated. If C is in an expected range, no tampering is indicated. If C is not in the expected range, then tampering is indicated.

FIG. 53D is a circuit diagram of an anti-tamper detection circuit that includes a voltage source 443, an impedance (e.g., resistor 444), and the conductive plates 440 of the first and second layers. In this example, the plates touch when the data logging device is adhered to an object forming a low impedance. When a DC input voltage sourced by the voltage source 443, the low impedance holds the output voltage low. This indicates no tampering.

If the plates are not touching, the impedance is high. When the DC voltage is sourced by the voltage source 443, the output voltage is high, which indicates a tampering.

FIG. 54 is a schematic block diagram of an embodiment of a power management module 155 of a data logging device. The power management module 155 includes first logic circuitry 450, a first switch, battery check circuitry 451, a first power supply 452, second logic circuitry 453, a second switch, and a second power supply 454. Note that the first and second logic circuitry may be at least partially implemented by the processing module.

When the data logging device is in the off mode, the battery 43 is not installed, both switches are open, no triggers are generated, and no voltages are generated. When the battery is installed, a first activation command is received (or generated) as a first input 455. In response to the first input, the first logic circuitry 450 generates a first trigger 456 that transitions the data logger from the off mode to a sleep mode.

At a later point in time (e.g., seconds to months), the data logging device receives a second activation command as a first input 455. In response, the $1^{st}$ logic circuitry 450 enables, as a first trigger, transitioning from the sleep mode to the standby mode, in which, switch 1 is closed, which provides power to the first set of circuits 458 (e.g., one or more of the real time clock, the battery check circuitry 451, and an anti-tamper circuit), and switch 2 is open. In addition, the first logic circuitry 450 enables the real time clock to commence tracking the passing of unit time (e.g., fractions of a second, seconds, minutes, hours, days, etc.).

When the data logging device is in the standby mode, the first logic circuitry 450 may periodically receive first inputs to enable a battery status check and/or an anti-tamper check. For a battery status check, the first logic circuitry generates a trigger signal regarding checking the status of the battery. For an anti-tamper check, the first logic circuitry generates a trigger signal for the anti-tamper circuit to test for tamping to the data logging device.

While in the standby mode, the first logic circuitry 450 receives a configuration request as a first input 455 and/or a second input 459. When this occurs, both switches are closed. With switch 2 closed, it provides the first voltage 457 or the third voltage 463 from the power harvesting module 154, to the second power supply 454, which generates a second voltage 461. The second voltage 461 powers a second set of circuitry 462 (e.g., one or more of the processing module, the memory, the transceiver, the sensor, the indicator, the clock circuit, and the interfaces). In an alternative embodiment, when both switches (1 and 2) are closed, the first voltage 457 powers the first and second circuits (e.g., the second power supply 454 is in a high impedance mode such that the first power supply 452 provides the second voltage 461).

With the second set of circuits power up, the second logic circuit 453 generates a trigger signal 460 that allows the data logging device to receive and store configuration data from a reader. When the configuration is complete, the data logging device returns to the standby mode (e.g., switch 1 is on and switch 2 is off).

At another later point in time, the data logging device receives a third activation command as a second input 459, which causes the data logging device to transition into the ready mode. In response to the third activation signal, the $2^{nd}$ logic circuit closes switch 2, which enables the $2^{nd}$ power supply to generate the $2^{nd}$ voltage 461, which powers the second set of circuits 462. In an alternative embodiment, when both switches (1 and 2) are closed, the first voltage 457 powers the first and second circuits.

In addition, the $2^{nd}$ logic circuitry 453 generates a $2^{nd}$ trigger 460 that enables the data logging to receive and record a UTC time from a reader. If, the data logging device is communicating with a reader when the third activation command is received, the UTC is recorded during the transition to the ready mode. If the data logging device is not communicating with a reader when the third activation command is received, the data logging device is enabled to store a UTC the next time it's in communication with a reader. In an embodiment where the UTC is stored at a later time, the unit time count is recorded as the real time at which time the data logging device transitioned from the standby mode to the ready mode.

When the data logging device receives a fourth activation command as a second input, the second logic circuitry 459 generates a second trigger 460 to transition from the ready mode to the logging mode. In the logging mode, the second logic circuitry receives a log command as a second input and, in response, enables sampling of data from an associated sensor and/or an antitampering circuit and enables storing the sampled data.

When data logging is done (e.g., the end of receiving log commands) and/or when an environmental violation has been detected, the second logic circuit 459 receives a done command or a violation command as a second input, it generates a done mode signal or a violation signal as a second trigger. In responses to the done mode signal or the violation signal, switch 2 is opened (note that switch 1 remains closed). In the done mode or violation mode, a reader can retrieve data from the data logging device, but no new data can be generated and/or recorded. If the data logging device enters a finished mode (e.g., data cannot be trusted, data logging was ended prematurely, etc.), switch 2 is opened and switch 1 may be opened. In an embodiment of the finished mode, no internal circuitry of the data logging device is enabled. In another embodiment of the finished mode, the LEDs are periodically enabled to indicate the finished mode.

FIG. 55 is a schematic block diagram of an embodiment of a power harvesting module 154 of a power management module 155 of FIG. 54. The power harvesting module 154 includes a rectifying circuit 470 (and/or charge pump) and/or a DC-to-DC converter 471 (e.g., a linear regulator, buck converter, a boost converter). In an alternate embodiment, the power harvesting module includes a charge pump, the capacitor and the DC-to-DC converter 471.

The rectifying circuit 470, the capacitor, and/or the charge pump, process an RF input signal 473 (e.g., from a reader) and produces therefrom an unregulated DC voltage. The DC-to-DC converter 471 converts the unregulated DC voltage into a regulated third voltage 463.

FIG. 56 is a schematic block diagram of an embodiment of a power supply 452 or 454 of a power management module 155 of FIG. 54. The power supply includes a bandgap reference circuit 475 (or other voltage reference circuit) to produce a reference voltage. The voltage regulator 476 regulates an input voltage 477 (e.g., the battery voltage for the first power supply and the first voltage for the second power supply) to produce a regulated output voltage (e.g., the first voltage 457 or the second voltage 461). Note that the power supplies may be configured using different topologies of a DC to DC converter. For instance, one or both of the power supplies are buck converters, boost converters, fly-back converters, etc.

Figure 57:
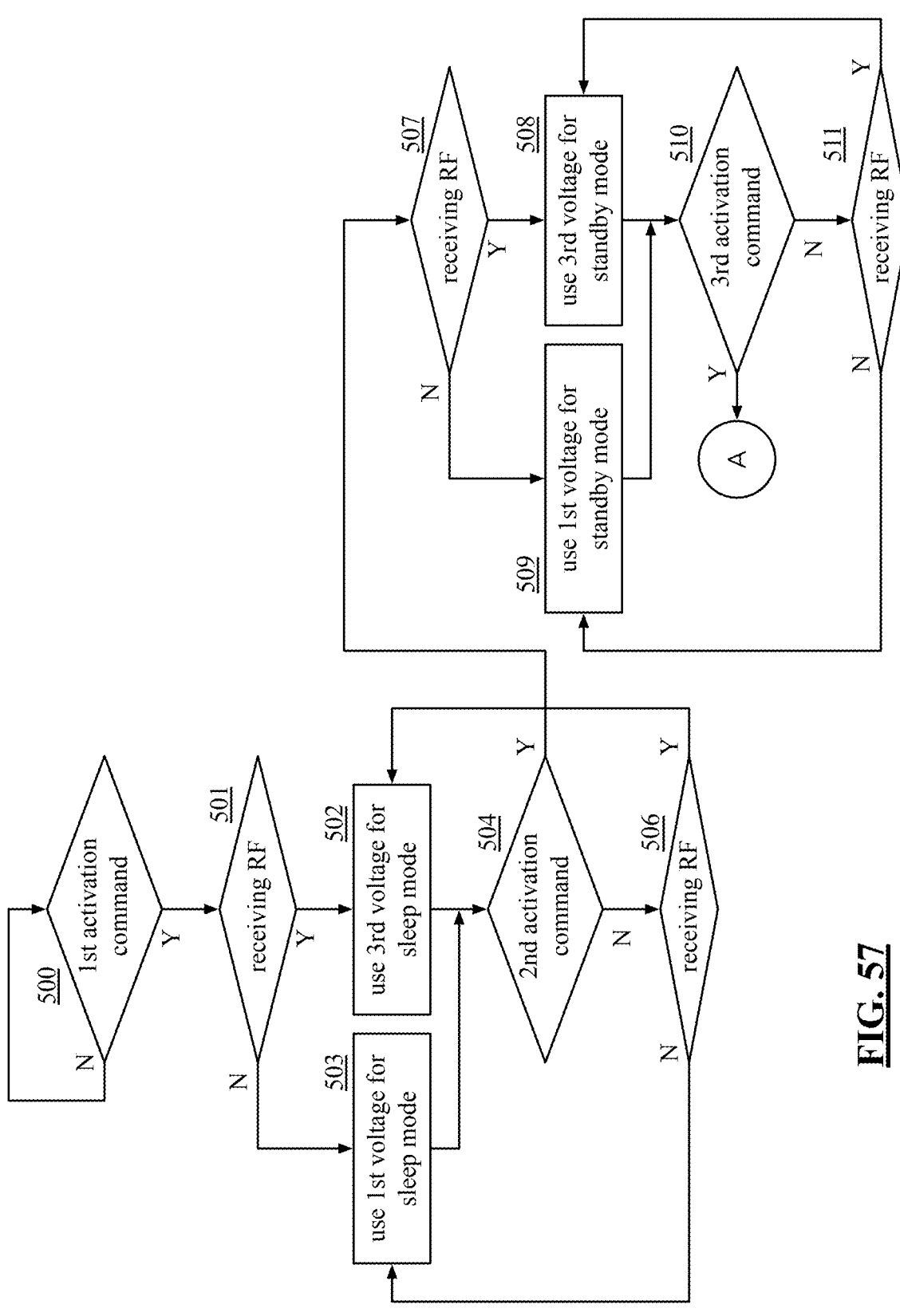
FIGS. 57 and 58 are a logic diagram of another example of a method of data logging.
Figure 58:
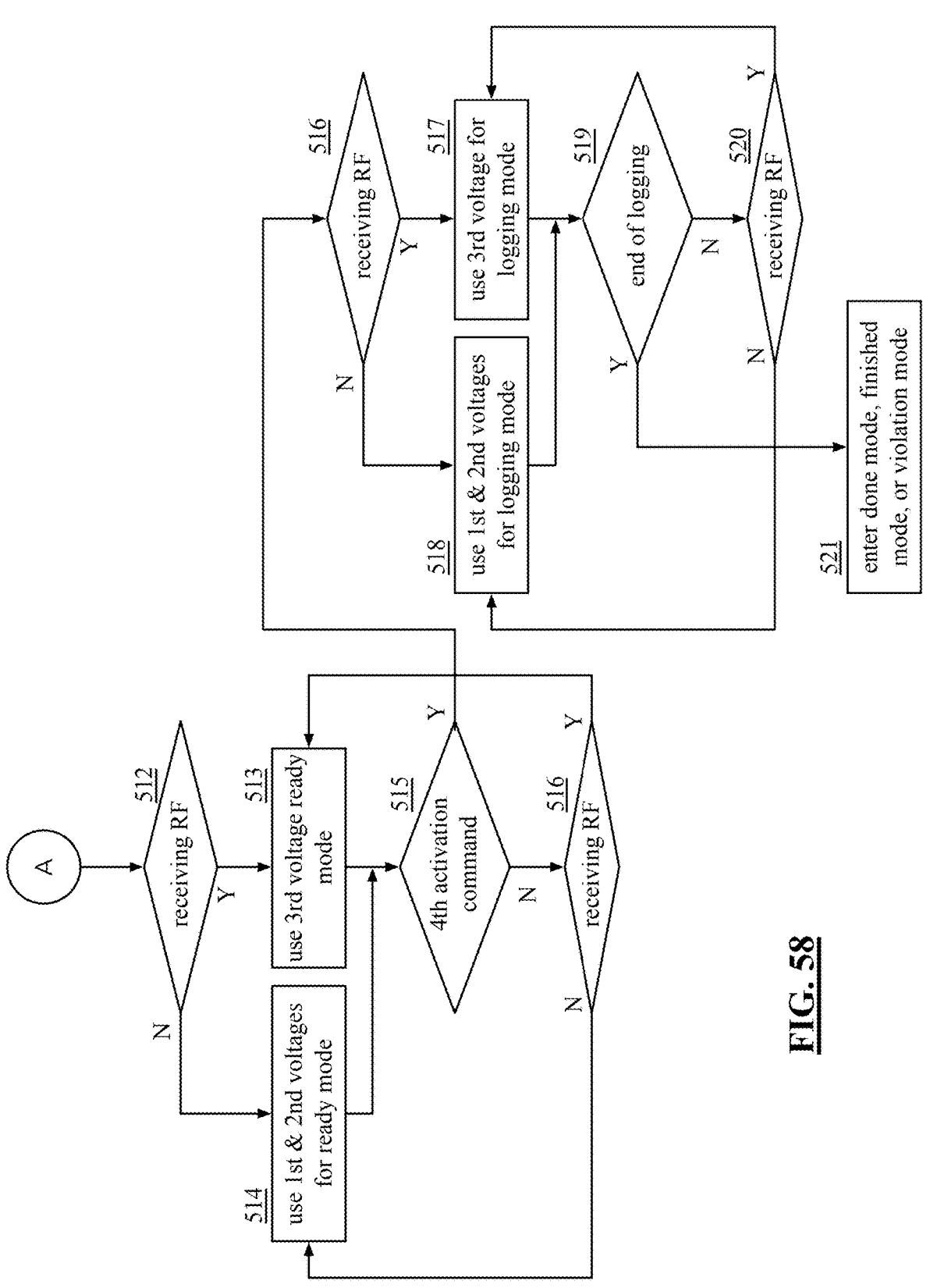

FIGS. 57 and 58 are a logic diagram of another example of a method of data logging that begins at step 500 where the data logging device determines whether it receives a first activation command. When it does, the method continues at step 501 where the data logging device determines whether it is receiving an RF signal (e.g., from a reader, a communication device, or other source of an RF signal).

If the data logging device is receiving an RF signal, the method continues at step 502 where the data logging device generates the $3^{rd}$ voltage from the RF signal via a power harvesting circuit and uses the $3^{rd}$ voltage to power the $1^{st}$ set of circuitry to enter the sleep mode. If the data logging device is not receiving an RF signal, the method continues at step 503 where the data logging device closes switch 1 to generate the $1^{st}$ voltage to power the first set of circuits to enter the sleep mode.

The method continues at step 504 where the data logging device determines whether it has received a second activation command. If not, the method continues to step 506 where the data logging device determines whether it is still receiving the RF signal. If so, the method continues at step 502. If the data logging device is not receiving the RF signal, the method continues at step 503.

When the second activation command is received the method continues at step 507 where the data logging device determines whether it is still receiving the RF signal. If so, the method continues to step 508 where the data logging device uses the $3^{rd}$ voltage to enter the standby mode. If the data logging device is no longer receiving the RF signal, the method continues to step 509 where the data logging device uses the $1^{st}$ voltage to enter the standby mode.

The method continues at step 510 where the data logging device determines whether it has received a third activation command. If not, the method continues to step 511 where the data logging device determines whether it is still receiving the RF signal. If so, the method continues at step 508. If the data logging device is not receiving the RF signal, the method continues at step 509.

When the third activation command is received the method continues at step 512 of FIG. 58 where the data logging device determines whether it is still receiving the RF signal. If so, the method continues to step 513 where the data logging device uses the $3^{rd}$ voltage to enter the ready mode. If the data logging device is no longer receiving the RF signal, the method continues to step 514 where the data logging device closes switch 2 (if not already closed) to generate the $2^{nd}$ voltage and uses the $1^{st}$ and $2^{nd}$ voltages to enter the ready mode.

The method continues at step 515 where the data logging device determines whether it has received a fourth activation command. If not, the method continues to step 516 where the data logging device determines whether it is still receiving the RF signal. If so, the method continues at step 513. If the data logging device is not receiving the RF signal, the method continues at step 514.

When the fourth activation command is received the method continues at step 516 where the data logging device determines whether it is still receiving the RF signal. If so, the method continues to step 517 where the data logging device uses the $3^{rd}$ voltage to enter the logging mode. If the data logging device is no longer receiving the RF signal, the method continues to step 518 where the data logging device closes switch 2 (if not already closed) to generate the $2^{nd}$ voltage and uses the $1^{st}$ and $2^{nd}$ voltages to enter the logging mode.

The method continues at step 519 where the data logging device determines whether to end data logging. If not, the method continues to step 520 where the data logging device determines whether it is still receiving the RF signal. If so, the method continues at step 517. If the data logging device is not receiving the RF signal, the method continues at step 518. If the data logging device determines to end the data logging, the method continues at step 521 where the data logging device enters the done mode, the finished mode, or the violation mode.

Figure 59:
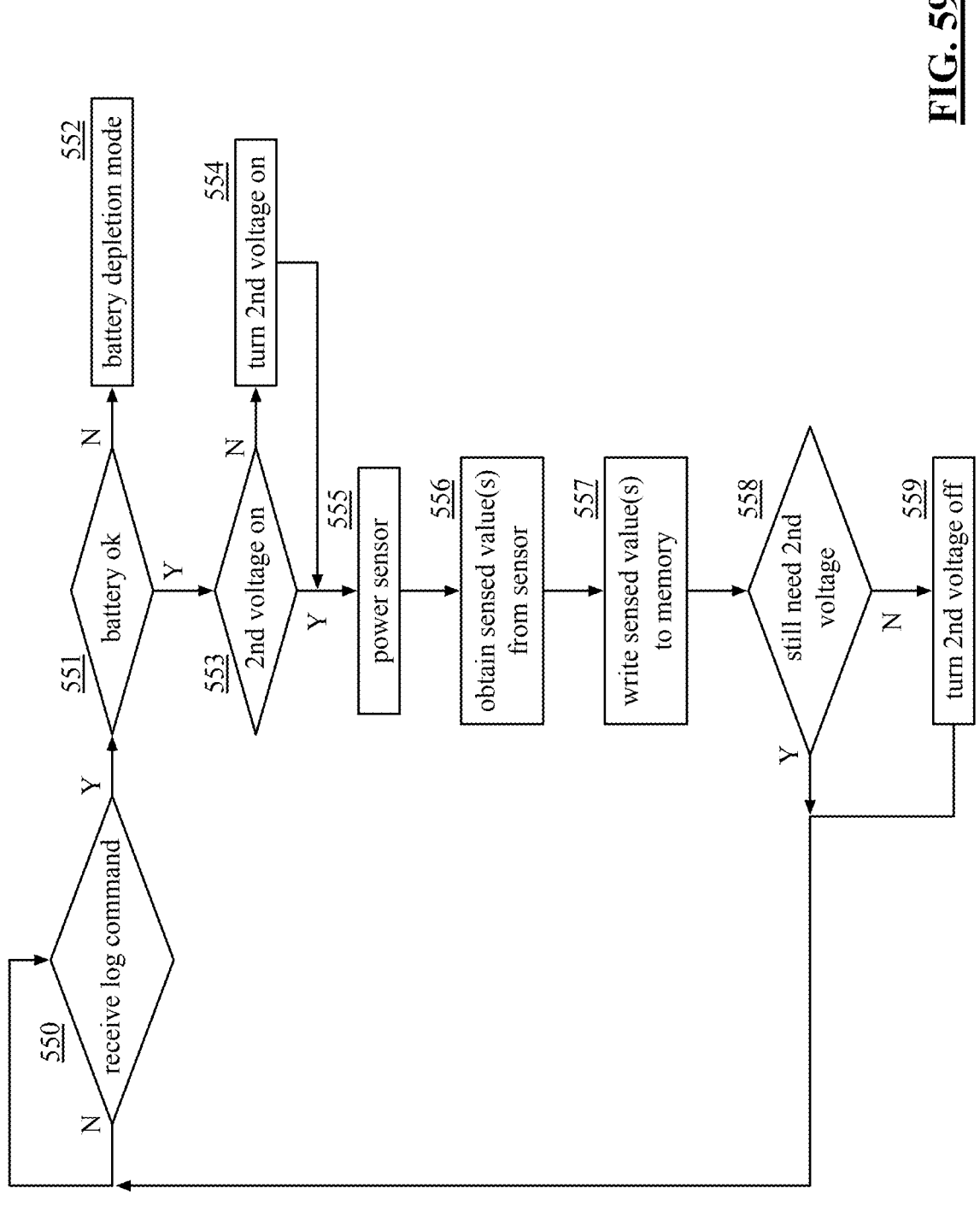
FIG. 59 is a logic diagram of another example of a method of data logging.

FIG. 59 is a logic diagram of another example of a method of data logging. The method begins at step 550, where the data logging device determines whether it has received a command to obtain a data sample from a sensor (e.g., a log command). When it has, the method continues to step 551, where the data logging device determines whether the battery is ok (e.g., has sufficient power to execute this method at least once). If not, the method continues at step 552, where the data logging device enters a battery depleted mode (or a finished mode).

If the battery is ok, the method continues at step 553, where the data logging device determines whether the $2^{nd}$ voltage is on. Note that, in between data logging sessions as dictated by log commands, the data logging device may be placed into a low power mode by turning off the $2^{nd}$ voltage. If the $2^{nd}$ voltage is not turned off, the method continues at step 554, where the data logging device turns on the 2nd voltage. With the 2nd voltage on, the method continues at step 555, where the data logging device provides power to the sensor (e.g., provides a drive signal).

The method continues at step 556, where the data logging device obtains one or more sensed values from the sensor. The method continues at step 557, where the data logging device writes the one or more sensed values into memory. A sensed value may be stored as raw data, as a digital coded value, or as a natural value (e.g., processed using the single calibration point mapping or a multiple calibration point mapping).

The method continues at step 558, where the data logging device determines whether the $2^{nd}$ voltage still needs to be on (e.g., performing a memory function or some other function). If yes, the method repeats at step 550. If not, the method continues at step 559, where the data logging device turns off the 2nd voltage. The method then repeats at step 550.

Figure 60:
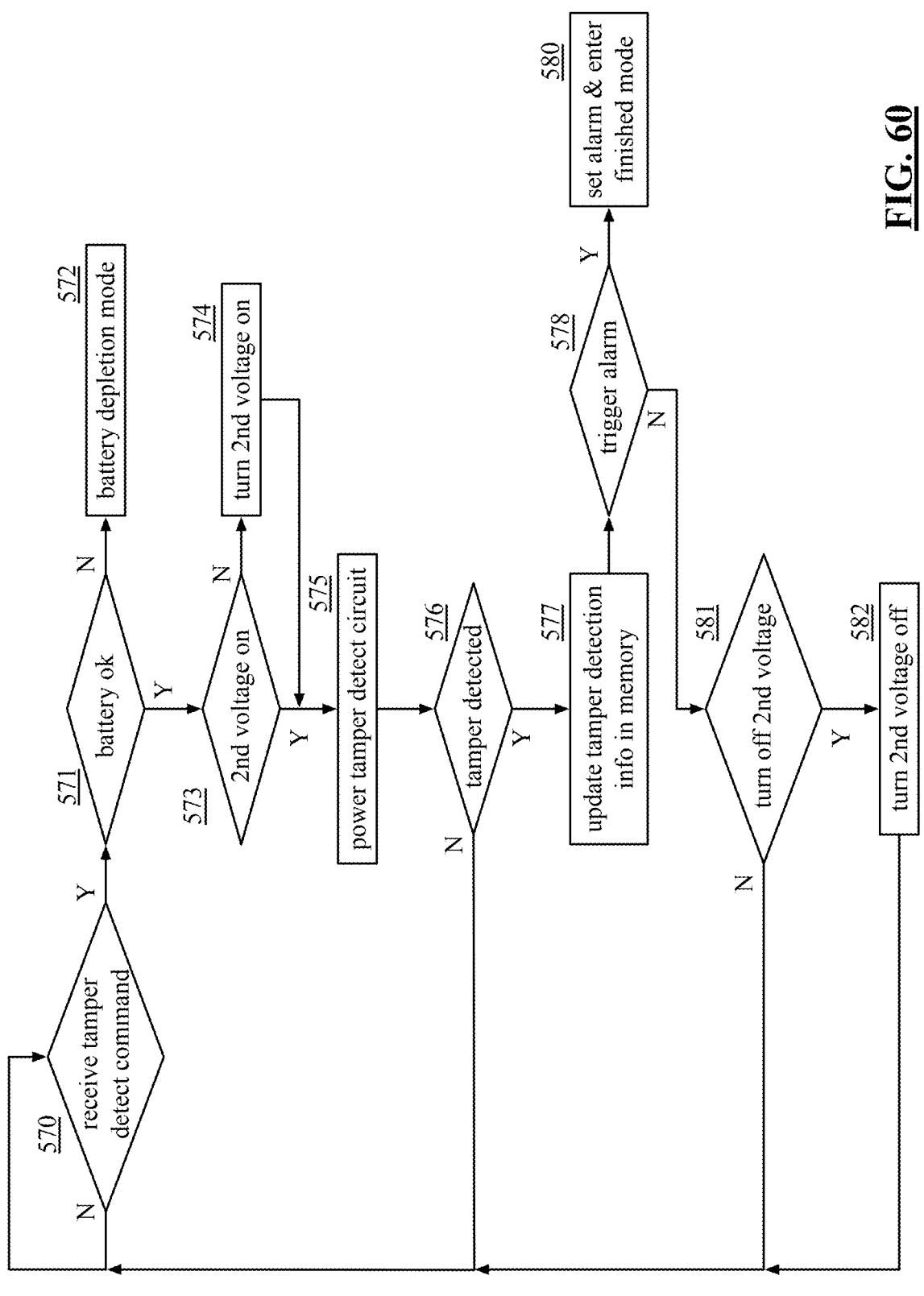
FIG. 60 is a logic diagram of another example of a method of data logging.

FIG. 60 is a logic diagram of another example of a method of data logging. The method begins at step 570, where the data logging device determines whether it has received a command to test for tampering (e.g., an internally generated periodic signal to test for tampering). When the data logging device does receive a command, the method continues at step 571, where the data logging device determines whether the battery is ok (e.g., has sufficient power to execute this method at least once). If not, the method continues at step 572, where the data logging device enters a battery depleted mode (or a finished mode).

If the battery is ok, the method continues at step 573, where the data logging device determines whether the second voltage is on. Note that, in between tamper detection intervals, the data logging device may be placed into a low power mode by turning off the $2^{nd}$ voltage. If the second voltage is off, the method continues at step 574 where the data logging device turns on the second voltage.

The method continues at step 575 where the data logging device provides power to a tamper detection circuit. A variety of tamper detection circuits and methods have been previously discussed. The method continues at step 576, where the data logging device determines whether a tamper has been detected. If not, the method continues at step 570.

If a tamper is detected, the method continues at at step 577, where the data logging device updates tamper detection information in memory. For example, the data logging device detects a tamper (e.g., unauthorized write request) but it does not compromise the reliability of the data logger. In this example, the data logger records the time of the tamper detection, the type of tamper detected, and that it did not compromise the reliability of the data logging device.

As another example, the data logging device detects a tamper (e.g., removal of the data logging device from the object) and it has compromised the reliability of the data logging device. In this example, the data logging device sets a flag indicating that it has been tampered with and the tampering has compromised the integrity of the data logging device.

The method continues at step 578, where the data logging device determines whether the tampering triggers an alarm (e.g., has the reliability of the data logging device been compromised for not). If yes, the method continues at step 580, where the data logging device sets a visual and/or audible alarm and enters the finished mode.

If the tampering did not trigger an alarm, the method continues at step 581, where the data logging device determines whether the second voltage can be turned off. If not, the method repeats at step 570. If yes, the method continues at step 582, where the data logging device turns off the second voltage. The method then repeats at step 570.

Figure 61:
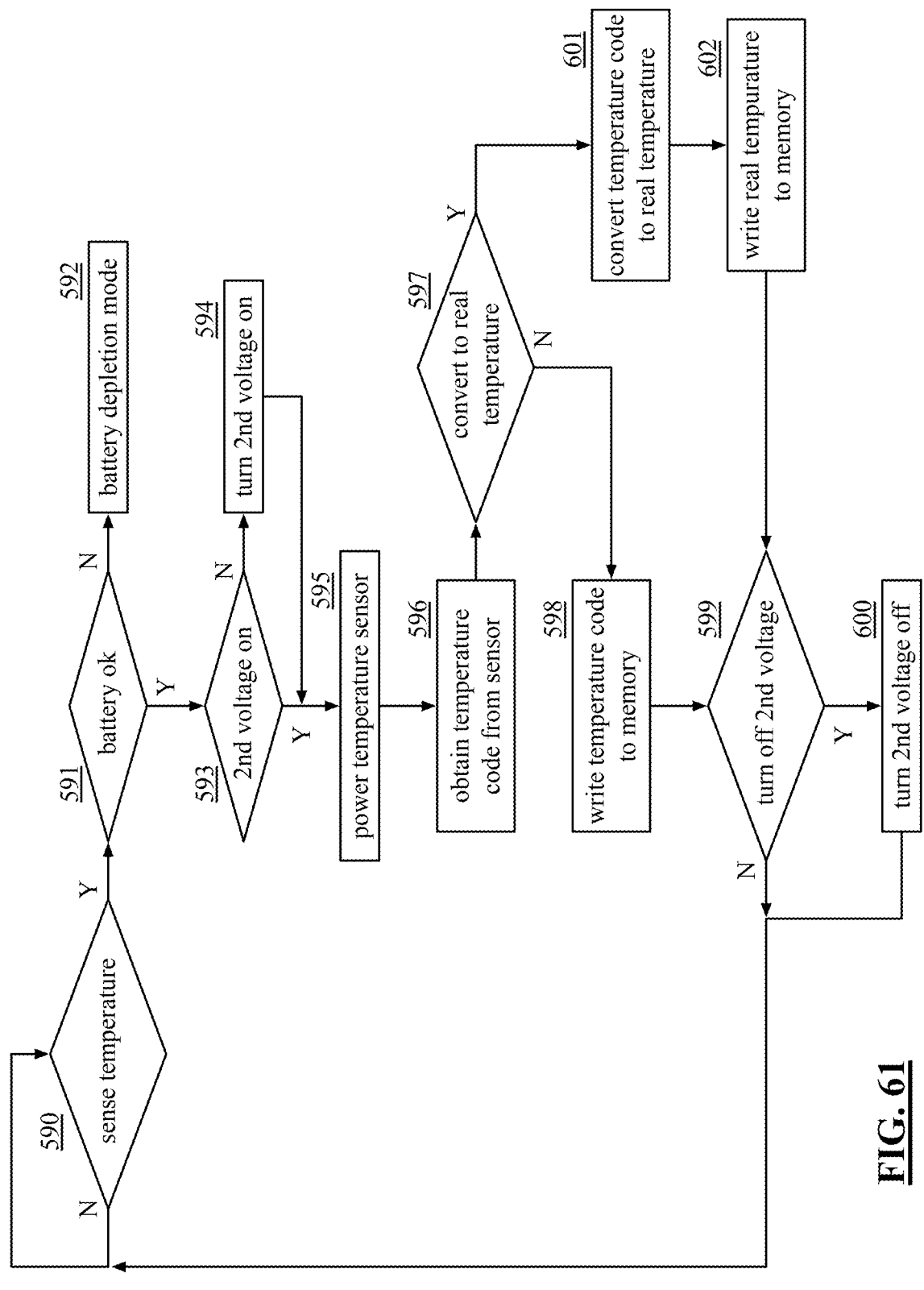
FIG. 61 is a logic diagram of another example of a method of data logging.

FIG. 61 is a logic diagram of another example of a method of data logging. The method begins at step 590, where the data logging device determines whether it has received a command (e.g., a log command) to obtain a temperature data sample from a temperature sensor. When it has, the method continues to step 591, where the data logging device determines whether the battery is ok (e.g., has sufficient power to execute this method at least once). If not, the method continues at step 592, where the data logging device enters a battery depleted mode (or a finished mode).

If the battery is ok, the method continues at step 593, where the data logging device determines whether the second voltage is on. If not, the method continues at step 594, where the data logging device turns on the second voltage. With the second voltage on, the method continues at step 595, where the data logging device provides power to the temperature sensor (e.g., provides a drive signal).

The method continues at step 596, where the data logging device obtains one or more sensed temperature values from the temperature sensor. The method continues at step 557, where the data logging device determines whether to convert a sensed temperature value into a real temperature value. If not, the method continues at step 598, where the data logging device writes the one or more sensed temperature values into memory. A sensed value may be stored as raw data (e.g., a voltage or current value) or as a digital coded value (e.g., digital representation of the voltage or current value).

The method continues at step 599, where the data logging device determines whether to turn off the second voltage. If no, the method repeats at step 590. If yes, the method continues at step 600, where the data logging device turns off the second voltage. The method then repeats at step 590.

If, at step 597, the data logging device determined to convert the sensed temperature value into a real temperature value, the method continues at step 601, where the data logging device converts the sensed temperature value into a real temperature value using the single calibration point mapping and/or the multiple calibration point mapping. The method continues at step 602, where the data logging device writes the real temperature value into memory. The method continues at step 599.

Figure 62:
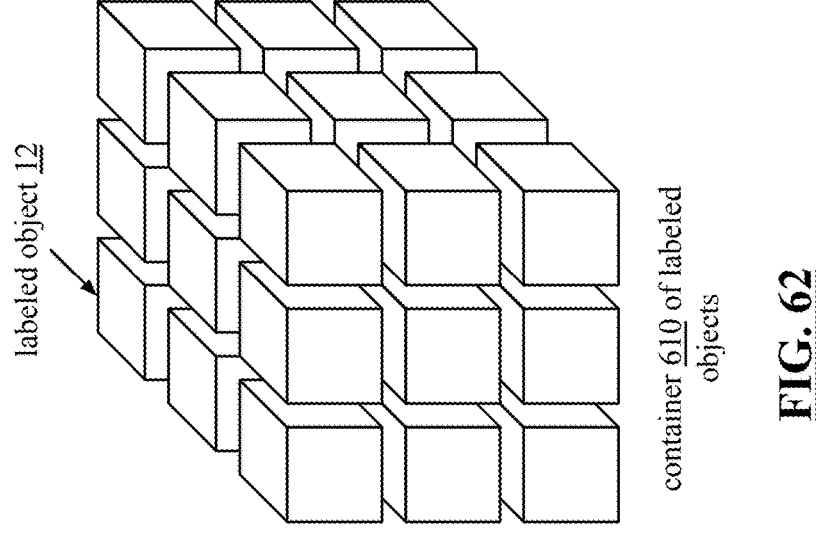
FIG. 62 is a schematic block diagram of an example of a container that includes a plurality of labeled objects.

FIG. 62 is a schematic block diagram of an example of a container 612 that includes a plurality of labeled objects 12. In this example, the labeled objects are closely packed together within the container 612. In general, the labeled objects 12 at the perimeter are most susceptible to environmental changes than the labeled objects 12 towards the middle of the container.

Figure 63:
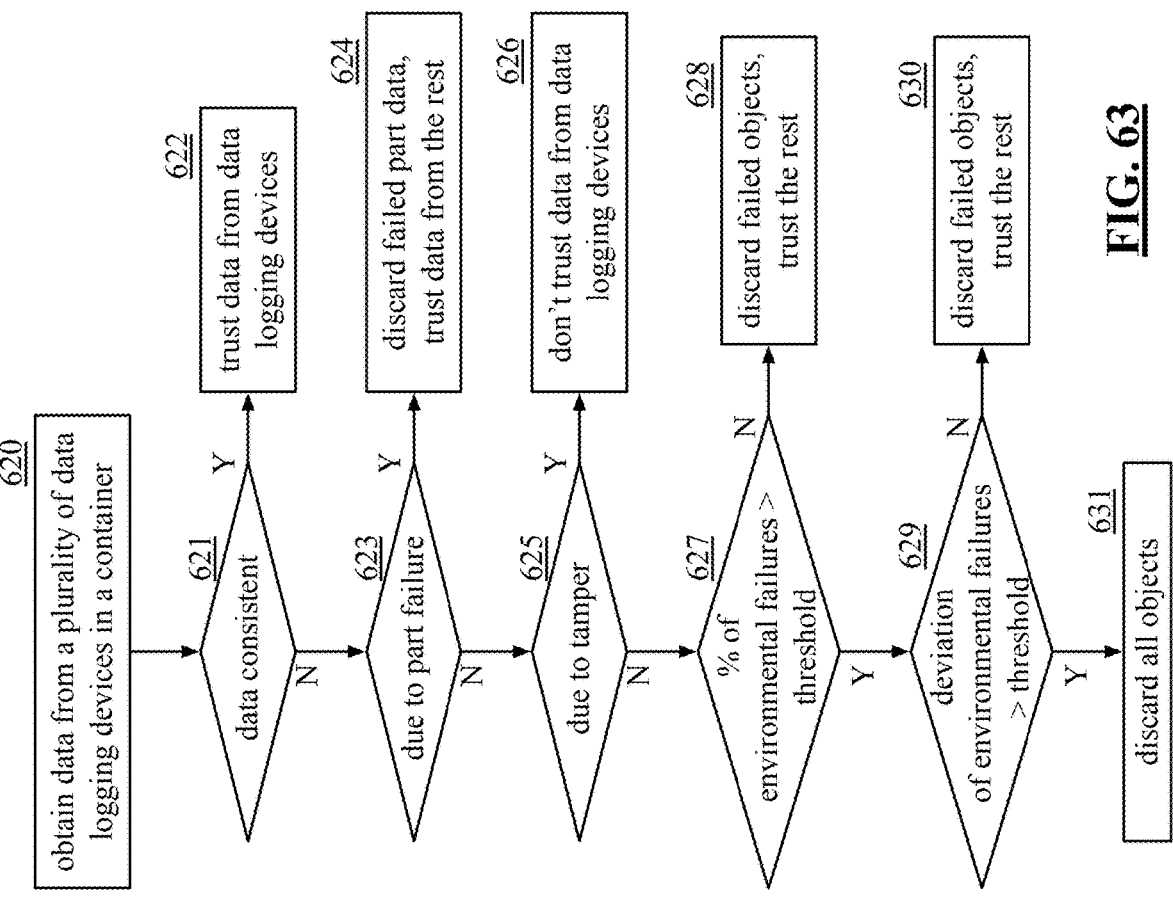
FIG. 63 is a logic diagram of another example of a method of data logging.

FIG. 63 is a logic diagram of another example of a method of data logging regarding the labeled objects in the container of FIG. 63. The method begins at step 620, where a data processing device (e.g., device 50 of FIG. 12) obtains data from data logging devices associated with the objects in the container 610. The method continues at step 621, where the data processing device determines whether the data is consistent. For example, the data logging devices are reporting no environmental violations. As another example, the data logging devices are reporting an environmental violation. As another example, the data logging devices are reporting tampering that compromised the reliability of the data logging devices.

When the data is consistent, the method continues at step 622, where the data processing device trusts the data received from the data logging devices. If the data is inconsistent (one or more data logging devices reporting an environmental violation or a tamper violation and others are not), the method continues at step 623, where the data processing device determines whether the data inconsistency is due to part failure (e.g., the tamper violation was caused by the part failing and not an unauthorized manipulation of a data logging device). If yes, the method continues at step 624, where the data processing device discards the labeled objects associated with the failed data logging device.

If the data inconsistency is not due to part failure, the method continues at step 625, where the data processing device determines whether the data inconsistency is due to tamping of a data logging device that compromised the reliability of the data logging device. If yes, the method continues at step 626, where the data processing device doesn't trust the data from all of the data logging devices or doesn't trust the data from the tampered data logging devices and trusts the rest.

If the data inconsistency is not due to tampering, the method continues at step 627, where the data processing device determines whether the percentage of data logging devices reporting an environmental violation exceeds a threshold percentage value (e.g., 75% or less). If no, the method continues at step 628, where the data processing device discards the failed labeled objects (e.g., data logging devices reported an environmental violation) and trusts the rest.

If the data logging devices reporting an environmental violation exceeded the threshold percentage value, the method continues at step 629, where the data processing device determines whether the percentage of data logging devices reporting an environmental violation exceed a standard deviation threshold of data logging devices reporting an environmental violation (e.g., standard deviation of 2% or more).

If no, the method continues at step 630, where the data processing device discards the failed labeled objects (e.g., data logging devices reported an environmental violation) and trusts the rest. If yes, the method continues at step 631, where the data processing device discards all of the labeled objects. As used with respect to this figure, "discard" means return, dispose of, destroy, and/or otherwise not use.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, a register, a flip-flop, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While transistors may be shown in one or more of the above-described figure(s) as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

As applicable, one or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e., machine/non-human intelligence.

As applicable, one or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

As applicable, one or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
determining, by a processing module of a data logging device, whether an event has occurred that potentially compromises reliability of the data logging device, wherein the data logging device is affixed to an object to record data within data sampling frames over a period of time to track conditions of the object, wherein the event is one of a tamper indication, a battery failure indication, a device failure indication;
when the event has occurred, determining, by the processing module, whether the reliability of the data logging device has been compromised by comparing a value regarding the event to a condition threshold;
when the value regarding the event compares unfavorably to the condition threshold:
generating, by the processing module, a compromised indication signal indicating that the data has been compromised by the event; and
when the value regarding the event compares favorably to the condition threshold:
generating, by the processing module, a data integrity indication signal indicating that the data has not been compromised by the event.

2. The method of claim 1 further comprises:
producing, by a display of the data logging device, a visual indication that reliability of the data logging device has been compromised based on the compromised indication signal.

3. The method of claim 1, wherein the event comprises one or more of:
an unacceptable temperature excursion;
an unacceptable environment/ambient light exposure;
an attempt to read/retrieve logger data by an unauthorized user;
an invalid data write request;
an invalid data read request;
physical damage to the data logging device;
removal of the data logging device from an object;
tear strip removed or damaged;
auxiliary environmental condition;
a functional failure of the data logging device; and
an invalid mode change request.

4. The method of claim 1, wherein the determining whether the reliability of the data logging device has been compromised further comprises:
determining, by the processing module, whether a data write request is received subsequent to the data logging device being placed in a ready mode; and
when the data write request is received subsequent to the data logging device being placed in the ready mode, indicating, by the processing module, that the reliability of the data logging device has been compromised.

5. The method of claim 1, wherein the determining whether the reliability of the data logging device has been compromised further comprises:
obtaining, by the processing module, a request for a mode change;
determining, by the processing module, whether the requested mode change is valid; and
when the requested mode change is invalid, indicating, by the processing module, that the reliability of the data logging device has been compromised.

6. The method of claim 1 further comprises:
detecting, by an anti-tamper detector of the data logging device, the event; and providing, by the anti-tamper detector, an indication of detection of the event to the processing module.

7. The method of claim 1 further comprises:
generating, by the processing module, the compromised indication signal that supersedes an environmental favorable indication signal and an environmental unfavorable indication signal; and
providing, by a display of the data logging device, no visual indication for the data logging device to indicate that the data logging device has been compromised, wherein, without the data logging device being compromised, the display would provide a visual indication based on the environmental favorable indication signal or the environmental unfavorable indication signal.

8. The method of claim 1 further comprises:
when the reliability of the data logging device has been compromised, placing, by the processing module, the data logging device in a finished mode.

9. The method of claim 1 further comprises:
producing, by a display of the data logging device, a visual indication regarding data integrity based on the data integrity indication signal.

10. The method of claim 1 further comprises:
storing in a memory, by the data logging device, the compromised indication signal.

11. The method of claim 10 further comprises:
sending, by the processing module, the stored compromised indication signal to a reader.

12. The method of claim 1, wherein the compromised indication signal includes one or more of:
a compromised environmental indication signal;
a compromised data integrity indication signal;
a compromised hardware indication signal; and
a tampering indication signal.

13. The method of claim 12 further comprises:
storing in a memory of the data logging device, one or more of:
the compromised environmental indication signal;
the compromised data integrity indication signal;
the compromised hardware indication signal; and
the tampering indication signal.

14. The method of claim 1 further comprises:
when the value regarding the event compares unfavorably to the condition threshold, generating, by the processing module, a first visual representation of the compromised indication signal; and
when the value regarding the event compares favorably to the condition threshold, generating, by the processing module, a second visual representation of the data integrity indication signal.

15. A computer readable memory comprises:
a first storage section that stores operational instructions that, when executed by a processing module of a data logging device, causes the processing module to:
determine whether an event has occurred that potentially compromises reliability of the data logging device, wherein the data logging device is affixed to an object to record data within data sampling frames over a period of time to track conditions of the object, wherein the event is one of a tamper indication, a battery failure indication, a device failure indication; and
when the event has occurred, determine whether the reliability of the data logging device has been compromised by comparing a value regarding the event to a condition threshold; and a second storage section that stores operational instructions that, when executed by the processing module, causes the processing module to:
when the value regarding the event compares unfavorably to the condition threshold:
generate a compromised indication signal indicating that the data has been compromised by the event; and
when the value regarding the event compares favorably to the condition threshold:
generate a data integrity indication signal indicating that the data has not been compromised by the event.

16. The computer readable memory of claim 15, wherein the second storage section further stores operational instructions that, when executed by the processing module, causes the processing module to:
send the compromised indication signal to a display of the data logging device, wherein the display displays a visual indication that reliability of the data logging device has been compromised based on the compromised indication signal.

17. The computer readable memory of claim 15, wherein the event comprises one or more of:
an unacceptable temperature excursion;
an unacceptable environment/ambient light exposure;
an attempt to read/retrieve logger data by an unauthorized user;
an invalid data write request;
an invalid data read request;
physical damage to the data logging device;
removal of the data logging device from an object;
tear strip removed or damaged;
auxiliary environmental condition;
a battery failure;
a functional failure of the data logging device; and
an invalid mode change request.

18. The computer readable memory of claim 15, wherein the first storage section further stores operational instructions that, when executed by the processing module, causes the processing module to determine whether the reliability of the data logging device has been compromised further by:
determining whether a data write request is received subsequent to the data logging device being placed in a ready mode; and
when the data write request is received subsequent to the data logging device being placed in the ready mode, indicating that the reliability of the data logging device has been compromised.

19. The computer readable memory of claim 15, wherein the first storage section further stores operational instructions that, when executed by the processing module, causes the processing module to determine whether the reliability of the data logging device has been compromised further by:
obtaining a request for a mode change;
determining whether the requested mode change is valid; and
when the requested mode change is invalid, indicating that the reliability of the data logging device has been compromised.

20. The computer readable memory of claim 15, wherein the first storage section further stores operational instructions that, when executed by the processing module, causes the processing module to:
receiving detection of the event from an anti-tamper detector of the data logging device.

21. The computer readable memory of claim 15, wherein the second storage section further stores operational instructions that, when executed by the processing module, causes the processing module to:

generate the compromised indication signal that supersedes an environmental favorable indication signal and an environmental unfavorable indication signal.

22. The computer readable memory of claim 15, wherein the second storage section further stores operational instructions that, when executed by the processing module, causes the processing module to:

when the reliability of the data logging device has been compromised, placing the data logging device in a finished mode.

23. The computer readable memory of claim 15, wherein the second storage section further stores operational instructions that, when executed by the processing module, causes the processing module to:

send the data integrity indication signal to a display of the data logging device, wherein the display displays a visual indication regarding data integrity based on the data integrity indication signal.

24. The computer readable memory of claim 15, wherein the second storage section further stores operational instructions that, when executed by the processing module, causes the processing module to:

store the compromised indication signal in a memory of the data logging device.

25. The computer readable memory of claim 24, wherein the second storage section further stores operational instructions that, when executed by the processing module, causes the processing module to:

send the stored compromised indication signal to a reader.

26. The computer readable memory of claim 15, wherein the compromised indication signal includes one or more of:

a compromised environmental indication signal;

a compromised data integrity indication signal;

a compromised hardware indication signal; and a tampering indication signal.

27. The computer readable memory of claim 26, wherein the first storage section further stores operational instructions that, when executed by a processing module of a data logging device, causes the processing module to:

store in memory of the data logging device one or more of:

the compromised environmental indication signal;

the compromised data integrity indication signal;

the compromised hardware indication signal; and the tampering indication signal.

28. The computer readable memory of claim 15, wherein the second storage section further stores operational instructions that, when executed by the processing module, causes the processing module to:

when the value regarding the event compares unfavorably to the condition threshold:

generate a first visual representation of the compromised indication signal; and when the value regarding the event compares favorably to the condition threshold:

generate a second visual representation of the data integrity indication signal.

\* \* \* \* \*